United States Patent
MolavianJazi et al.

(10) Patent No.: US 12,120,666 B2
(45) Date of Patent: Oct. 15, 2024

(54) CROSS-CARRIER SCHEDULING ACROSS DIFFERENT DRX GROUPS

(71) Applicant: Samsung Electronics Co., Ltd., Suwon-si (KR)

(72) Inventors: Ebrahim MolavianJazi, San Jose, CA (US); Qiongjie Lin, Sunnyvale, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 17/664,195

(22) Filed: May 19, 2022

(65) Prior Publication Data
US 2022/0394734 A1 Dec. 8, 2022

Related U.S. Application Data

(60) Provisional application No. 63/275,325, filed on Nov. 3, 2021, provisional application No. 63/195,999, filed on Jun. 2, 2021.

(51) Int. Cl.
*H04W 72/12* (2023.01)
*H04W 72/0446* (2023.01)
(Continued)

(52) U.S. Cl.
CPC ..... *H04W 72/1263* (2013.01); *H04W 72/0446* (2013.01); *H04W 72/0453* (2013.01); *H04W 76/28* (2018.02)

(58) Field of Classification Search
CPC ............. H04W 72/1263; H04W 76/28; H04W 72/0453; H04W 72/0446
See application file for complete search history.

(56) References Cited

U.S. PATENT DOCUMENTS

| 2020/0022210 | A1* | 1/2020 | Heo ................. H04W 72/04 |
| 2020/0245395 | A1 | 7/2020 | Zhang et al. |
| 2022/0394811 | A1 | 12/2022 | Li |

FOREIGN PATENT DOCUMENTS

| KR | 10-2021-0007285 A | 1/2021 |
| WO | 2020198594 A1 | 10/2020 |

(Continued)

OTHER PUBLICATIONS

International Search Report and Written Opinion issued Sep. 14, 2022 regarding International Application No. PCT/KR2022/007787, 7 pages.

(Continued)

*Primary Examiner* — Brenda H Pham

(57) ABSTRACT

Apparatuses and methods for cross-carrier scheduling across different discontinuous reception (DRX) groups. A method includes receiving first information for a first and second sets of values for a first set of DRX timers associated with first and second DRX cell groups, respectively; receiving second information, from a first cell, for scheduling on a second cell; and receiving a physical downlink control channel (PDCCH) on the first cell. The first and second DRX cell groups do not have a common cell. The first and second cells are from the first and second DRX cell groups, respectively. The method further includes determining a first DRX Active time for the first DRX cell group based on the first set of values and the PDCCH reception and determining a second DRX Active time for the second DRX cell group based on the second set of values and the PDCCH reception.

20 Claims, 16 Drawing Sheets

(51) Int. Cl.
*H04W 72/0453* (2023.01)
*H04W 72/1263* (2023.01)
*H04W 76/28* (2018.01)

(56) References Cited

FOREIGN PATENT DOCUMENTS

WO 2021072628 A1 4/2021
WO 2021087914 A1 5/2021

OTHER PUBLICATIONS

Ericsson, "On DRX, LCP, timing, HARQ, SR/BSR, and CG and SPS", 3GPP TSG-RAN WG2 #114-e, R2-2106089, May 2021, 36 pages.
Samsung, "Clarification on secondary DRX group", 3GPP TSG-RAN WG2 Meeting #114e, R2-2105232, May 2021, 7 pages.
"5G; NR; Physical channels and modulation (3GPP TS 38.211 version 16.5.0, Release 16)", ETSI TS 138 211 V16.5.0, Apr. 2021, 138 pgs.
"5G; NR; Multiplexing and channel coding (3GPP TS 38.212 version 16.5.0 Release 16)", ETSI TS 138 212 V16.5.0, Apr. 2021, 155 pages.
"5G; NR; Physical layer procedures for control (3GPP TS 38.213 version 16.5.0 Release 16)", ETSI TS 138 213 V16.5.0, Apr. 2021, 188 pages.
"5G; NR; Physical layer procedures for data (3GPP TS 38.214 version 16.5.0 Release 16)", ETSI TS 138 214 V16.5.0, Apr. 2021, 173 pages.
"5G; NR; Medium Access Control (MAC) protocol specification (3GPP TS 38.321 version 16.4.0 Release 16)", ETSI TS 138 321 V16.4.0, Apr. 2021, 159 pages.
"5G; NR; Radio Resource Control (RRC); Protocol specification (3GPP TS 38.331 version 16.4.1 Release 16)", ETSI TS 138 331 V16.4.1, Apr. 2021, 932 pages.
"5G; NR; NR and NG-RAN Overall description; Stage-2 (3GPP TS 38.300 version 16.5.0 Release 16)", ETSI TS 138 300 V16.5.0, Apr. 2021, 153 pages.
Extended European Search Report issued Jul. 12, 2024 regarding Application No. 22816455.4, 10 pages.

* cited by examiner

1100

| CIF = 0 | DCI fields | sSCell is "active/activated for Pcell scheduling"

| CIF = 0 | DCI fields | sSCell is "inactive/deactivated for Pcell scheduling"

\* Both figures show DCIs on Pcell for self-sheduling Pcell

\*\* in both cases, sSCell is assumed an activated serving sell and configured for Pcell scheduling

FIG. 11

CROSS-CARRIER SCHEDULING ACROSS DIFFERENT DRX GROUPS

CROSS-REFERENCE TO RELATED APPLICATION AND CLAIM OF PRIORITY

This application claims priority under 35 U.S.C. § 119(e) to U.S. Provisional Patent Application No. 63/195,999 filed on Jun. 2, 2021, and U.S. Provisional Patent Application No. 63/275,325 filed on Nov. 3, 2021. The above-identified provisional patent applications are hereby incorporated by reference in their entirety.

TECHNICAL FIELD

The present disclosure relates generally to wireless communication systems and, more specifically, the present disclosure relates to cross-carrier scheduling across different discontinuous reception (DRX) groups.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to cross-carrier scheduling across different discontinuous reception groups.

In one embodiment, a method is provided. The method includes receiving first information for a first set of values for a first set of discontinuous reception (DRX) timers associated with a first DRX cell group and a second set of values for the first set of DRX timers associated with a second DRX cell group. The first DRX cell group and the second DRX cell group do not have a common cell. The method further includes receiving second information, from a first cell, for scheduling on a second cell. The first cell is from the first DRX cell group. The second cell is from the second DRX cell group. The method further includes receiving a physical downlink control channel (PDCCH) on the first cell. The PDCCH schedules a physical downlink shared channel (PDSCH) or a physical uplink shared channel (PUSCH) on the second cell. The method further includes receiving the PDSCH or transmitting the PUSCH on the second cell. The method further includes determining a first DRX Active time for the first DRX cell group based on the first set of values and the PDCCH reception and a second DRX Active time for the second DRX cell group based on the second set of values and the PDCCH reception.

In another embodiment, a user equipment (UE) is provided. The UE includes a transceiver configured to receive first information for a first set of values for a first set of DRX timers associated with a first DRX cell group and a second set of values for the first set of DRX timers associated with a second DRX cell group. The first DRX cell group and the second DRX cell group do not have a common cell; The transceiver is further configured to receive second information, from a first cell, for scheduling on a second cell. The first cell is from the first DRX cell group. The second cell is from the second DRX cell group. The transceiver is further configured to receive a PDCCH on the first cell. The PDCCH schedules a PDSCH or a PUSCH on the second cell. The transceiver is further configured to receive the PDSCH or transmit the PUSCH on the second cell. The UE further includes a processor operably coupled to the transceiver. The processor is configured to determine a first DRX Active time for the first DRX cell group based on the first set of values and the PDCCH reception and a second DRX Active time for the second DRX cell group based on the second set of values and the PDCCH reception.

In yet another embodiment, a base station is provided. The base station includes a transceiver configured to transmit first information for a first set of values for a first set of DRX timers associated with a first DRX cell group and a second set of values for the first set of DRX timers associated with a second DRX cell group. The first DRX cell group and the second DRX cell group do not have a common cell. The transceiver is further configured to transmit second information, from a first cell, for scheduling on a second cell. The first cell is from the first DRX cell group. The second cell is from the second DRX cell group. The transceiver is further configured to transmit a PDCCH on the first cell. The PDCCH schedules a PDSCH or a PUSCH on the second cell. The transceiver is further configured to transmit the PDSCH or receive the PUSCH on the second cell. The base station further includes a processor operably coupled to the transceiver. The processor is configured to determine a first DRX Active time for the first DRX cell group based on the first set of values and the PDCCH transmission and a second DRX Active time for the second DRX cell group based on the second set of values and the PDCCH transmission.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates a diagram of an operation for mapping CIF values in a DCI format for self-scheduling on the primary cell (PCell) according to embodiments of the present disclosure;

DETAILED DESCRIPTION

Figure 1:
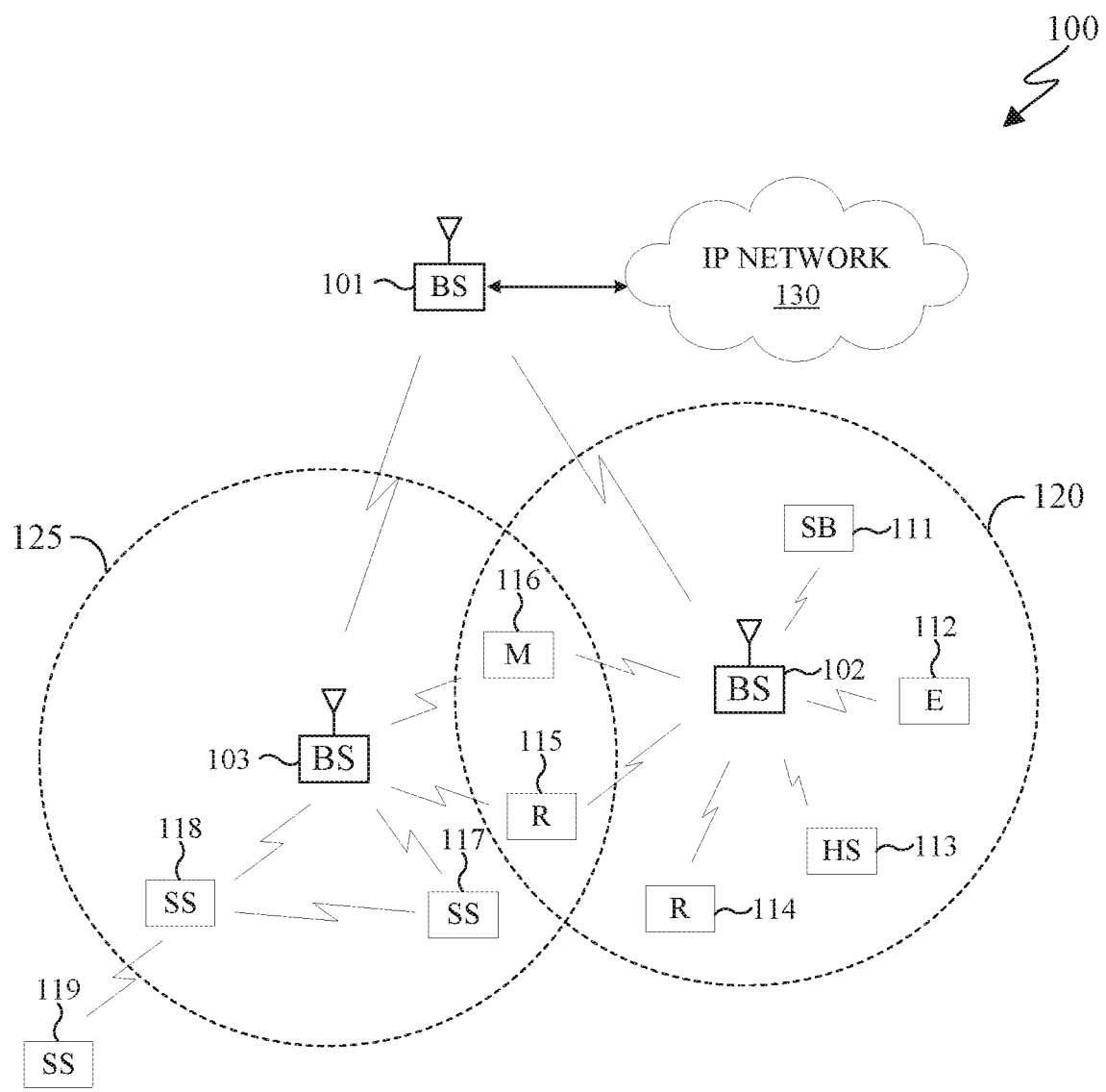
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.5.0, "NR; Physical channels and modulation" ("REF1"); 3GPP TS 38.212 Rel-16 v16.5.0, "NR; Multiplexing and channel coding" ("REF2"); 3GPP TS 38.213 Rel-16 v16.5.0, "NR; Physical layer procedures for control" ("REF3"); 3GPP TS 38.214 Rel-16 v16.5.0, "NR; Physical layer procedures for data" ("REF4"); 3GPP TS 38.321 Rel-16 v16.4.0, "NR; Medium Access Control (MAC) protocol specification" ("REF5"); 3GPP TS 38.331 Rel-16 v16.4.1, "NR; Radio Resource Control (RRC) protocol specification" ("REF6"); and 3GPP TS 38.300 Rel-16 v16.5.0, "NR; NR and NG-RAN Overall Description; Stage 2" ("REF7").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long-term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D)

communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
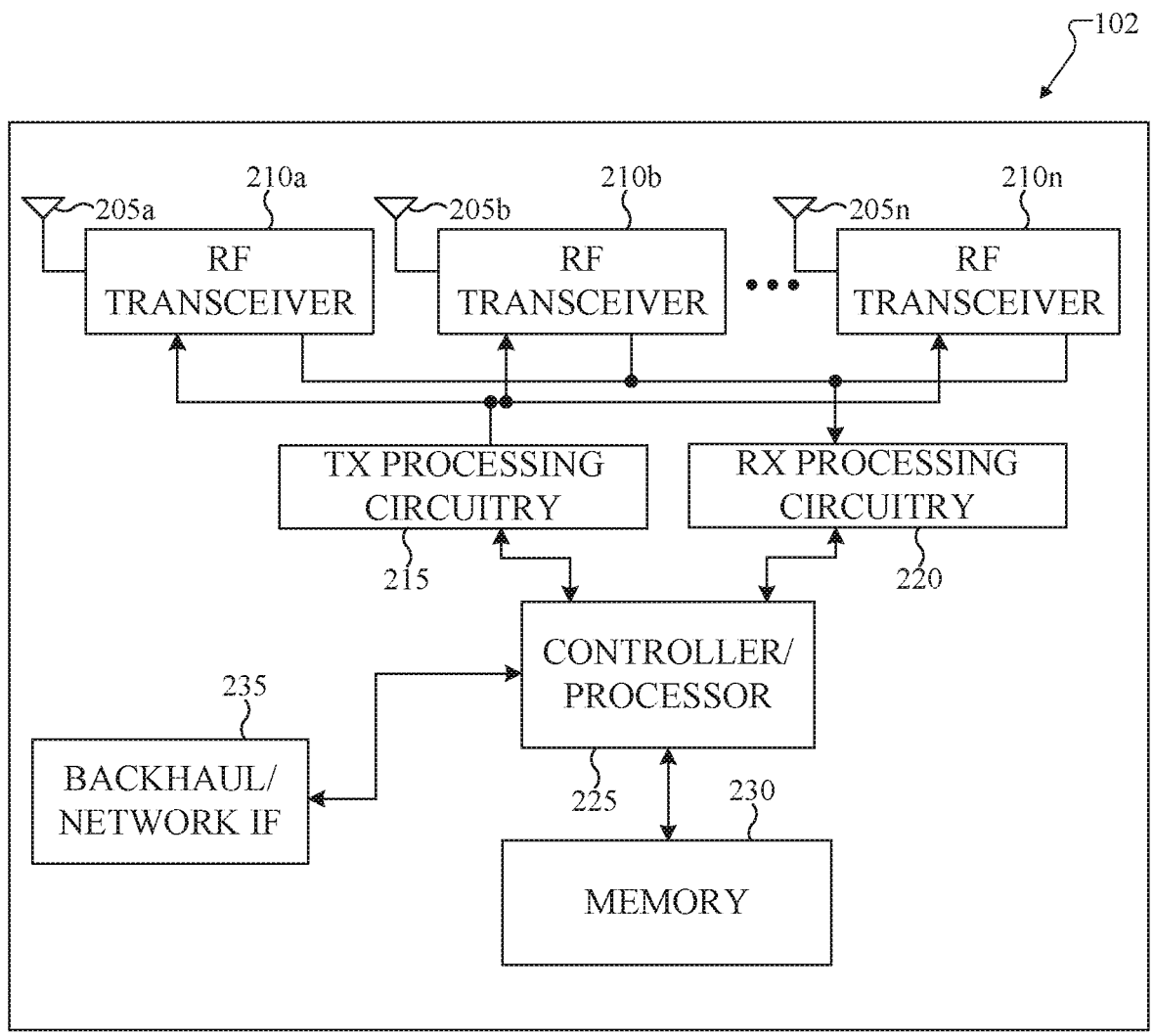
FIG. 2 illustrates an example base station (BS) according to embodiments of the present disclosure.
Figure 3:
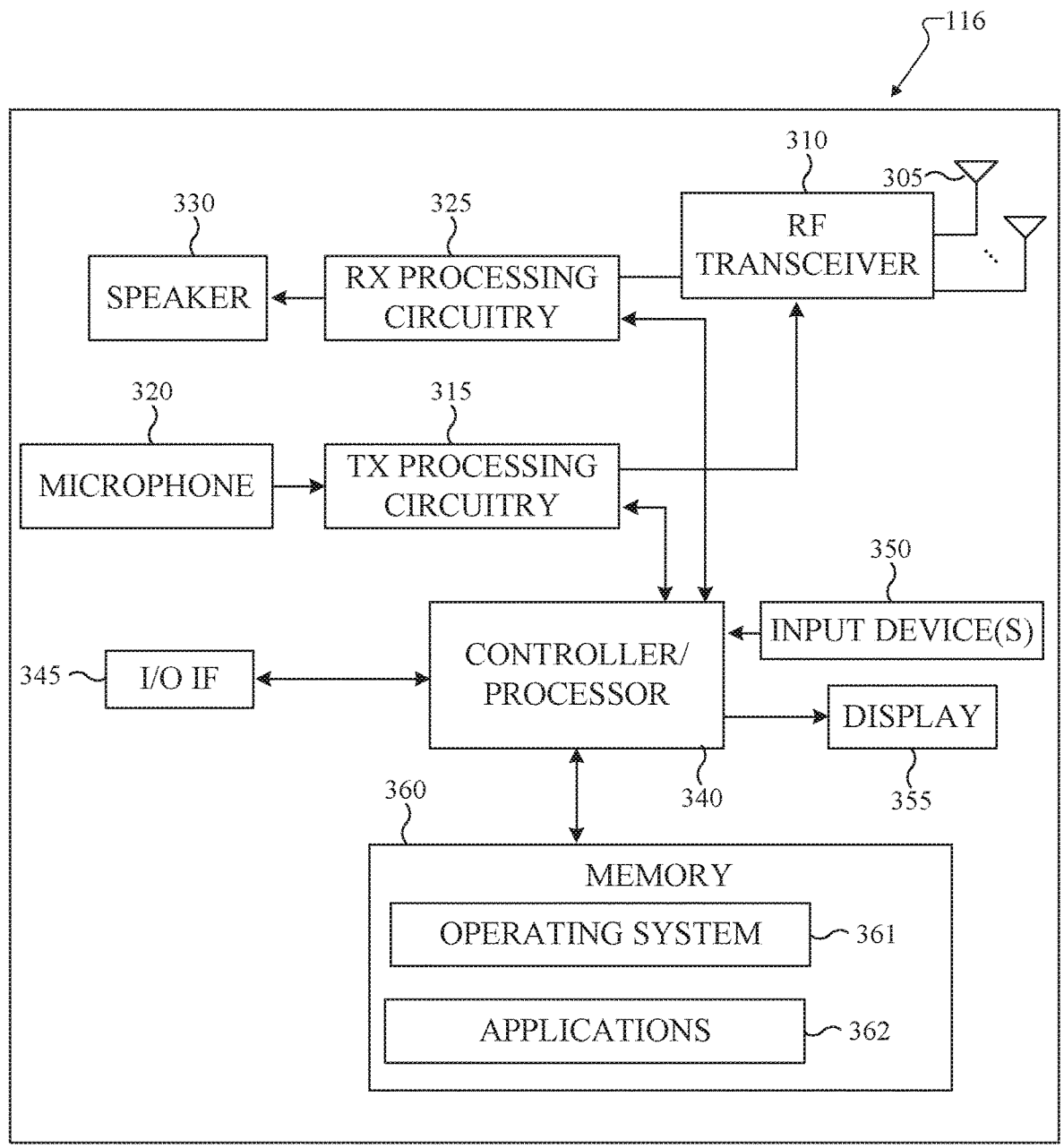
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (gNB) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, in some embodiments, one or more of BS 101, BS 102 and BS 103 support cross-carrier scheduling across different discontinuous reception (DRX) groups. Additionally, as described in more detail below, one or more of the UEs 111-119 include circuitry, circuitry, programming, or a combination thereof for cross-carrier scheduling across different DRX groups. In certain embodiments, and one or more of the BSs 101-103 includes circuitry, programming, or a combination thereof for cross-carrier scheduling across different DRX groups.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support cross-carrier scheduling across different DRX groups. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
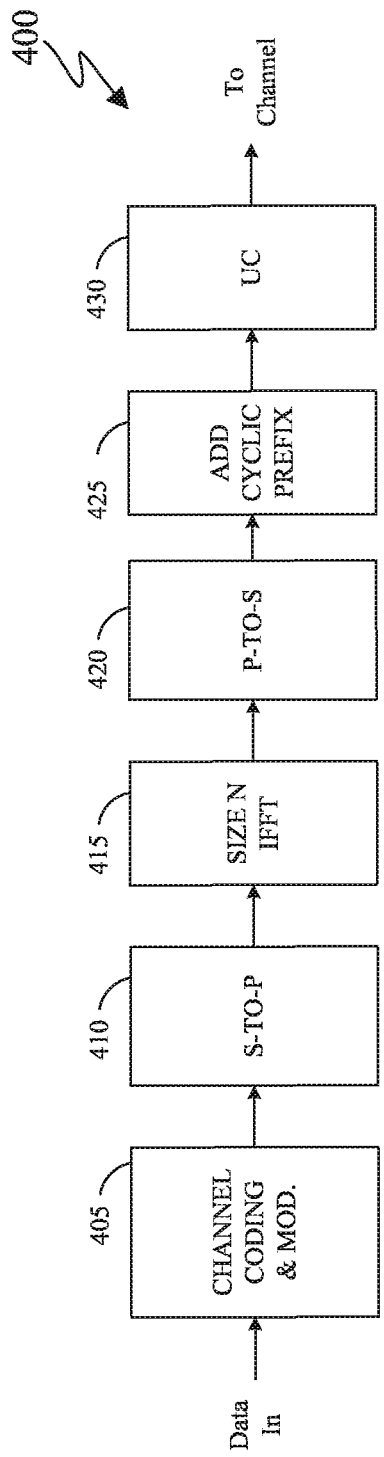
FIGS. 4 and 5 illustrate example wireless transmit and receive paths according to embodiments of the present disclosure.
Figure 5:
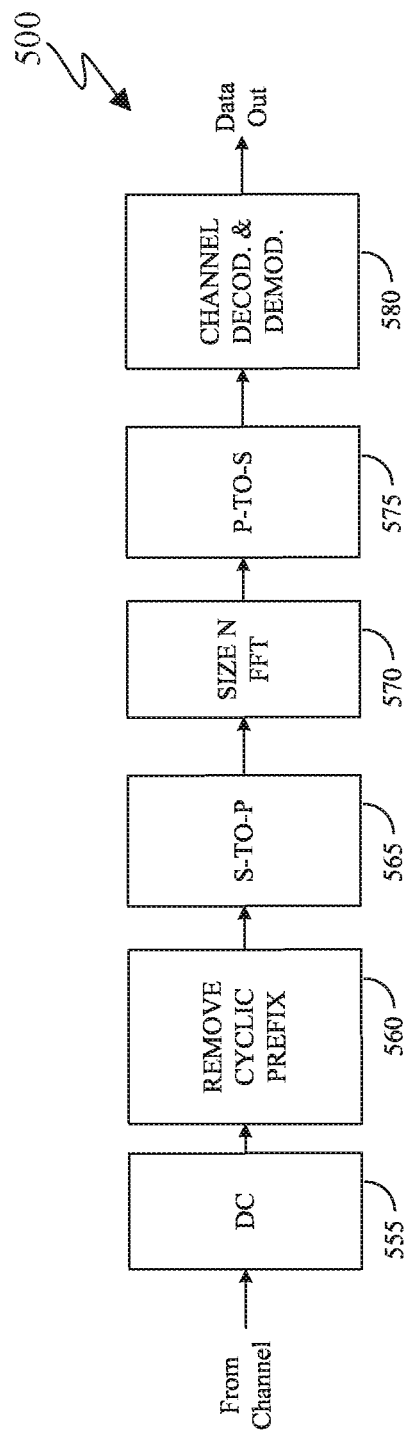

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a downconverter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BSs 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Certain embodiments of the present disclosure relate to a pre-5th-Generation (5G) or 5G or beyond 5G communication system to be provided for supporting one or more of: higher data rates, lower latency, higher reliability, improved coverage, and massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Embodiments of the present disclosure describe enhancements for UE power saving in a carrier aggregation (CA) operation. In particular, embodiments of the disclosure focus on cross-carrier scheduling across different discontinuous reception (DRX) groups in different frequency ranges.

In legacy 5G NR systems, for a UE configured with multiple serving cells (CA operation), DRX configuration is configured per groups of serving cells, referred to as DRX groups. A UE can be configured with one or two DRX groups, referred to as default DRX group and a secondary DRX group. The UE determines a respective DRX Active Time for each DRX group. Since UE power consumption is materially different between low/mid frequency bands such as below 6G or frequency range 1 (FR1), compared to high frequency bands such as mmWave bands above 6 GHz or frequency range 2 (FR2), the legacy system restricts DRX groups based on an operating frequency range. Each DRX group can include cells from only one frequency range. For example, the default DRX group can include only FR1 cells, and the secondary DRX group can include only FR2 cells, or vice versa.

In a CA operation, configuration and activation of multiple serving cells facilitate increased throughput for the UE. However, control signaling is typically included on one or few serving cells, for example, based on reliability requirements, availability of control resources, and so on. Therefore, the UE typically monitors physical downlink control channel (PDCCH) on a number of serving cells, referred to as scheduling cell(s), while other serving cells, referred to as scheduled cell(s), operate based on cross-carrier scheduling by the scheduling cells.

Embodiments of the present disclosure take into consideration that legacy NR system has introduced restrictions for CA operation in relation with the DRX groups. In particular, cross-carrier scheduling is only possible within a same DRX group and corresponding frequency range, not across different DRX groups and different frequency ranges. In other words, when cross-carrier scheduling is configured for a serving/scheduled cell, the scheduled cell needs to be in a same DRX group and a same frequency range as the corresponding scheduling cell. Such operation limits the benefits of the CA framework, for example, prevents FR1+FR2 scheduling (that is, cross-carrier scheduling of an FR2 cell by an FR1, or vice versa), which is a common scenario in CA operation, unless FR-specific configuration of DRX is discarded, and a single DRX configuration is provided for all serving cells to the UE. Therefore, the UE is forced to operate either with a limited CA operation or with a limited UE power saving framework.

To support cross-carrier scheduling across different DRX groups corresponding to different FRs, a key issue is how to handle the coupling of DRX Active Times across the two DRX groups. Since the UE performs the PDCCH monitoring on the scheduling cell on a first DRX group and performs the physical downlink shared channel (PDSCH)/physical uplink shared channel (PUSCH) transmission on the scheduled cell on a second DRX group, the DRX Active Time in each DRX group depends on PDCCH/PDSCH/PUSCH operations performed in the other DRX group. For example, PDCCH monitoring on the scheduling cell (for the scheduled cell) extends the DRX Active Time on the first/default DRX group, due to DRX-inactivity timers associated with the scheduling cell. On the other hand, PDCCH monitoring (on the scheduling cell) for the scheduled cell extends the DRX Active Time on the second/secondary DRX group, due to DRX hybrid automatic repeat request (HARQ) Retransmission timers associated with HARQ processes of the scheduled cell. Such operation can extend the DRX Active Time on both DRX group, and therefore, increase the UE power consumption. It is noted that, in the legacy system, all serving cells in a DRX group are in DRX Active Time when a/any serving cell in the DRX group is in DRX Active Time. Therefore, cross-carrier scheduling across different DRX groups can increase the UE power consumption not only for the scheduled cell and the corresponding scheduling cell, but also for all other serving cells in the two DRX groups, unless UE power saving enhancements are considered to reduce such interaction between the two DRX groups.

Accordingly, embodiments of the present disclosure take into consideration that there is a need for a more flexible CA operation that supports cross-carrier scheduling across different DRX groups corresponding to different frequency ranges.

Embodiments of the present disclosure also take into consideration that there is a need to support UE power saving enhancements that reduce the coupling and interaction between the two DRX groups, such that DRX Active Time on the two DRX groups are maintained or increased minimally compared to the legacy system in which cross-carrier scheduling is restricted to serving cells within a same DRX group and a same frequency range.

Certain embodiments of the present disclosure describe methods and apparatus for cross-carrier scheduling across different DRX groups or different FRs.

Certain embodiments of the disclosure describe methods for enhanced carrier aggregation operation and enhanced UE power saving. The goal is to enable cross-carrier scheduling across different DRX groups/FRs, while maintaining a low UE power consumption, especially on FR2 serving cells.

For example, a baseline operation is described that extends the legacy DRX operation to the case of cross-carrier scheduling across different DRX groups or different FRs. The baseline operation achieves the flexible CA operation for FR1+FR2 scheduling, without any UE power saving enhancements.

Additionally, various methods are disclosed to enhance UE power saving when cross-carrier scheduling across different DRX groups is supported. Variations of legacy DRX group configuration are presented to prevent the (material) increase of UE power consumption on the scheduled/scheduling cell or on other serving cells in the DRX group as a result of cross-carrier scheduling across different DRX groups/FRs. For example, methods are described for configuring a scheduled cell and a corresponding scheduling cell in a same DRX group, to reduce the UE power consumption impact of cross-carrier scheduling on other serving cells.

Certain embodiments of the present disclosure also describe enhanced approaches to separate the DRX configuration or decouple the DRX operation for the scheduled cells compared to (corresponding) scheduling cells. For example, solutions are provided to define DRX Active Time of the scheduled cells in terms of the time duration for PDSCH/PUSCH transmission and excluding the time durations for PDCCH monitoring on the scheduling cell for the scheduled cell. In addition, various methods are described so that PDCCH monitoring activities on the scheduling cell in one DRX group/FR does not increase the UE power consumption for the scheduled cell and other serving cells in the other DRX group/FR. For example, DRX timers for PDCCH monitoring for new transmissions or for HARQ retransmissions associated with PDSCH/PUSCH on the scheduled cell are considered to run on the scheduling cell, where the UE monitors the PDCCH, and not on the scheduled cell.

Certain embodiments of the present disclosure also describe scheduling request (SR) operation with two DRX groups, wherein the UE can stop an extension of DRX Active Time of a first DRX group from which a physical uplink control channel (PUCCH) for SR is transmitted, upon receiving a PDCCH on a serving cell from the second DRX group in response to the pending SR.

One motivation for cross-carrier scheduling across different DRX groups is enhanced CA operation across frequency bands below and above 6 GHz, referred to as FR1+FR2 CA operation, while jointly considering UE power saving enhancements. In general, the embodiments apply to any deployments, verticals, or scenarios including with eMBB, Ultra reliable and low latency communication (URLLC) and industrial internet of things (IIoT) and extended reality (XR), massive machine type communication (mMTC) and internet of things (IoT), with sidelink/vehicle to anything (V2X) communications, with multi-Transmission reception point (TRP)/beam/panel, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, and so on.

Embodiments of describing cross-carrier scheduling across different DRX groups and FRs are summarized in the following and are fully elaborated further below.

For another example, an embodiment, described in greater detail below, denoted as E-1 describes baseline UE operation with cross-carrier scheduling across different DRX groups. The UE can be configured with two DRX groups, such that a scheduling cell belongs to a first DRX group, and a corresponding scheduled cell belongs to a second DRX group. The two DRX groups can have separate configurations at least for some DRX timers/parameters, but the DRX operations such as DRX Active Time for the DRX groups can be coupled across the two DRX groups. For example, certain triggers on the first DRX group can extend the DRX Active Time on the second DRX group or on both DRX groups. The scheduled cell and the scheduling cell can be in same or different frequency ranges.

For another example, an embodiment, described in greater detail below, denoted as E-2 describes DRX groups that include scheduling and scheduled cell(s) from different frequency ranges. Here, the UE can be configured with two or more DRX groups, such that a scheduled cell and a corresponding scheduling cell are always within a same DRX group, regardless of an operating frequency band/range for each of the cells. In other words, the UE does not expect to be configured with a DRX group that includes only one of a scheduled cell and a corresponding scheduling cell. The scheduled cell and the scheduling cell can be in same or different frequency ranges.

For another example, an embodiment, described in greater detail below, denoted as E-3 describes separate DRX configuration for scheduled cell(s) from scheduling cell(s). For a UE that is configured with cross-carrier scheduling for at least one serving cell, the UE can be provided separate DRX configurations for scheduling cell(s) and corresponding scheduled cell(s). A separate DRX configuration can include separate configuration of legacy DRX parameters/timers, or configuration of separate DRX parameters/timers for scheduled cell(s) compared to scheduling cell(s), including new non-legacy DRX parameters/timers for scheduled cell(s). A scheduled cell and a corresponding scheduling cell can be in same or different DRX groups, or in same or different frequency ranges.

For another example, an embodiment, described in greater detail below, denoted as E-4 describes application of timers corresponding to HARQ processes for a scheduled cell when the scheduled and scheduling cells are in two different DRX groups. For a UE that is configured with two DRX groups, wherein a scheduling cell and a corresponding scheduled cell belong to two different DRX groups, when the UE receives a PDSCH or transmits a PUSCH on the scheduled cell, the UE can apply a time duration for PDCCH monitoring for HARQ retransmission of the PDSCH/PUSCH to both DRX groups or only to one of the DRX groups, such as a DRX group corresponding to the scheduling cell (where UE monitors the PDCCH). The scheduled cell and the scheduling cell can be in same or different frequency ranges.

For another example, an embodiment, described in greater detail below, denoted as E-5 describes application of DRX-inactivity timer corresponding to PDCCH monitoring for a scheduled cell when the scheduled and scheduling cells are in two different DRX groups. For a UE that is configured with two DRX groups, wherein a scheduling cell and a corresponding scheduled cell belong to two different DRX groups, when the UE receives a PDCCH that indicates a new uplink (DL)/uplink (UL) transmission on the scheduled cell, the UE can start/restart DRX-inactivity timers for both DRX groups or only for one of the DRX groups, such as a DRX group corresponding to the scheduling cell (where UE monitors the PDCCH). The scheduled cell and the scheduling cell can be in same or different frequency ranges.

For another example, an embodiment, described in greater detail below, denoted as E-6 describes scheduling request operation for a UE with two DRX groups. For a UE that is configured with two DRX groups, when DRX Active Time of a first DRX group is extended due to a pending Scheduling Request (SR) that is sent on PUCCH, the UE can consider a PDCCH received on a serving cell from the second DRX group to address the trigger for the SR, cancel the pending SR, and stop the DRX Active Time on the first DRX group.

Embodiments of the present disclosure also describes enhancements for cross-carrier scheduling operation in a carrier aggregation (CA) framework.

Embodiments of the present disclosure take into consideration that in legacy 5G NR systems, carrier indicator field (CIF) is a main tool to enable cross-carrier scheduling, so that a PDCCH on a second/scheduling cell can scheduled PDSCH or PUSCH on a first/scheduled cell. Accordingly, when the UE detects a DCI format on the second/scheduling cell that includes a CIF, the UE determines whether the DCI format is self-carrier scheduling a PDSCH/PUSCH on the second cell, by receiving CIF=0, or is cross-carrier scheduling a PDSCH/PUSCH on the first cell, by receiving another CIF value different from 0 based on higher layer configuration. For example, a UE can be configured with up to 8 scheduled cells for a scheduling cell, and a CIF of 3 bits can be used to indicate a scheduled cell. In addition, legacy 5G NR systems consider a single scheduling cell for each serving/scheduled cell.

In some scenarios, it is beneficial to support a serving cell with two or more scheduling cells. Rel-17 dynamic spectrum sharing (DSS) supports configuration of a special/scheduling secondary cell (SCell), referred to as special/secondary cell (sSCell), that can be used for cross-carrier scheduling PDSCH or PUSCH on the primary cell (PCell). The PCell can be also self-carrier scheduled by the PCell. The PCell is not allowed to provide cross-carrier scheduling for any other cell. Similar consideration can be applied to SCells as well, due to power saving or traffic/interference management reasons, so that an SCell can be configured with two or more scheduling cells.

In certain embodiments, a UE (such as the UE 116) expects a single DCI format size for a scheduled/serving cell. Such UE behavior is expected regardless of the number of scheduling cell, including when a first cell (such as the PCell) is scheduled by the first cell (e.g., the PCell) itself as well as by a second cell (such as the sSCell). Since the DCI formats used on the sSCell to schedule the PCell will include a CIF, the corresponding DCI formats used on the PCell to schedule PDSCH or PUSCH on the PCell should also include a CIF in order to avoid exceeding the DCI size limit for the PCell. One solution is to update the DCI size alignment procedure. A simpler solution is to directly include a same number of 'CIF' bits in the DCI formats used for self-carrier scheduling on the PCell, so that non-fallback DCI formats on PCell include a same number of CIF bits as corresponding non-fallback DCI formats on sSCell that are used for sSCell to P(S)Cell scheduling.

However, if the added number of 'CIF' bits in DCI formats for self-scheduling on a first cell (that has no other scheduled cells) are set to a fixed value, they will be wasted resources in the DCI format. The UE can use such added number of 'CIF' bits for various signaling purposes.

On the other hand, for a UE that is configured multiple scheduling cells for a single scheduled/serving cell, it is beneficial to support the flexibility to activate/deactivate some of the scheduling cells based on scheduling/traffic or power saving needs. It is also beneficial to support the flexibility to handle temporary deteriorating links on the scheduling cells, for example, due to UE mobility, beam failure or radio link failure, interference, cell loading, and so on, without reconfiguring or deactivating the corresponding scheduling cell(s). In addition, it is beneficial to support adaptation of PDCCH monitoring on the scheduling cells, for example, by search space set group (SSSG) switching mechanism, so that the UE can detect different DCI formats (such as fallback DCI formats versus no-fallback DCI formats) depending on the which scheduling cell(s) are 'active' for scheduling the first cell, for example the PCell.

Therefore, embodiments of the present disclosure take into consideration that there is a need to avoid wasting of CIF bits in a DCI format on a first cell (such as the PCell) that is configured only for self-scheduling on the first cell but has no other scheduled cells.

Embodiments of the present disclosure also take into consideration that there is a need to indicate whether a second cell (such as the sSCell) that is configured as a scheduling cell for the first cell (such as the PCell) is 'active' for cross-carrier scheduling on the first cell, so that the UE can (or cannot) monitor PDCCH on the second cell for scheduling PDSCH or PUSCH on the first cell.

Embodiments of the present disclosure further take into consideration that there is a need to have efficient signaling mechanisms for SSSG switching or for SCell activation/deactivation/dormancy indication in case of enhanced cross-carrier scheduling with two or more scheduling cells for a scheduled cell.

It is beneficial to connect the above needs for a simple and efficient signaling of PDCCH monitoring aspects for such an enhanced cross-carrier scheduling framework using the added CIF bits in the non-fallback DCI formats on the first cell.

Accordingly, embodiments of the present disclosure describe methods and apparatus for enhanced cross-carrier scheduling, such as by (implicit) indication of 'active' scheduling cell(s) or SSSG switching or SCell activation/deactivation/dormancy based on CIF values in non-fallback DCI formats for self-scheduling on a cell that has no other scheduled cells.

The UE can be provided a mapping between CIF values in non-fallback DCI formats on the P(S)Cell for the P(S)Cell scheduling and indications for activation/deactivation of 'scheduling from sSCell to P(S)Cell' and for SSSG switching on the P(S)Cell. For example, when the sSCell is an activated serving cell CIF=0 can indicate that 'scheduling from sSCell to P(S)Cell' is activated, so the UE can monitor PDCCH on the sSCell in addition to the P(S)Cell, for scheduling on the P(S)Cell. The UE monitors PDCCH on the P(S)Cell according to a SSSG with group index 0 (e.g., mostly fallback DCI formats). For example, when the sSCell is an activated serving cell, CIF=1 can indicate that 'scheduling from sSCell to P(S)Cell' is deactivated, so the UE can monitor PDCCH only on the P(S)Cell for scheduling on the P(S)Cell. The UE monitors PDCCH on the P(S)Cell according to a SSSG with group index 1 (e.g., both fallback and non-fallback DCI formats).

For example, when the sSCell is deactivated or is switched to a dormant bandwidth part (BWP) CIF=0 can indicate that the UE monitors PDCCH on the P(S)Cell according to a SSSG with group index 0 (e.g., mostly fallback DCI formats). For another example, when the sSCell is deactivated or is switched to a dormant BWPCIF=1 can indicate that the UE monitors PDCCH on the P(S)Cell according to a SSSG with group index 1 (e.g., both fallback and non-fallback DCI formats).

One motivation for this disclosure is enhanced cross-carrier scheduling operation for operating in NR-LTE coexistence in frequency bands below 6 GHz, referred to as FR1, respectively.

Embodiments of the disclosure are summarized in the following and are fully elaborated further below. Combinations of the embodiments are also applicable, but they are not described in detail for brevity.

For another example, an embodiment, described in greater detail below, denoted as E-7 describes using CIF of DCI format(s) for self-scheduling on a first cell that is not a scheduling cell for another cell to indicate a second cell as an additional 'active' scheduling cell for the first cell. For example, when the UE is: (i) configured cross-carrier scheduling from second cell(s) to a first cell, in addition to self-scheduling on the first cell, (ii) not configured scheduling on any serving cell from the first cell, and (iii) configured to monitor PDCCH candidates according to search space sets on the first cell for detection of DCI format(s) for scheduling on the first cell that include a CIF, then the UE can be provided a mapping among values of the CIF in the DCI format(s) for self-carrier scheduling on the first cell and indication(s) whether or not to monitor PDCCH on a cell from the second cell(s) for scheduling on the first cell. The mapping can be by higher layer configuration or can be predetermined in the specifications for system operation.

For another example, an embodiment, described in greater detail below, denoted as E-7-1 describes using CIF of DCI format(s) for self-scheduling on a first cell that is not a scheduling cell for another cell to indicate activation/deactivation/dormancy for other serving cells, including second cell(s) that are scheduling cell(s) for the first cell. For example, when the UE is: (i) configured cross-carrier scheduling from second cell(s) to a first cell, in addition to self-scheduling on the first cell, (ii) not configured to schedule any serving cell from the first cell, and (iii) configured to monitor PDCCH candidates according to search space sets on the first cell for detection of DCI format(s) for scheduling on the first cell that include a CIF, then the UE can use CIF values in such DCI format(s) for activation/deactivation or dormancy indication of (other) serving cells, including the second cell(s). The UE can be provided a mapping among CIF values in the DCI format(s) for self-carrier scheduling on the first cell and indication(s) for SCell activation/deactivation or SCell dormancy (other) serving cells, including the second cell(s).

For another example, an embodiment, described in greater detail below, denoted as E-8 describes using CIF of DCI format(s) for self-scheduling on a first cell that is not a scheduling cell for another cell to indicate SSSG switching for the first cell or for a second cell that is an additional scheduling cell for the first cell. For example, when the UE is: (i) configured cross-carrier scheduling from second cell(s) to a first cell, in addition to self-scheduling on the first cell, and (ii) not configured scheduling on any other serving cell from the first cell, and (iii) configured to monitor PDCCH candidates according to search space sets on the first cell for detection of DCI format(s) for scheduling on the first cell that include a CIF, and (iv) configured SSSGs on the first cell and/or on the second cell(s), then the UE can be provided a mapping among CIF values in the DCI format(s) for self-carrier scheduling on the first cell and trigger states for SSSG switching on the first cell or the second cell(s).

For another example, an embodiment, described in greater detail below, denoted as E-8-1 describes using CIF of DCI format(s) for self-scheduling on a first cell that is not a scheduling cell for another cell to indicate SSSG switching for the first cell or for a second cell that is an additional scheduling cell for the first cell. For example, when the UE is: (i) configured cross-carrier scheduling from second cell(s) to a first cell, in addition to self-scheduling on the first cell, and (ii) not configured scheduling on any other serving cell from the first cell, and (iii) configured to monitor PDCCH candidates according to search space sets on the first cell for detection of DCI format(s) for scheduling on the first cell that include a CIF, and (iv) configured SSSGs on the first cell and/or on the second cell(s), then the UE can be provided a mapping among CIF values in the DCI format(s) for self-carrier scheduling on the first cell and trigger states that indicate (separately or) jointly both of: (i) 'active/activated' scheduling cell(s) for the first cell or 'inactive/deactivated' scheduling cell(s) for the first cell, or activation/deactivation for the second cell(s), or dormancy/non-dormancy for the second cell(s), and (ii) SSSG switching on the first cell and/or on the second cell(s).

For another example, an embodiment, described in greater detail below, denoted as E-9 describes CIF mapping for SCell indication/activation or SSSG switching in case of 'compact' DCI formats with 1-2 bits for CIF. For example, when a 'compact' DCI format, such as DCI format 0_2 or 1_2, with a bit-width of 1 or 2 bit for the CIF is used for indication or activation of second cell(s) that is/are configured for cross-carrier scheduling of a first cell, or for SSSG switching on the first cell or the second cell(s), the UE can be provided with a 'compact' mapping among CIF values and indications for activation/determination of second cell(s) and/or for SSSG switching or determination. Herein, a 'compact' CIF mapping is a subset of a 'normal' CIF mapping that is provided for a 'normal' DCI format, such as DCI format 0_1 and 1_1, with 3 bits of CIF.

For another example, an embodiment, described in greater detail below, denoted as E-10 describes timeline aspects for SCell activation/deactivation/dormancy or SSSG switching on the PCell/sSCell(s) using CIF mapping. For example, when a UE determines SCell activation/deactivation/dormancy or SSSG switching, based on a CIF value in a DCI format for self-scheduling on a first cell, as described in embodiments E-7 and E-7-1 or embodiments E-8 and E-8-1, the UE performs the corresponding action at a (first) slot that is (at least): (i) M symbols/slots after the last symbol of the PDCCH with the DCI format for self-scheduling on the first cell, or (ii) K symbols/slots after transmission of a HARQ-ACK information feedback corresponding to a PDSCH on the first cell that corresponds to a PDCCH with the DCI format for self-scheduling.

Throughout the present disclosure, the term "configuration" or "higher layer configuration" and variations thereof (such as "configured" and so on) are used to refer to one or more of: a system information signaling such as by a master information block (MIB) or a SIB (such as SIB1), a common or cell-specific higher layer/RRC signaling, or a dedicated or UE-specific or BWP-specific higher layer/RRC signaling.

Throughout the present disclosure, the term signal quality is used to refer to e.g. Reference Signal Received Power (RSRP), Reference Signal Received quality (RSRQ), received signal strength indicator (RSSI) or signal to noise ratio (SNR) or Signal to Interference and Noise Ratio (SINR), with or without filtering such as L1 or L3 filtering, of a channel or a signal such as a reference signal (RS) including Synchronization signal (SS) physical broadcast channel (PBCH) (also denoted as SS/PBCH block (SSB)), channel state information (CSI) reference signal (RS) (also referred to as CSI-RS), or sounding reference signal (SRS).

An antenna port is defined such that the channel over which a symbol on the antenna port is conveyed can be inferred from the channel over which another symbol on the same antenna port is conveyed.

For demodulation Reference Signal (DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group is quasi co-located with respect to Doppler shift, Doppler spread, average delay, delay spread, and spatial Rx. The UE may also assume that DM-RS ports associated with a PDSCH are quasi co-located (QCL) with QCL Type A, Type D (when applicable) and average gain. The UE may further assume that no DM-RS collides with the SS/PBCH block.

A UE (such as the UE 116) can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-co-location (QCL) relationship between one or two downlink reference signals and the DM-RS ports of the PDSCH, the DM-RS port of PDCCH or the CSI-RS port(s) of a CSI-RS resource. The quasi-co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values: (i) 'QCL-TypeA': {Doppler shift, Doppler spread, average delay, delay spread}, (ii) 'QCL-TypeB': {Doppler shift, Doppler spread}, (iii) 'QCL-TypeC': {Doppler shift, average delay}, and (iv) 'QCL-TypeD': {Spatial Rx parameter}.

The UE receives a MAC control element (MAC-CE) activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration $\mu$.

If a UE (such as the UE 116) is configured with a secondary cell group (SCG), the UE can/shall apply UE procedures for both master cell group (MCG) and SCG. When the UE procedures are applied for MCG, the terms 'secondary cell', 'secondary cells', 'serving cell', 'serving cells' refer to secondary cell, secondary cells, serving cell, serving cells belonging to the MCG respectively. When the UE procedures are applied for SCG, the terms 'secondary cell', 'secondary cells', 'serving cell', 'serving cells' refer to secondary cell, secondary cells (not including primary secondary cell (PSCell)), serving cell, serving cells belonging to the SCG respectively. The term 'primary cell' refers to the PSCell of the SCG.

In CA, two or more Component Carriers (CCs) are aggregated. A UE may simultaneously receive or transmit on one or multiple CCs depending on its capabilities. For example, a UE with single timing advance capability for CA can simultaneously receive and/or transmit on multiple CCs corresponding to multiple serving cells sharing the same timing advance (multiple serving cells grouped in one TAG). A UE with multiple timing advance capability for CA can simultaneously receive and/or transmit on multiple CCs corresponding to multiple serving cells with different timing advances (multiple serving cells grouped in multiple TAGs). NG-RAN ensures that each TAG contains at least one serving cell. A non-CA capable UE can receive on a single CC and transmit on a single CC corresponding to one serving cell only (one serving cell in one TAG).

CA is supported for both contiguous and non-contiguous CCs. When CA is deployed frame timing and system frame number (SFN) are aligned across cells that can be aggregated, or an offset in multiples of slots between the PCell/PSCell and an SCell is configured to the UE. The maximum number of configured CCs for a UE is 16 for DL and 16 for UL.

In case of CA, the multi-carrier nature of the physical layer is only exposed to the MAC layer for which one HARQ entity is required per serving cell as depicted on FIGS. 6.7-1 and 6.7-2 below. In both uplink and downlink, there is one independent HARQ entity per serving cell and one transport block is generated per assignment/grant per serving cell in the absence of spatial multiplexing. Each transport block and its potential HARQ retransmissions are mapped to a single serving cell.

When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the PCell. Depending on UE capabilities, SCells can be configured to form together with the PCell a set of serving cells. The configured set of serving cells for a UE therefore always consists of one PCell and one or more SCells.

The reconfiguration, addition and removal of SCells can be performed by RRC. At intra-NR handover and during connection resume from RRC_INACTIVE, the network can also add, remove, keep, or reconfigure SCells for usage with the target PCell. When adding a new SCell, dedicated RRC signaling is used for sending all required system information of the SCell i.e., while in connected mode, UEs need not acquire broadcast system information directly from the SCells.

Cross-carrier scheduling with the CIF allows the PDCCH of a serving cell to schedule resources on another serving cell but with the following restrictions: (i) cross-carrier scheduling does not apply to PCell i.e. PCell is always scheduled via its PDCCH; (ii) when an SCell is configured with a PDCCH, that cell's PDSCH and PUSCH are always scheduled by the PDCCH on this SCell; (iii) when an SCell is not configured with a PDCCH, that SCell's PDSCH and PUSCH are always scheduled by a PDCCH on another serving cell; (iv) the scheduling PDCCH and the scheduled PDSCH/PUSCH can use the same or different numerologies.

Some of the restrictions above may be relaxed. For example, DSS can provide a useful migration path from LTE to NR by allowing LTE and NR to share the same carrier. As the number of NR devices in a network increase, it is important that sufficient scheduling capacity for NR UEs on the shared carriers is ensured. In the case of DSS operation, PDCCH enhancements for cross-carrier scheduling including can be considered such that PDCCH of an SCell, referred to as a special/scheduling SCell (sSCell), can schedule PDSCH or PUSCH on the P(S)Cell.

For another example, DSS allows LTE and NR to share the same carrier. As the number of NR devices in a network increase, it is important that sufficient scheduling capacity for NR UEs on the shared carriers is ensured. In the case of DSS operation, PDCCH enhancements for cross-carrier scheduling including can be considered such that PDCCH of an SCell, referred to as a sSCell, can schedule PDSCH or PUSCH on the P(S)Cell. Therefore, the first restriction above can be modified as follows: (i) when cross-carrier scheduling from an SCell to PCell is not configured, PCell can only be scheduled via its PDCCH; (ii) when cross-carrier scheduling from an SCell to PCell is configured, PDCCH on that SCell can schedule PCell's PDSCH and PUSCH, and PDCCH on the PCell can also schedule PCell's PDSCH and PUSCH, and PDCCH on PCell cannot schedule PDSCH and PUSCH on any other cell. Only one SCell can be configured to be used for cross-carrier scheduling to PCell.

Even the latter restriction may be relaxed, wherein multiple SCells can be configured to be used for cross-carrier scheduling to PCell, wherein a subset with one or more SCell(s) from the multiple SCells are 'active' scheduling cell(s) for scheduling on the PCell. Therefore, PDCCH on the subset of one or more SCell(s) can schedule PCell's PDSCH and PUSCH.

In another variation, configuration and/or 'activation' of multiple scheduling cells can apply not only to the PCell, but also to other SCell(s).

In certain embodiments, the PDCCH can be used to schedule DL transmissions on PDSCH and UL transmissions on PUSCH, where the DCI on PDCCH includes: (i) downlink assignments containing at least modulation and coding format, resource allocation, and hybrid-ARQ information related to DL-SCH; and (ii) uplink scheduling grants containing at least modulation and coding format, resource allocation, and hybrid-ARQ information related to UL-SCH.

In addition to scheduling, PDCCH can be used to for: (i) activation and deactivation of configured PUSCH transmission with configured grant; (ii) activation and deactivation of PDSCH semi-persistent transmission; (iii) notifying one or more UEs of the slot format; (iv) notifying one or more UEs of the PRB(s) and OFDM symbol(s) where the UE may assume no transmission is intended for the UE; (v) transmission of TPC commands for PUCCH and PUSCH; (vi) transmission of one or more TPC commands for SRS transmissions by one or more UEs; (vii) switching a UE's active bandwidth part; (viii) initiating a random access procedure; (ix) indicating the UE(s) to monitor the PDCCH during the next occurrence of the DRX on-duration; (x) in IAB context, indicating the availability for soft symbols of an IAB-DU; (xii) triggering one shot HARQ-ACK codebook feedback. Additionally, for operation with shared spectrum channel access: (i) triggering search space set group switching; (ii) indicating one or more UEs about the available RB sets and channel occupancy time duration; (iii) indicating downlink feedback information for configured grant PUSCH (CG-DFI).

A UE can monitor a set of PDCCH candidates in the configured monitoring occasions in one or more configured COntrol REsource SETs (CORESETs) according to the corresponding search space configurations.

A CORESET consists of a set of PRBs with a time duration of 1 to 3 OFDM symbols. The resource units Resource Element Groups (REGs) and Control Channel Elements (CCEs) are defined within a CORESET with each CCE consisting of a set of REGs. Control channels are formed by aggregation of CCE. Different code rates for the control channels are realized by aggregating different number of CCE. Interleaved and non-interleaved CCE-to-REG mapping are supported in a CORESET.

Polar coding and QPSK modulation are used for PDCCH. Each resource element group carrying PDCCH carries its own DM-RS.

A UE monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

A set of PDCCH candidates for a UE to monitor is defined in terms of PDCCH search space sets. A search space set can be a common search space (CSS) set or a UE-specific search space (USS) set. A UE monitors PDCCH candidates in one or more of the following search spaces sets: (i) a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a system information RNTI (SI-RNTI) on the primary cell of the MCG; (ii) a Type0A-PDCCH CSS set configured by searchSpaceOtherSystemInformation in PDCCH-ConfigCommon for a DCI format with CRC scrambled by a SI-RNTI on the primary cell of the MCG; (iii) a Type1-PDCCH CSS set configured by ra-SearchSpace in PDCCH-ConfigCommon for a DCI format with CRC scrambled by a Random access RNTI (RA-RNTI), a MsgB-RNTI, or a Temporary cell RNTI (TC-RNTI) on the primary cell; (iv) a Type2-PDCCH CSS set configured by pagingSearchSpace in PDCCH-ConfigCommon for a DCI format with CRC scrambled by a Paging RNTI (P-RNTI) on the primary cell of the MCG; (v) a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, cell-RNTI (C-RNTI), modulation and coding scheme (MSC) cell- RNTI (MCS-C-RNTI), configured scheduling-RNTI (CS-RNTI(s)), or power savings-RNTI (PS-RNTI); and (vi) a USS set configured by SearchSpace in PDCCH-Config with searchSpaceType=ue-Specific for DCI formats with CRC scrambled by C-RNTI, MCS-C-RNTI, special cell—CSI-RNTI (SP-CSI-RNTI), CS-RNTI(s), SL-RNTI, SL-CS-RNTI, or SL Semi-Persistent Scheduling V-RNTI.

For a DL BWP, if a UE (such as the UE 116) is not provided searchSpaceSIB1 for Type0-PDCCH CSS set by PDCCH-ConfigCommon, the UE does not monitor PDCCH candidates for a Type0-PDCCH CSS set on the DL BWP. If the active DL BWP and the initial DL BWP have same SCS and same cyclic prefix (CP) length and the active DL BWP includes all RBs of the CORESET with index 0, or the active DL BWP is the initial DL BWP, the CORESET configured for Type0-PDCCH CSS set has CORESET index 0 and the Type0-PDCCH CSS set has search space set index 0.

For a DL BWP, if a UE is not provided searchSpaceOtherSystemInformation for Type0A-PDCCH CSS set, the UE does not monitor PDCCH for Type0A-PDCCH CSS set on the DL BWP.

For a DL BWP, if a UE is not provided ra-SearchSpace for Type1-PDCCH CSS set, the UE does not monitor PDCCH for Type1-PDCCH CSS set on the DL BWP. If the UE has not been provided a Type3-PDCCH CSS set or an USS set and the UE has received a C-RNTI and has been provided a Type1-PDCCH CSS set, the UE monitors PDCCH candidates for DCI format 0_0 and DCI format 1_0 with CRC scrambled by the C-RNTI in the Type1-PDCCH CSS set.

If a UE is not provided pagingSearchSpace for Type2-PDCCH CSS set, the UE does not monitor PDCCH for Type2-PDCCH CSS set on the DL BWP.

If a UE is provided a zero value for searchSpaceID in PDCCH-ConfigCommon for a Type0/0A/2-PDCCH CSS set, the UE determines monitoring occasions for PDCCH candidates of the Type0/0A/2-PDCCH CSS set, and the UE is provided a C-RNTI, the UE monitors PDCCH candidates only at monitoring occasions associated with a SS/PBCH block, where the SS/PBCH block is determined by the most recent of: (i) a MAC CE activation command indicating a TCI state of the active BWP that includes a CORESET with index 0, where the TCI-state includes a CSI-RS which is quasi-co-located with the SS/PBCH block, or (ii) a random access procedure that is not initiated by a PDCCH order that triggers a contention-free random access procedure.

If a UE (such as the UE 116) monitors PDCCH candidates for DCI formats with CRC scrambled by a C-RNTI and the UE is provided a non-zero value for searchSpaceID in PDCCH-ConfigCommon for a Type0/0A/2-PDCCH CSS set, the UE determines monitoring occasions for PDCCH candidates of the Type0/0A/2-PDCCH CSS set based on the search space set associated with the value of searchSpaceID.

The UE may assume that the DM-RS antenna port associated with PDCCH receptions in the CORESET configured by pdcch-ConfigSIB1 in MIB, the DM-RS antenna port associated with corresponding PDSCH receptions, and the corresponding SS/PBCH block are quasi co-located with respect to average gain, quasi co-location 'typeA' and 'typeD' properties, when applicable, if the UE is not provided a TCI state indicating quasi co-location information of the DM-RS antenna port for PDCCH reception in the CORESET. The value for the DM-RS scrambling sequence initialization is the cell ID. A SCS is provided by subCarrierSpacingCommon in MIB.

For single cell operation or for operation with carrier aggregation in a same frequency band, a UE does not expect to monitor a PDCCH in a Type0/0A/2/3-PDCCH CSS set or in a USS set if a DM-RS for monitoring a PDCCH in a Type1-PDCCH CSS set is not configured with same qcl-Type set to 'typeD' properties with a DM-RS for monitoring the PDCCH in the Type0/0A/2/3-PDCCH CSS set or in the USS set, and if the PDCCH or an associated PDSCH overlaps in at least one symbol with a PDCCH the UE monitors in a Type1-PDCCH CSS set or with an associated PDSCH.

If a UE (such as the UE 116) is provided with (i) one or more search space sets by corresponding one or more of searchSpaceZero, searchSpaceSIB1, searchSpaceOtherSystemInformation, pagingSearchSpace, ra-SearchSpace, and (ii) a C-RNTI, an MCS-C-RNTI, or a CS-RNTI, then the UE monitors PDCCH candidates for DCI format 0_0 and DCI format 1_0 with CRC scrambled by the C-RNTI, the MCS-C-RNTI, or the CS-RNTI in the one or more search space sets in a slot where the UE monitors PDCCH candidates for at least a DCI format 0_0 or a DCI format 1_0 with CRC scrambled by SI-RNTI, RA-RNTI, MsgB-RNTI, or P-RNTI.

If a UE is provided with (i) one or more search space sets by corresponding one or more of searchSpaceZero, searchSpaceSIB1, searchSpaceOtherSystemInformation, pagingSearchSpace, ra-SearchSpace, or a CSS set by PDCCH-Config, and (ii) a SI-RNTI, a P-RNTI, a RA-RNTI, a MsgB-RNTI, a SFI-RNTI, an INT-RNTI, a TPC-PUSCH-RNTI, a TPC-PUCCH-RNTI, or a TPC-SRS-RNTI, then, for a RNTI from any of these RNTIs, the UE does not expect to process information from more than one DCI format with CRC scrambled with the RNTI per slot.

For each DL BWP configured to a UE in a serving cell, the UE is provided by higher layers with S≤10, search space sets where, for each search space set from the S search space sets, the UE is provided the following by SearchSpace: (i) a search space set index s, 0<s<40, by searchSpaceId; (ii) an association between the search space set s and a CORESET p by controlResourceSetId or by controlResourceSetId-v1610; (iii) a PDCCH monitoring periodicity of $k_s$ slots and a PDCCH monitoring offset of $o_s$ slots, by monitoringSlotPeriodicityAndOffset; (iv) a PDCCH monitoring pattern within a slot, indicating first symbol(s) of the CORESET within a slot for PDCCH monitoring, by monitoringSymbolsWithinSlot; (v) a duration of $T_s<k_s$ slots indicating a number of slots that the search space set s exists by duration; (vi) a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively; (vii) an indication that search space set s is either a CSS set or a USS set by searchSpaceType. Additionally, if search space set s is a CSS set (i) an indication by dci-Format0-0-AndFormat1-0 to monitor PDCCH candidates for DCI format 0_0 and DCI format 1_0; (ii) an indication by dci-Format2-0 to monitor one or two PDCCH candidates, or to monitor one PDCCH candidate per RB set if the UE is provided freqMonitorLocations for the search space set, for DCI format 2_0 and a corresponding CCE aggregation level; (iii) an indication by dci-Format2-1 to monitor PDCCH candidates for DCI format 2_1; (iv) an indication by dci-Format2-2 to monitor PDCCH candidates for DCI format 2_2; (v) an indication by dci-Format2-3 to monitor PDCCH candidates for DCI format 2_3; (vi) an indication by dci-Format2-4 to monitor PDCCH candidates for DCI format 2_4; (vii) an indication by dci-Format2-6 to monitor PDCCH candidates for DCI format 2_6. If search space set s is a USS set, an indication by dci-Formats to monitor PDCCH candidates either for DCI format 0_0 and DCI format 1_0, or for DCI format 0_1 and DCI format 1_1, or an indication by dci-FormatsExt to monitor PDCCH candidates for DCI format 0_2 and DCI format 1_2, or for DCI format 0_1, DCI format 1_1, DCI format 0_2, and DCI format 1_2, or an indication by dci-FormatsSL to monitor PDCCH candidates for DCI format 0_0 and DCI format 1_0, or for DCI format 0_1 and DCI format 1_1, or for DCI format 3_0, or for DCI format 3_1, or for DCI format 3_0 and DCI format 3_1. A bitmap by freqMonitorLocations, if provided, to indicate an index of one or more RB sets for the search space set s, where the most significant bit (MSB) k in the bitmap corresponds to RB set k−1 in the DL BWP. For RB set k indicated in the bitmap, the first PRB of the frequency domain monitoring location confined within the RB set is given by $RB_{s0+k,DL}^{start,\mu} + N_{RB}^{offset}$, where $RB_{s0+k,DL}^{start,\mu}$ is the index of first common RB of the RB set k, and $N_{RB}^{offset}$ is provided by rb-Offset or $N_{RB}^{offset}=0$ if rb-Offset is not provided. For each RB set with a corresponding value of 1 in the bitmap, the frequency domain resource allocation pattern for the monitoring location is determined based on the first $N_{RBG,set\ 0}^{size}$ bits in frequencyDomainResources provided by the associated CORESET configuration.

If the monitoringSymbolsWithinSlot indicates to a UE to monitor PDCCH in a subset of up to three consecutive symbols that are same in every slot where the UE monitors PDCCH for all search space sets, the UE does not expect to be configured with a PDCCH SCS other than 15 kHz if the subset includes at least one symbol after the third symbol.

A UE does not expect to be provided a first symbol and a number of consecutive symbols for a CORESET that results to a PDCCH candidate mapping to symbols of different slots.

A UE does not expect any two PDCCH monitoring occasions on an active DL BWP, for a same search space set or for different search space sets, in a same CORESET to be separated by a non-zero number of symbols that is smaller than the CORESET duration.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^\mu$ in a frame with number $n_f$ if $(n_f N_{slot}^{frame,\mu} + n_{s,f}^\mu - o_s)\ mod\ k_s = 0$. The UE monitors PDCCH candidates for search space set s for $T_s$ consecutive slots, starting from slot $n_{s,f}^\mu$, and does not monitor PDCCH candidates for search space set s for the next $k_s - T_s$ consecutive slots.

A USS at CCE aggregation level $L \in \{1, 2, 4, 8, 16\}$ is defined by a set of PDCCH candidates for CCE aggregation level L.

If a UE is configured with CrossCarrierSchedulingConfig for a serving cell the carrier indicator field value corresponds to the value indicated by CrossCarrierSchedulingConfig.

For an active DL BWP of a serving cell on which a UE monitors PDCCH candidates in an USS, if the UE is not configured with a carrier indicator field, the UE monitors the PDCCH candidates without carrier indicator field. For an active DL BWP of a serving cell on which a UE monitors PDCCH candidates in an USS, if a UE is configured with a carrier indicator field, the UE monitors the PDCCH candidates with carrier indicator field.

A UE does not expect to monitor PDCCH candidates on an active DL BWP of a secondary cell if the UE is configured to monitor PDCCH candidates with carrier indicator field corresponding to that secondary cell in another serving cell. For the active DL BWP of a serving cell on which the UE monitors PDCCH candidates, the UE monitors PDCCH candidates at least for the same serving cell.

For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are described in Equation (1), below.

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad (1)$$

As described in Equation (1), $Y_{p,n_{s,f}^\mu}=0$ for any CSS. Additionally, for a USS, $Y_{p,n_{s,f}^\mu}=(A_p \cdot Y_{p,n_{s,f}^\mu-1})\ mod\ D$, $Y_{p,-1}=n_{RNTI} \neq 0$, $A_p=39827$ for pmod3=0, $A_p=39829$ for pmod3=1, $A_p=39839$ for pmod3=2, and D=65537. As described in Equation (1), i=0, . . . , L−1. The expression $N_{CCE,p}$ is the number of CCEs, numbered from 0 to $N_{CCE,p}-1$, in CORESET p and, if any, per RB set. The expression, $n_{CI}$ is the carrier indicator field value if the UE is configured with a carrier indicator field by CrossCarrierSchedulingConfig for the serving cell on which PDCCH is monitored; otherwise, including for any CSS, $n_{CI}=0$. The expression $m_{s,n_{CI}}=0, \ldots , M_{s,n_{CI}}^{(L)}-1$, where $M_{s,n_{CI}}^{(L)}$ is the number of PDCCH candidates the UE is configured to monitor for aggregation level L of a search space set s for a serving cell corresponding to $n_{CI}$. As described in Equation (1), $M_{s,max}^{(L)}=M_{s,0}^{(L)}$ for any CSS. For a USS, $M_{s,max}^{(L)}$ is the maximum of $M_{s,n_{CI}}^{(L)}$ over all configured $n_{CI}$ values for a CCE aggregation level L of search space set s. The RNTI value used for $n_{RNTI}$ is the C-RNTI. A UE does not expect to be provided freqMonitorLocations for a search space set s in a serving cell if intraCellGuardBandsDL-List indicates that no intra-cell guard-bands are configured for the serving cell.

In certain embodiments, a UE that: (i) is configured for operation with carrier aggregation, and (ii) indicates support of search space sharing through searchSpaceSharingCA-UL or through searchSpaceSharingCA-DL, and (iii) has a PDCCH candidate with CCE aggregation level L in CORESET p for a first DCI format scheduling PUSCH transmission or UL grant Type 2 PUSCH release, other than DCI format 0_0, or for a second DCI format scheduling PDSCH reception or semi-persistent scheduling (SPS) PDSCH release or indicating SCell dormancy or indicating a request for a Type-3 HARQ-ACK codebook report without scheduling PDSCH, other than DCI format 1_0, having a first size and associated with serving cell $n_{CI,2}$, can receive the following. In this example, the UE can receive a corresponding PDCCH through a PDCCH candidate with CCE aggregation level L in CORESET p for a first DCI format or for a second DCI format, respectively, having a second size and associated with serving cell $n_{CI,1}$ if the first size and the second size are same.

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for the corresponding active DL BWP.

A UE does not expect to detect, in a same PDCCH monitoring occasion, a DCI format with CRC scrambled by a SI-RNTI, RA-RNTI, MsgB-RNTI, TC-RNTI, P-RNTI, C-RNTI, CS-RNTI, or MCS-RNTI and a DCI format with CRC scrambled by a SL-RNTI or a SL-CS-RNTI for scheduling respective PDSCH reception and PUSCH transmission on a same serving cell.

To enable reasonable UE battery consumption when CA is configured, an activation/deactivation mechanism of Cells is supported. When an SCell is deactivated, the UE does not need to receive the corresponding PDCCH or PDSCH, cannot transmit in the corresponding uplink, nor is it required to perform channel quality indicator (CQI) measurements. Conversely, when an SCell is active, the UE shall receive PDSCH and PDCCH (if the UE is configured to monitor PDCCH from this SCell) and is expected to be able to perform CQI measurements. NG-RAN ensures that while PUCCH SCell (a Secondary Cell configured with PUCCH) is deactivated, SCells of secondary PUCCH group (a group of SCells whose PUCCH signaling is associated with the PUCCH on the PUCCH SCell) should not be activated. NG-RAN ensures that SCells mapped to PUCCH SCell are deactivated before the PUCCH SCell is changed or removed.

When reconfiguring the set of serving cells: (i) SCells added to the set are initially activated or deactivated; (ii) SCells which remain in the set (either unchanged or reconfigured) do not change their activation status (activated or deactivated). At handover or connection resume from RRC_INACTIVE: SCells are activated or deactivated.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

To enable reasonable UE battery consumption when BA is configured, only one UL BWP for each uplink carrier and one DL BWP or only one DL/UL BWP pair can be active at a time in an active serving cell, all other BWPs that the UE is configured with being deactivated. On deactivated BWPs, the UE does not monitor the PDCCH, does not transmit on PUCCH, physical random-access channel (PRACH) and UL-SCH.

To enable fast SCell activation when CA is configured, one dormant BWP can be configured for an SCell. If the active BWP of the activated SCell is a dormant BWP, the UE stops monitoring PDCCH and transmitting SRS/PUSCH/PUCCH on the SCell but continues performing CSI measurements, automatic gain control (AGC) and beam management, if configured. A DCI is used to control entering/leaving the dormant BWP for one or more SCell(s) or one or more SCell group(s).

The dormant BWP is one of the UE's dedicated BWPs configured by network via dedicated RRC signaling. The SpCell and PUCCH SCell cannot be configured with a dormant BWP.

The PDCCH monitoring activity of the UE in RRC connected mode is governed by DRX, BA, and DCI with Cyclic Redundancy Check (CRC) scrambled by Power saving (power savings) radio network temporary identifier (RNTI) PS-RNTI DCI with CRC scrambled by PS-RNT (DCP). Herein, PS-RNTI is used to determine if the UE needs to monitor PDCCH on the next occurrence of the connected mode DRX on-duration.

When DRX is configured, the UE does not have to continuously monitor PDCCH. DRX is characterized by the following. 'On-duration' corresponds to a duration that the UE waits for, after waking up, to receive PDCCHs. If the UE successfully decodes a PDCCH, the UE stays awake and starts the inactivity timer. An 'inactivity-timer' corresponds to a duration that the UE waits to successfully decode a PDCCH, from the last successful decoding of a PDCCH, failing which it can go back to sleep. The UE shall restart the inactivity timer following a single successful decoding of a PDCCH for a first transmission only (i.e., not for retransmissions). A 'retransmission-timer' indicates a duration until a retransmission can be expected. A 'cycle' specifies the periodic repetition of the on-duration followed by a possible period of inactivity. An 'active-time' total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

When BA is configured, the UE only has to monitor PDCCH on the one active BWP i.e., it does not have to monitor PDCCH on the entire DL frequency of the cell. A BWP inactivity timer (independent from the DRX inactivity-timer described above) is used to switch the active BWP to the default one: the timer is restarted upon successful PDCCH decoding and the switch to the default BWP takes place when it expires.

In addition, the UE may be indicated, when configured accordingly, whether it is required to monitor or not the PDCCH during the next occurrence of the on-duration by a DCP monitored on the active BWP. If the UE does not detect a DCP on the active BWP, it does not monitor the PDCCH during the next occurrence of the on-duration, unless it is explicitly configured to do so in that case.

A UE can only be configured to monitor DCP when connected mode DRX is configured, and at occasion(s) at a configured offset before the on-duration. More than one monitoring occasion can be configured before the on-duration. The UE does not monitor DCP on occasions occurring during active-time, measurement gaps, BWP switching, or when it monitors response for a CFRA preamble transmission for beam failure recovery, in which case it monitors the PDCCH during the next on-duration. If no DCP is configured in the active BWP, UE follows normal DRX operation.

When CA is configured, DCP is only configured on the PCell.

One DCP can be configured to control PDCCH monitoring during on-duration for one or more UEs independently.

Power saving in RRC_IDLE and RRC_INACTIVE can also be achieved by UE relaxing neighbour cells RRM measurements when it meets the criteria determining it is in low mobility and/or not at cell edge.

UE power saving may be enabled by adapting the DL maximum number of MIMO layers by BWP switching.

Power saving is also enabled during active-time via cross-slot scheduling, which facilitates UE to achieve power saving with the assumption that it won't be scheduled to receive PDSCH, triggered to receive A-CSI or transmit a PUSCH scheduled by the PDCCH until the minimum scheduling offsets K0 and K2. Dynamic adaptation of the minimum scheduling offsets K0 and K2 is controlled by PDCCH.

dual active protocol stack (DAPS) Handover refers to a handover procedure that maintains the source gNB connection after reception of RRC message for handover and until releasing the source cell after successful random access to the target gNB.

A MAC entity is defined per cell group, one for the MCG and one for the SCG. Two MAC entities can be considered for a UE when the UE is configured with DAPS handover: one for the source cell (source MAC entity) and one for the target cell (target MAC entity).

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements in REF5. When in RRC-_CONNECTED state, if DRX is configured, for all the activated Serving Cells, the MAC entity may monitor the PDCCH discontinuously using the DRX operation specified in this clause; otherwise, the MAC entity shall monitor the PDCCH as specified in REF3.

RRC controls DRX operation by configuring the following parameters: drx-onDurationTimer: the duration at the beginning of a DRX cycle; drx-SlotOffset: the delay before starting the drx-onDurationTimer; drx-InactivityTimer: the duration after the PDCCH occasion in which a PDCCH indicates a new UL or DL transmission for the MAC entity; drx-RetransmissionTimerDL (per DL HARQ process except for the broadcast process): the maximum duration until a DL retransmission is received; drx-RetransmissionTimerUL (per UL HARQ process): the maximum duration until a grant for UL retransmission is received; drx-LongCycleStartOffset: the Long DRX cycle and drx-StartOffset which defines the subframe where the Long and Short DRX cycle starts; drx-ShortCycle (optional): the Short DRX cycle; drx-ShortCycleTimer (optional): the duration the UE shall follow the Short DRX cycle; drx-HARQ-RTT-TimerDL (per DL HARQ process except for the broadcast process): the minimum duration before a DL assignment for HARQ retransmission is expected by the MAC entity; drx-HARQ-RTT-TimerUL (per UL HARQ process): the minimum duration before a UL HARQ retransmission grant is expected by the MAC entity; ps-Wakeup (optional): the configuration to start associated drx-onDurationTimer in case DCP is monitored but not detected; ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started; and ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The field secondaryDRX-GroupConfig is used to indicate whether the SCell belongs to the secondary DRX group.

All serving cells in the secondary DRX group shall belong to one Frequency Range and all serving cells in the legacy DRX group shall belong to another Frequency Range. Such cell-group-specific/FR-specific configuration for DRX groups can be beneficial, for example, to allow for a more flexible configuration of DRX parameters for the UE, compared to a UE-specific configuration of DRX for all serving cells, or to further reduce the UE power consumption in mmWave/FR2, compared to frequency bands below 6 GHz/FR1, while maintaining a reasonable UE complexity.

Another alternative can be a cell-specific configuration of DRX parameters. Such configuration will provide more flexible operation, since different DRX-on/DRX-Active Times can be configured per cell according to the actual power consumption in different cells. However, such configuration may have higher overhead signaling, and may need additional UE behavior, for example, to handle carrier aggregation operation such as when DRX-on/DRX-Active Times across different cells may not be aligned.

The DRX parameters that are separately configured for each DRX group are: drx-onDurationTimer, drx-InactivityTimer. The network configures a drx-InactivityTimer value for the second DRX group that is smaller than the drx-InactivityTimer configured for the default DRX group in IE DRX-Config. In addition, the network configures a drx-onDurationTimer value for the second DRX group that is smaller than the drx-onDurationTimer configured for the default DRX group in IE DRX-Config.

The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

The network does not configure secondary DRX group with DCP simultaneously nor secondary DRX group with a dormant BWP simultaneously. In certain scenarios, such restrictions may be relaxed, so that secondary DRX group can be configured with DCP simultaneously, or secondary DRX group can be configured with a dormant BWP simultaneously.

For a serving cell configured with cross-carrier scheduling via CrossCarrierSchedulingConfig IE, if drx-ConfigSecondaryGroup is configured in the MAC-CellGroupConfig associated with the serving cell, the scheduling cell and the scheduled cell belong to the same Frequency Range, namely same DRX group.

When DRX is configured, the Active Time for Serving Cells in a DRX group includes the time while: (i) drx-onDurationTimer or drx-InactivityTimer configured for the DRX group is running; or (ii) drx-RetransmissionTimerDL or drx-RetransmissionTimerUL is running on any Serving Cell in the DRX group; or (iii) ra-ContentionResolutionTimer or msgB-ResponseWindow is running; or (iv) a Scheduling Request is sent on PUCCH and is pending; or (v) a PDCCH indicating a new transmission addressed to the C-RNTI of the MAC entity has not been received after successful reception of a Random Access Response for the Random Access Preamble not selected by the MAC entity among the contention-based Random Access Preamble.

When DRX is configured, the MAC entity can perform Syntax (1), as described before:

Syntax (1)
1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant and listen before talk (LBT) failure indication is not received from lower layers:
  2> start the drx-HARQ-RTT-TimerUL for the corresponding HARQ process in the first symbol after the end of the first transmission (within a bundle) of the corresponding PUSCH transmission;
   2> stop the drx-RetransmissionTimerUL for the corresponding HARQ process at the first transmission (within a bundle) of the corresponding PUSCH transmission.
1> if a drx-HARQ-RTT-TimerDL expires:
   2> if the data of the corresponding HARQ process was not successfully decoded:
      3> start the drx-RetransmissionTimerDL for the corresponding HARQ process in the first symbol after the expiry of drx-HARQ-RTT-TimerDL.
1> if a drx-HARQ-RTT-TimerUL expires:
   2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
   2> stop drx-onDurationTimer for each DRX group;
   2> stop drx-InactivityTimer for each DRX group.
1> if drx-InactivityTimer for a DRX group expires:
   2> if the Short DRX cycle is configured:
      3> start or restart drx-ShortCycleTimer for this DRX group in the first symbol after the expiry of drx-InactivityTimer;
      3> use the Short DRX cycle for this DRX group.
   2> else:
      3> use the Long DRX cycle for this DRX group.
1> if a DRX Command MAC CE is received:
   2> if the Short DRX cycle is configured:
      3> start or restart drx-ShortCycleTimer for each DRX group in the first symbol after the end of DRX Command MAC CE reception;
      3> use the Short DRX cycle for each DRX group.
   2> else:
      3> use the Long DRX cycle for each DRX group.
1> if drx-ShortCycleTimer for a DRX group expires:
   2> use the Long DRX cycle for this DRX group.
1> if a Long DRX Command MAC CE is received:
   2> stop drx-ShortCycleTimer for each DRX group;
   2> use the Long DRX cycle for each DRX group.
1> if the Short DRX cycle is used for a DRX group, and [(SFN×10)+subframe number] modulo (drx-ShortCycle)=(drx-StartOffset) modulo (drx-ShortCycle):
   2> start drx-onDurationTimer for this DRX group after drx-SlotOffset from the beginning of the subframe.
1> if the Long DRX cycle is used for a DRX group, and [(SFN×10)+subframe number] modulo (drx-LongCycle)=drx-StartOffset:
   2> if DCP monitoring is configured for the active DL BWP as specified in REF3:
      3> if DCP indication associated with the current DRX cycle received from lower layer indicated to start drx-onDurationTimer, as specified in REF3; or
      3> if all DCP occasion(s) in time domain, as specified in REF3, associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-ResponseWindow is running; or
      3> if ps-Wakeup is configured with value true and DCP indication associated with the current DRX cycle has not been received from lower layers:
         4> start drx-onDurationTimer after drx-SlotOffset from the beginning of the subframe.
   2> else:
      3> start drx-onDurationTimer for this DRX group after drx-SlotOffset from the beginning of the subframe.
NOTE 2: In case of unaligned SFN across carriers in a cell group, the SFN of the SpCell is used to calculate the DRX duration.
1> if a DRX group is in Active Time:
   2> monitor the PDCCH on the Serving Cells in this DRX group as specified in REF3 [6];
   2> if the PDCCH indicates a DL transmission:
      3> start the drx-HARQ-RTT-TimerDL for the corresponding HARQ process in the first symbol after the end of the corresponding transmission carrying the DL HARQ feedback;
   NOTE 3: When HARQ feedback is postponed by PDSCH-to-HARQ_feedback timing indicating a non-numerical/inapplicable k1 value, as specified in REF3, the corresponding transmission opportunity to send the DL HARQ feedback is indicated in a later PDCCH requesting the HARQ-ACK feedback.
      3> stop the drx-RetransmissionTimerDL for the corresponding HARQ process.
      3> if the PDSCH-to-HARQ_feedback timing indicate a non-numerical k1 value as specified in REF3 [6]:
         4> start the drx-RetransmissionTimerDL in the first symbol after the PDSCH transmission for the corresponding HARQ process.
   2> if the PDCCH indicates a UL transmission:
      3> start the drx-HARQ-RTT-TimerUL for the corresponding HARQ process in the first symbol after the end of the first transmission (within a bundle) of the corresponding PUSCH transmission;
      3> stop the drx-RetransmissionTimerUL for the corresponding HARQ process.
   2> if the PDCCH indicates a new transmission (DL or UL) on a Serving Cell in this DRX group:
      3> start or restart drx-InactivityTimer for this DRX group in the first symbol after the end of the PDCCH reception.
NOTE 3a: A PDCCH indicating activation of SPS or configured grant type 2 is considered to indicate a new transmission.
   2> if a HARQ process receives downlink feedback information and acknowledgment is indicated:
      3> stop the drx-RetransmissionTimerUL for the corresponding HARQ process.
1> if DCP monitoring is configured for the active DL BWP as specified in REF3; and
1> if the current symbol n occurs within drx-onDurationTimer duration; and
1> if drx-onDurationTimer associated with the current DRX cycle is not started:
   2> if the MAC entity would not be in Active Time considering grants/as signments/DRX Command MAC CE/Long DRX Command MAC CE received and Scheduling Request sent until 4 ms prior to symbol n when evaluating all DRX Active Time conditions as specified in this clause:
      3> not transmit periodic SRS and semi-persistent SRS;

3> not report semi-persistent CSI configured on PUSCH;
3> if ps-TransmitPeriodicL1-RSRP is not configured with value true:
   4> not report periodic CSI that is L1-RSRP on PUCCH.
3> if ps-TransmitOtherPeriodicCSI is not configured with value true:
   4> not report periodic CSI that is not L1-RSRP on PUCCH.
1> else:
   2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
      3> not transmit periodic SRS and semi-persistent SRS in this DRX group;
      3> not report CSI on PUCCH and semi-persistent CSI configured on PUSCH in this DRX group.
   2> if CSI masking (csi-Mask) is setup by upper layers:
      3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
      4> not report CSI on PUCCH in this DRX group.
NOTE 4: If a UE multiplexes a CSI configured on PUCCH with other overlapping UCI(s) according to the procedure specified in REF3 and this CSI multiplexed with other UCI(s) would be reported on a PUCCH resource either outside DRX Active Time of the DRX group in which this PUCCH is configured or outside the on-duration period of the DRX group in which this PUCCH is configured if CSI masking is setup by upper layers, it is up to UE implementation whether to report this CSI multiplexed with other UCI(s).

Regardless of whether the MAC entity is monitoring PDCCH or not on the Serving Cells in a DRX group, the MAC entity transmits HARQ feedback, aperiodic CSI on PUSCH, and aperiodic SRS on the Serving Cells in the DRX group when such is expected.

The MAC entity needs not to monitor the PDCCH if it is not a complete PDCCH occasion (e.g. the Active Time starts or ends in the middle of a PDCCH occasion).

In certain embodiments, a UE (such as the UE 116) can operate with PDCCH monitoring indication and dormancy/non-dormancy behaviour for SCells. A UE configured with DRX mode operation can be provided the following for detection of a DCI format 2_6 in a PDCCH reception on the PCell or on the SpCell: (i) a PS-RNTI for DCI format 2_6 by ps-RNTI, (ii) a number of search space sets, by dci-Format2-6, to monitor PDCCH for detection of DCI format 2_6 on the active DL BWP of the PCell or of the SpCell according to a common search space, (iii) a payload size for DCI format 2_6 by size-DCI-2-6, (iv) a location in DCI format 2_6 of a Wake-up indication bit by ps-PositionDCI-2-6, (v) a '0' value for the Wake-up indication bit, when reported to higher layers, indicates to not start the drx-onDurationTimer for the next long DRX cycle, (vi) a '1' value for the Wake-up indication bit, when reported to higher layers, indicates to start the drx-onDurationTimer for the next long DRX cycle, (vii) a bitmap, when the UE is provided a number of groups of configured SCells by dormancyGroupOutsideActiveTime. The bitmap location is immediately after the Wake-up indication bit location. The bitmap size is equal to the number of groups of configured SCells where each bit of the bitmap corresponds to a group of configured SCells from the number of groups of configured Scells. Additionally, a '0' value for a bit of the bitmap indicates an active DL BWP, provided by dormantBWP-Id, for the UE for each activated SCell in the corresponding group of configured Scells. Moreover, a '1' value for a bit of the bitmap indicates (i) an active DL BWP, provided by firstOutsideActiveTimeBWP-Id, for the UE for each activated SCell in the corresponding group of configured SCells, if a current active DL BWP is the dormant DL BWP (ii) a current active DL BWP, for the UE for each activated SCell in the corresponding group of configured SCells, if the current active DL BWP is not the dormant DL BWP. Here, the UE sets the active DL BWP to the indicated active DL BWP. It is noted that an offset by ps-Offset indicating a time, where the UE starts monitoring PDCCH for detection of DCI format 2_6 according to the number of search space sets, prior to a slot where the drx-onDurationTimer would start on the PCell or on the SpCell. For each search space set, the PDCCH monitoring occasions are the ones in the first $T_s$ slots indicated by duration, or $T_s$=1 slot if duration is not provided, starting from the first slot of the first $T_s$ slots and ending prior to the start of drx-onDurationTimer.

On PDCCH monitoring occasions associated with a same long DRX Cycle, a UE does not expect to detect more than one DCI format 2_6 with different values of the Wake-up indication bit for the UE or with different values of the bitmap for the UE.

The UE does not monitor PDCCH for detecting DCI format 2_6 during Active Time.

If a UE reports for an active DL BWP a MinTimeGap value that is X slots prior to the beginning of a slot where the UE would start the drx-onDurationTimer, the UE is not required to monitor PDCCH for detection of DCI format 2_6 during the X slots, where X corresponds to the MinTimeGap value of the SCS of the active DL BWP in Table (1), of REF3 below. Table (1) describes a minimum time gap value X.

TABLE 1

| SCS (kHz) | Minimum Time Gap X (slots) | |
|---|---|---|
| | Value 1 | Value 2 |
| 15 | 1 | 3 |
| 30 | 1 | 6 |
| 60 | 1 | 12 |
| 120 | 2 | 24 |

If a UE is provided search space sets to monitor PDCCH for detection of DCI format 2_6 in the active DL BWP of the PCell or of the SpCell and the UE detects DCI format 2_6, the physical layer of a UE reports the value of the Wake-up indication bit for the UE to higher layers REF5 for the next long DRX cycle.

If a UE is provided search space sets to monitor PDCCH for detection of DCI format 2_6 in the active DL BWP of the PCell or of the SpCell and the UE does not detect DCI format 2_6, the physical layer of the UE does not report a value of the Wake-up indication bit to higher layers for the next long DRX cycle.

If a UE is provided search space sets to monitor PDCCH for detection of DCI format 2_6 in the active DL BWP of the PCell or of the SpCell and the UE (i) is not required to monitor PDCCH for detection of DCI format 2_6, as described in Clauses 10, 11.1, 12, and in Clause 5.7 of [11, REF5] for all corresponding PDCCH monitoring occasions outside Active Time prior to a next long DRX cycle, or (ii) does not have any PDCCH monitoring occasions for detection of DCI format 2_6 outside Active Time of a next long DRX cycle, then the physical layer of the UE reports a value of 1 for the Wake-up indication bit to higher layers for the next long DRX cycle.

If a UE is provided search space sets to monitor PDCCH for detection of DCI format 0_1 and DCI format 1_1 and if one or both of DCI format 0_1 and DCI format 1_1 include a SCell dormancy indication field, the SCell dormancy indication field is a bitmap with size equal to a number of groups of configured SCells, provided by dormancyGroup-WithinActiveTime, each bit of the bitmap corresponds to a group of configured SCells from the number of groups of configured Scells, if the UE detects a DCI format 0_1 or a DCI format 1_1 that does not include a carrier indicator field, or detects a DCI format 0_1 or DCI format 1_1 that includes a carrier indicator field with value equal to 0, a '0' value for a bit of the bitmap indicates an active DL BWP, provided by dormantBWP-Id, for the UE for each activated SCell in the corresponding group of configured SCells, a '1' value for a bit of the bitmap indicates (i) an active DL BWP, provided by firstWithinActiveTimeBWP-Id, for the UE for each activated SCell in the corresponding group of configured SCells, if a current active DL BWP is the dormant DL BWP, (ii) a current active DL BWP, for the UE for each activated SCell in the corresponding group of configured SCells, if the current active DL BWP is not the dormant DL BWP. The UE sets the active DL BWP to the indicated active DL BWP If a UE is provided search space sets to monitor PDCCH for detection of DCI format 1_1, and if the CRC of DCI format 1_1 is scrambled by a C-RNTI or a MCS-C-RNTI, and if a one-shot HARQ-ACK request field is not present or has a '0' value, and if the UE detects a DCI format 1_1 on the primary cell that does not include a carrier indicator field, or detects a DCI format 1_1 on the primary cell that includes a carrier indicator field with value equal to 0, and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1, or resourceAllocation=dynamicSwitch and all bits of the frequency domain resource assignment field in DCI format 1_1 are equal to 0 or 1, then the UE considers the DCI format 1_1 as indicating SCell dormancy, not scheduling a PDSCH reception or indicating a SPS PDSCH release, and for transport block 1 interprets the sequence of fields of (i) modulation and coding scheme, (ii) new data indicator, (iii) redundancy version, and of (i) HARQ process number, (ii) antenna port(s), (iii) DM-RS sequence initialization, as providing a bitmap to each configured SCell, in an ascending order of the SCell index. Here, a '0' value for a bit of the bitmap indicates an active DL BWP, provided by dorrnantBWP-Id, for the UE for a corresponding activated SCell. Additionally, a '1' value for a bit of the bitmap indicates (i) an active DL BWP, provided by firstWithinActiveTimeBWP-Id, for the UE for a corresponding activated SCell, if a current active DL BWP is the dormant DL BWP, (ii) a current active DL BWP, for the UE for a corresponding activated SCell, if the current active DL BWP is not the dormant DL BWP. The UE sets the active DL BWP to the indicated active DL BWP If an active DL BWP provided by dormantBWP-Id for a UE on an activated SCell is not a default DL BWP for the UE on the activated SCell, as described in Clause 12, the BWP inactivity timer is not used for transitioning from the active DL BWP provided by dormantBWP-Id to the default DL BWP on the activated SCell.

A UE is expected to provide HARQ-ACK information in response to a detection of a DCI format 1_1 indicating SCell dormancy after N symbols from the last symbol of a PDCCH providing the DCI format 1_1. If processingType2Enabled of PDSCH-ServingCellConfig is set to enable for the serving cell with the PDCCH providing the DCI format 1_1, N=7 for $\mu=0$, N=7.5 for $\mu=1$, and N=15 for $\mu=2$; otherwise, N=14 for $\mu=0$, N=16 for $\mu=1$, N=27 for $\mu=2$, and N=31 for $\mu=3$, where $\mu$ is the smallest SCS configuration between the SCS configuration of the PDCCH providing the DCI format 1_1 and the SCS configuration of a PUCCH with the HARQ-ACK information in response to the detection of the DCI format 1_1.

In certain embodiments, a UE (such as the UE 116) can be provided a group index for a respective Type3-PDCCH CSS set or USS set by searchSpaceGroupIdList for PDCCH monitoring on a serving cell. If the UE is not provided searchSpaceGroupIdList for a search space set, the following procedures are not applicable for PDCCH monitoring according to the search space set.

If a UE is provided cellGroupsForSwitchList, indicating one or more groups of serving cells, the following procedures apply to all serving cells within each group; otherwise, the following procedures apply only to a serving cell for which the UE is provided searchSpaceGroupIdList.

In certain embodiments, when a UE is provided searchSpaceGroupIdList, the UE resets PDCCH monitoring according to search space sets with group index 0, if provided by searchSpaceGroupIdList.

A UE (such as the UE 116) can be provided by searchSpaceSwitchDelay a number of symbols $P_{switch}$ where a minimum value of $P_{switch}$ is provided in Table (2) for UE processing capability 1 and UE processing capability 2 and SCS configuration $\mu$. UE processing capability 1 for SCS configuration $\mu$ applies unless the UE indicates support for UE processing capability 2.

TABLE 2

| $\mu$ | Minimum $P_{switch}$ value for UE processing capability 1 [symbols] | Minimum $P_{switch}$ value for UE processing capability 2 [symbols] |
|---|---|---|
| 0 | 25 | 10 |
| 1 | 25 | 12 |
| 2 | 25 | 22 |

A UE can be provided, by searchSpaceSwitchTimer, a timer value for a serving cell that the UE is provided searchSpaceGroupIdList or, if provided, for a set of serving cells provided by cellGroupsForSwitchList. The UE decrements the timer value by one after each slot based on a reference SCS configuration that is the smallest SCS configuration $\mu$ among all configured DL BWPs in the serving cell, or in the set of serving cells. The UE maintains the reference SCS configuration during the timer decrement procedure.

If a UE is provided by SearchSpaceSwitchTrigger a location of a search space set group switching flag field for a serving cell in a DCI format 2_0 one of the following can occur. If the UE detects a DCI format 2_0 and a value of the search space set group switching flag field in the DCI format 2_0 is 0, the UE starts monitoring PDCCH according to search space sets with group index 0, and stops monitoring PDCCH according to search space sets with group index 1, for the serving cell at a first slot that is at least $P_{switch}$ symbols after the last symbol of the PDCCH with the DCI format 2_0. If the UE detects a DCI format 2_0 and a value of the search space set group switching flag field in the DCI format 2_0 is 1, the UE starts monitoring PDCCH according to search space sets with group index 1, and stops monitoring PDCCH according to search space sets with group index 0, for the serving cell at a first slot that is at least $P_{switch}$ symbols after the last symbol of the PDCCH with the DCI format 2_0, and the UE sets the timer value to the value provided by searchSpaceSwitchTimer. If the UE monitors PDCCH for a serving cell according to search space sets with group index 1, the UE starts monitoring PDCCH for the serving cell according to search space sets with group index 0, and stops monitoring PDCCH according to search space sets with group index 1, for the serving cell at the beginning of the first slot that is at least $P_{switch}$ symbols after a slot where the timer expires or after a last symbol of a remaining channel occupancy duration for the serving cell if indicated by DCI format 2_0.

If a UE is not provided SearchSpaceSwitchTrigger for a serving cell, one of the following can occur. If the UE detects a DCI format by monitoring PDCCH according to a search space set with group index 0, the UE starts monitoring PDCCH according to search space sets with group index 1, and stops monitoring PDCCH according to search space sets with group index 0, for the serving cell at a first slot that is at least $P_{switch}$ symbols after the last symbol of the PDCCH with the DCI format, the UE sets the timer value to the value provided by searchSpaceSwitchTimer if the UE detects a DCI format by monitoring PDCCH in any search space set. If the UE monitors PDCCH for a serving cell according to search space sets with group index 1, the UE starts monitoring PDCCH for the serving cell according to search space sets with group index 0, and stops monitoring PDCCH according to search space sets with group index 1, for the serving cell at the beginning of the first slot that is at least $P_{switch}$ symbols after a slot where the timer expires or, if the UE is provided a search space set to monitor PDCCH for detecting a DCI format 2_0, after a last symbol of a remaining channel occupancy duration for the serving cell if indicated by DCI format 2_0.

A UE (such as the UE 116) can determine a slot and a symbol in the slot to start or stop PDCCH monitoring according to search space sets for a serving cell that the UE is provided searchSpaceGroupIdList or, if cellGroupsFor-SwitchList is provided, for a set of serving cells, based on the smallest SCS configuration μ among all configured DL BWPs in the serving cell or in the set of serving cells and, if any, in the serving cell where the UE receives a PDCCH and detects a corresponding DCI format 2_0 triggering the start or stop of PDCCH monitoring according to search space sets.

A UE can be configured for scheduling on the primary cell from the primary cell and from a secondary cell. The UE is either not provided monitoringCapabilityConfig or the UE is provided only monitoringCapabilityConfig=r15monitoringcapability for scheduling on the primary cell from the primary cell and from the secondary cell. The UE is not provided coreset-PoolIndex on the primary cell or on the secondary cell.

The SCS configuration $\mu_P$ for the active DL BWP on the primary cell is smaller than or equal to the SCS configuration $\mu_S$ for the active DL BWP on the secondary cell.

Embodiments of the present disclosure can be applicable to NR specifications Rel-17/18 and beyond to provide cross-carrier scheduling across different DRX groups or different FRs. Such an approach can enable a flexible and enhanced CA operation for the UE, while maintaining a low UE power consumption, especially on FR2 serving cells.

The present disclosure enables an improved operation of 3GPP 5G NR system by enhancing CA operation across frequency bands below and above 6 GHz, referred to as FR1+FR2 CA operation, while jointly considering UE power saving enhancements. Additionally, the present disclosure enables an improved operation of 3GPP 5G NR system by enhancing cross-carrier scheduling in a CA framework. The embodiments are generic and can also apply to various frequency bands in different frequency ranges (FR) such as FR1, FR2, FR3, FR4, and FR2-2, e.g., low frequency bands such as below 1 GHz, mid frequency bands, such as 1-7 GHz, and high/millimeter frequency bands, such as 24-100 GHz and beyond. In addition, the embodiments are generic and can apply to various use cases and settings as well, such as single-panel UEs and multi-panel UEs, eMBB, URLLC and IIoT, mMTC and IoT, sidelink/V2X, operation with multi-TRP/beam/panel, operation in NR-U, NTN, aerial systems such as drones, operation with RedCap UEs, private or NPN, and so on.

The following embodiments of the present disclosure, denoted as E-1, describe baseline UE operation with cross-carrier scheduling across different DRX groups. This is described in the following examples and embodiments, such as those of FIG. 6.

Figure 6:
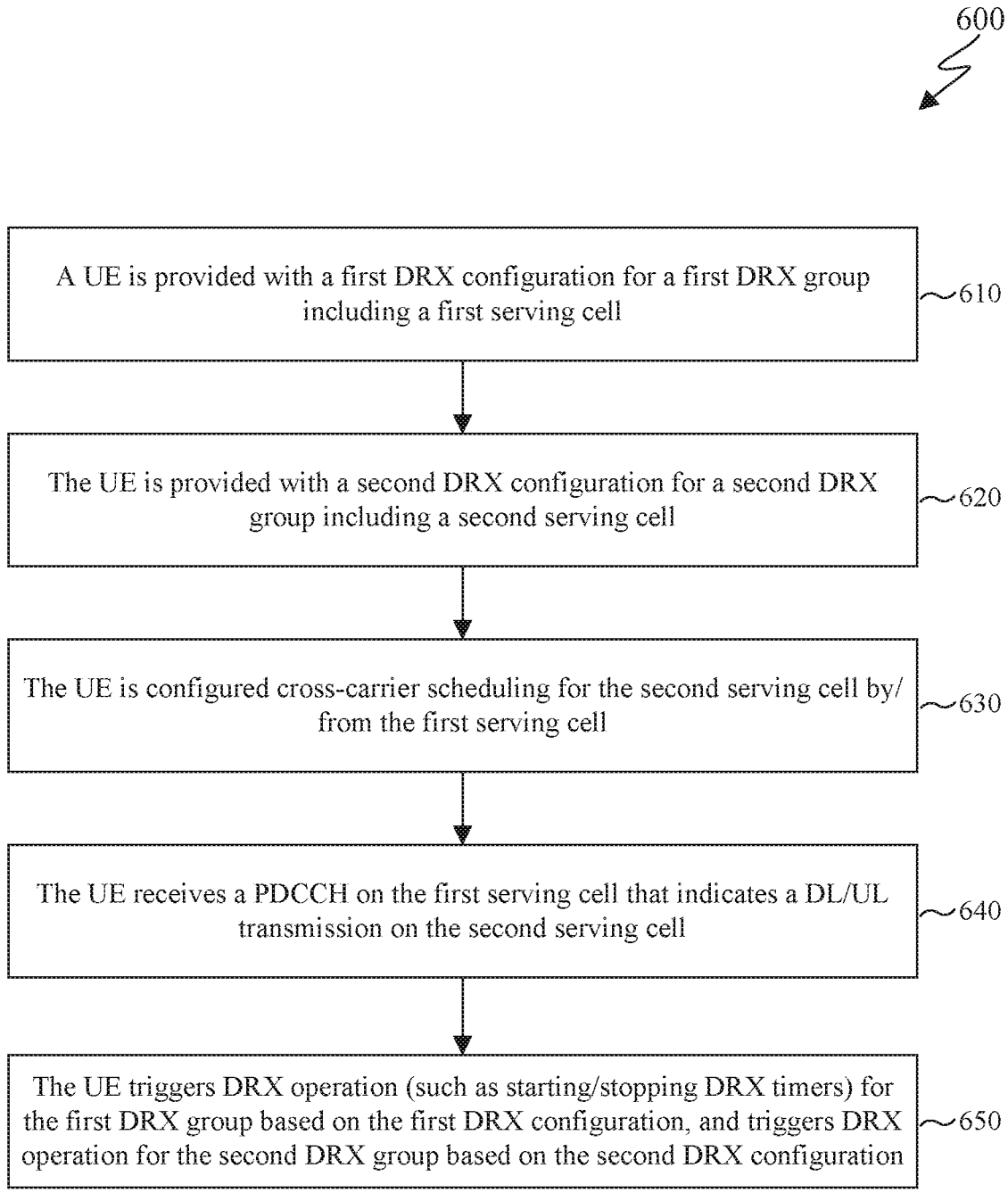
FIG. 6 illustrates a method for a baseline UE operation with cross-carrier scheduling across different DRX groups according to embodiments of the present disclosure.

FIG. 6 illustrates a method 600 for a baseline UE operation with cross-carrier scheduling across different DRX groups according to embodiments of the present disclosure. The steps of the method 600 of FIG. 6 can be performed by any of the UEs 111-119 of FIG. 1, such as the UE 116 of FIG. 3. The method 600 is for illustration only and other embodiments can be used without departing from the scope of the present disclosure.

In certain embodiments, a UE (such as the UE 116) can be configured with two DRX groups, such that a scheduling cell belongs to a first DRX group, and a corresponding scheduled cell belongs to a second DRX group. The two DRX groups can have separate configurations at least for some DRX timers/parameters, but the DRX operations such as DRX Active Time for the DRX groups can be coupled across the two DRX groups. For example, certain triggers on the first DRX group can extend the DRX Active Time on the second DRX group or on both DRX groups. The scheduled cell and the scheduling cell can be in same or different frequency ranges.

For example, different DRX groups can include separate configurations for DRX parameters drx-onDurationTimer and drx-InactivityTimer, while other DRX parameters are commonly configured to all DRX groups.

For example, when a UE monitors a PDCCH on a scheduling cell from a first DRX group that schedules a new PDSCH/PUSCH on a scheduled cell from a second DRX group, the UE starts or restarts drx-InactivityTimer on both DRX groups. However, the UE applies a first duration for drx-InactivityTimer on the first DRX group, and a second duration for drx-InactivityTimer on the second DRX group, based on the respective configurations for the two DRX groups. In one example, when the UE receives a PDCCH on the scheduling cell for the scheduled cell inside DRX Active Time of the first DRX group, the UE starts the drx-InactivityTimer on the scheduled cell (in addition to drx-InactivityTimer on the scheduling cell), even if the PDCCH is received outside DRX Active Time of the second DRX group.

For example, for each DL HARQ process on the scheduled cell except for the broadcast process, the UE operates a first drx-HARQ-RTT-TimerDL on the scheduled cell and a second drx-HARQ-RTT-TimerDL on the scheduling cell. Similar, the UE operates a first drx-RetransmissionTimerDL on the scheduled cell and a second drx-RetransmissionTimerDL on the scheduling cell.

For another example, for each UL HARQ process on the scheduled cell, the UE operates a first drx-HARQ-RTT-TimerUL on the scheduled cell and a second drx-HARQ-RTT-TimerUL on the scheduling cell. Similar, the UE operates a first drx-RetransmissionTimerUL on the scheduled cell and a second drx-RetransmissionTimerUL on the scheduling cell.

For example, if the UE: (i) receives a MAC PDU in a configured downlink assignment (an SPS PDSCH occasion) on a scheduled cell, or (ii) receives a PDCCH on the scheduling cell during DRX Active Time of the first DRX group and the PDCCH indicates a DL (PDSCH) reception on a corresponding scheduled cell, then, the UE: (i) starts the drx-HARQ-RTT-TimerDL for the corresponding HARQ process in the first symbol after the end of the corresponding transmission carrying the DL HARQ feedback on both the first DRX group and the second DRX group, and (ii) stops the drx-RetransmissionTimerDL for the corresponding HARQ process for both the first DRX group and the second DRX group.

For example, if the UE: (i)transmits a MAC PDU in a configured uplink grant (a CG PUSCH occasion) on a scheduled cell, or (ii) receives a PDCCH on the scheduling cell during DRX Active Time of the first DRX group and the PDCCH indicates an UL (PUSCH) transmission on a corresponding scheduled cell, then, the UE: (i) starts the drx-HARQ-RTT-TimerUL for the corresponding HARQ process in the first symbol after the end of the first transmission (within a bundle) of the corresponding PUSCH transmission on both the first DRX group and the second DRX group, and (ii) stops the drx-RetransmissionTimerUL for the corresponding HARQ process at the first transmission (within a bundle) of the corresponding PUSCH transmission.

For example, if a drx-HARQ-RTT-TimerDL corresponding to a DL HARQ process for the scheduled cell expires on the scheduled cell or the scheduling cell and if the data of the corresponding HARQ process was not successfully decoded on the scheduled cell, the UE starts the drx-RetransmissionTimerDL for the corresponding HARQ process on the scheduled cell or the scheduling cell in the first symbol after the expiry of respective drx-HARQ-RTT-TimerDL of the scheduled cell or the scheduling cell. If drx-HARQ-RTT-TimerDL and drx-RetransmissionTimerUL are commonly configured for the two DRX groups, then the expiry of drx-HARQ-RTT-TimerDL and the start of drx-RetransmissionTimerUL can occur at a same time for both DRX groups.

The method 600 as illustrated in FIG. 6 describes an example procedure for a baseline UE operation with cross-carrier scheduling across different DRX groups, wherein the PDCCH monitoring in one DRX group can extend the DRX Active Time on both DRX groups.

In step 610, a UE (such as the UE 116) is provided with a first DRX configuration for a first DRX group including a first serving cell. A DRX configuration includes configuration of DRX timers/parameters, and so on. In step 620, the UE is provided with a second DRX configuration for a second DRX group including a second serving cell. The second DRX configuration is different/separate from the first DRX configuration, so that at least some DRX parameters/timers are configured separately for each DRX group, while some DRX parameters/timers can be commonly configured for both DRX groups. In step 630, the UE is configured cross-carrier scheduling for the second serving cell by/from the first serving cell. In step 640, the UE receives a PDCCH on the first serving cell that indicates a DL/UL transmission on the second serving cell. The indication can be, for example, for a new/initial PDSCH/PUSCH transmission, for an activation of SPS PDSCH or Type-2 CG PUSCH, or for scheduling a HARQ retransmission of a PDSCH/PUSCH. In step 650, the UE triggers DRX operation (such as starting/restarting/stopping DRX timers) on the first DRX group based on the first DRX configuration, and triggers DRX operation on the second DRX group based on the second DRX configuration. For example, the UE starts/restarts the drx-InactivityTimer and stops drx-RetransmissionTimerDL or drx-RetransmissionTimerUL for both DRX groups. The UE can apply a first value/duration for a DRX timer on the first DRX group and apply a second value/duration for a corresponding DRX timer on the second DRX group.

Figure 9:
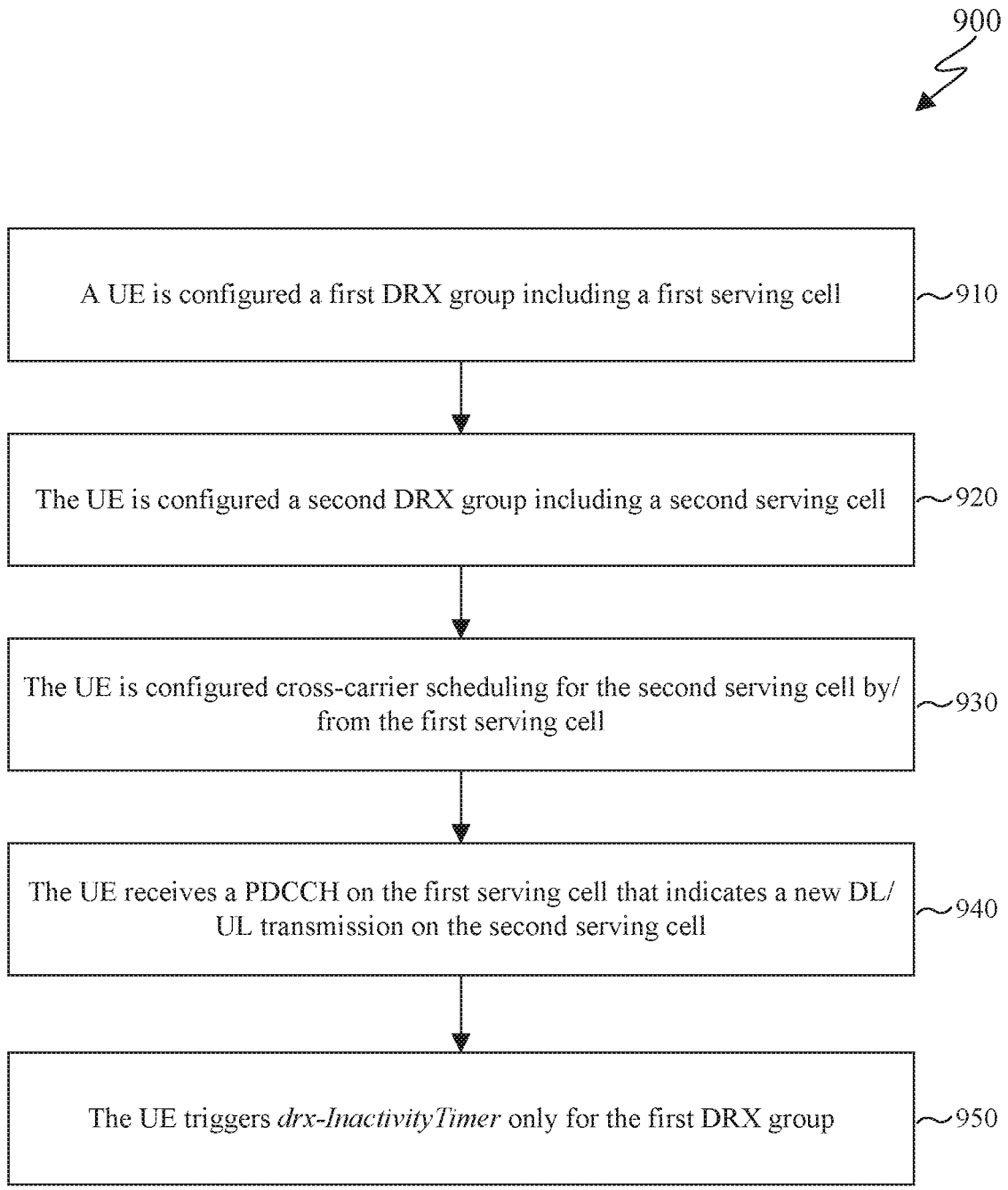
FIG. 9 illustrates a method for using a DRX-inactivity timer corresponding to physical downlink control channel (PDCCH) monitoring on a scheduling cell for a corresponding scheduled cell when the scheduled and scheduling cells are in two different DRX groups according to embodiments of the present disclosure.

Although FIG. 6 illustrates the method 600 various changes may be made to FIG. 9. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

The following embodiments of the present disclosure, denoted as E-2, describe DRX groups that include scheduling and scheduled cell(s) from different frequency ranges.

In certain embodiments, a UE (such as the UE 116) can be configured with two or more DRX groups, such that a scheduled cell and a corresponding scheduling cell are always within a same DRX group, regardless of an operating frequency band/range for each of the cells. In other words, the UE does not expect to be configured with a DRX group that includes only one of a scheduled cell and a corresponding scheduling cell. The scheduled cell and the scheduling cell can be in same or different frequency ranges.

For example, this embodiment applies only when both the scheduled cell and the scheduling cell belong to a same frequency range. In another example, this embodiment applies regardless of a respective frequency range for a scheduled cell or a scheduling cell. For example, a scheduled cell can belong to a first frequency range such as FR2, and a corresponding scheduling cell belongs to a second frequency range such as FR1, while both the scheduled cell and the scheduling cell belong to a same DRX group.

For another example, a DRX configuration can be cell-specific, so that the UE is configured with as many DRX groups as serving cells, that is, each DRX group is of size one. In another example, a DRX group can include a scheduling cell as well as any/all of the corresponding scheduled cell(s) that are cross-carrier scheduled by the scheduling cell. In other words, each DRX group can include only one scheduling cell. Therefore, a DRX group can be of size one or more than one. For example, a DRX group can be of size one when a serving cell is configured with self-scheduling and is not configured for cross-carrier scheduling of any other scheduled cell. In yet another example, if a scheduled cell is configured with two or more scheduling cells, in one option, the scheduled cell can belong to two or more DRX groups corresponding to the two or more scheduling cells. In another option, a DRX group can include two/multiple scheduling cells and the corresponding scheduled cells, if at least one scheduled cell from the corresponding scheduled cells is configured to be cross-carrier scheduled by two scheduling cells from the two/multiple scheduling cells.

For yet another example, different DRX groups can include separate configurations for DRX parameters drx-onDurationTimer, drx-InactivityTimer, while other DRX parameters are common to all DRX groups. In another example, some or all other DRX parameters can be also separately configured among different DRX groups, such as one or more of: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL. In one example, at least some DRX parameters are commonly configured among different DRX groups, for example, one or more of drx-SlotOffset, drx-LongCycleStartOffset, drx-ShortCycle (optional), drx-ShortCycleTimer (optional), so that at least start/end of DRX cycles are time aligned. In yet another example, some DRX parameters can have cell-specific configuration even within a same DRX group, such as one or more of: drx-RetransmissionTimerDL, drx-RetransmissionTimerUL, drx-HARQ-RTT-TimerDL, and drx-HARQ-RTT-TimerUL.

The following embodiments of the present disclosure, denoted as E-3, describe separate DRX configuration for scheduled cell(s) from scheduling cell(s). This is described in the following examples and embodiments, such as those of FIG. 7.

Figure 7:
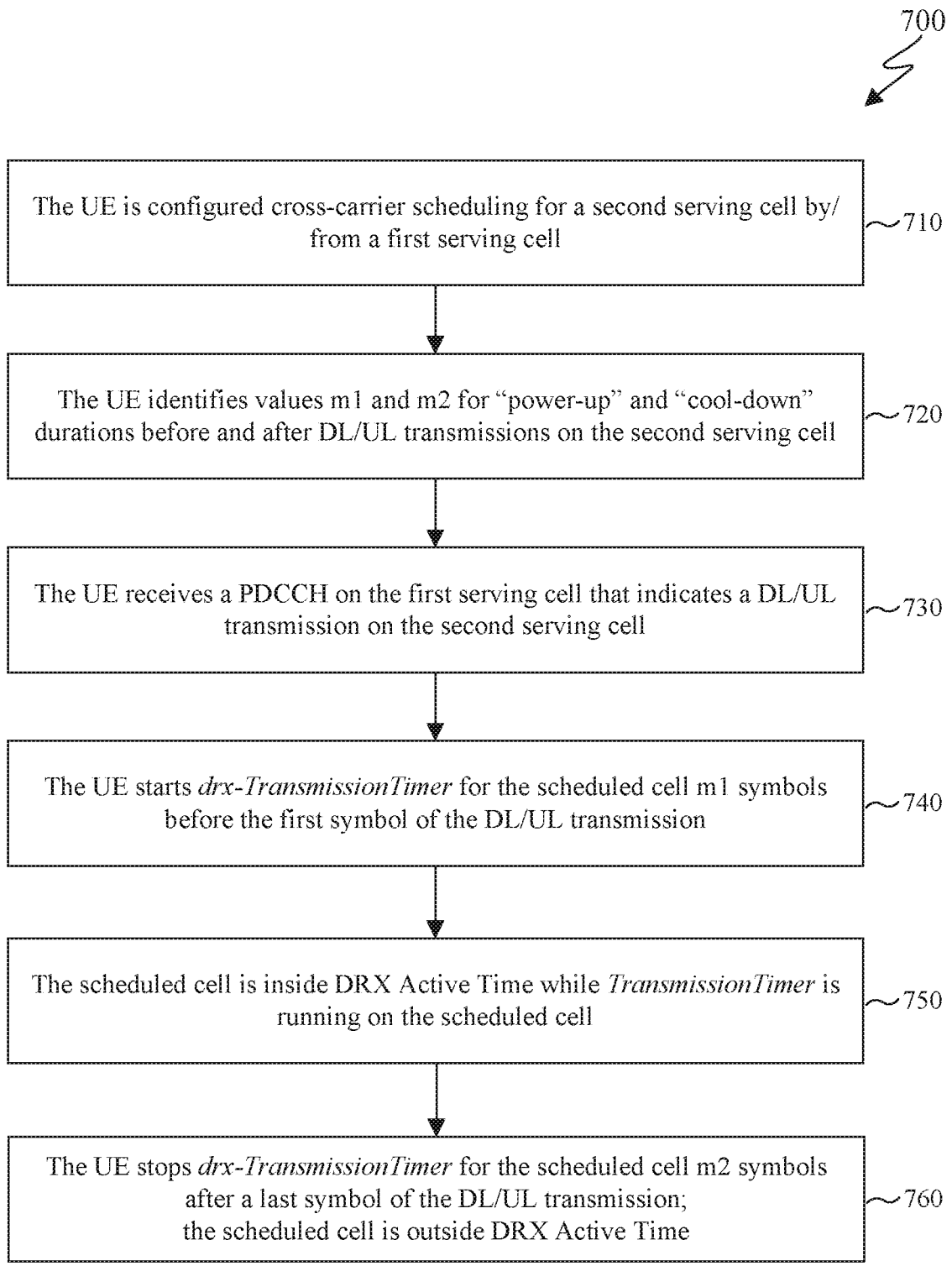
FIG. 7 illustrates a method for a separate discontinuous reception (DRX) configuration and timeline for scheduled cell(s) compared to scheduling cell(s) according to embodiments of the present disclosure.

FIG. 7 illustrates a method 700 for a separate DRX configuration and timeline for scheduled cell(s) compared to scheduling cell(s) according to embodiments of the present disclosure. The steps of the method 700 of FIG. 7 can be performed by any of the UEs 111-119 of FIG. 1, such as the UE 116 of FIG. 3. The method 700 is for illustration only and other embodiments can be used without departing from the scope of the present disclosure.

In certain embodiments, a UE (such as the UE 116) that is configured with cross-carrier scheduling for at least one serving cell, the UE can be provided separate DRX configurations for scheduling cell(s) and corresponding scheduled cell(s). A separate DRX configuration can include separate configuration of legacy DRX parameters/timers, or configuration of separate DRX parameters/timers for scheduled cell(s) compared to scheduling cell(s), including new non-legacy DRX parameters/timers for scheduled cell(s). A scheduled cell and a corresponding scheduling cell can be in same or different DRX groups, or in same or different frequency ranges.

In a first realization, the UE can be provided a first DRX configuration for a scheduling cell and a second DRX configuration for a corresponding scheduled cell, wherein the first and second DRX configurations share a same set of (legacy) DRX parameters/timers, but they have different value(s) configured for at least one DRX parameter/timer from the set of (legacy) DRX parameters/timers.

In a second realization, a DRX configuration for a scheduled cell can be based on new, non-legacy DRX parameters/timers that are not defined or configured for the scheduling cell. For example, a new drx-TransmissionTimer can be defined that includes a duration for a PDSCH/PUSCH transmission on the scheduled cell, possibly along with a time offset before and/or after such transmission.

In one example, the UE starts the drx-Transmission Timer in a first slot/symbol of the PDSCH/PUSCH transmission on the scheduled cell and stops the timer in a last slot/symbol of the PDSCH/PUSCH or in a first slot/symbol after the transmission of PDSCH/PUSCH. The UE determines the first or last slot/symbol based on a time-domain resource allocation (TDRA) for the PDSCH/PUSCH, such as a TDRA configured for a Type-1 CG PUSCH, or a TDRA that is indicated by a scheduling DCI format or by an activation DCI for an SPS PDSCH or a Type-2 CG PUSCH. Herein, a slot/symbol can be: (i) in a numerology of an active DL/UL BWP of the scheduled cell; or (ii) in a numerology of an active DL/UL BWP of the scheduling cell; or (iii) in a minimum/maximum of numerologies among the scheduled and scheduling cells; or (iv) a minimum/maximum among numerologies of first DRX group or second DRX group; or (v) a minimum/maximum among numerologies of all serving cells configured to the UE; or (vi) in a reference numerology, such as 15 kHz for FR1, and 60 kHz for FR2.

For another example, the UE starts a drx-Transmission-Timer in a number 'm1' slots/symbols before a first slot/symbol of the PDSCH/PUSCH transmission on the scheduled cell and stops the timer in a number 'm2' slots/symbols after a last slot/symbol of the PDSCH/PUSCH transmission. For example, 'm1' and 'm2' can capture a time duration for a UE to "warm up" or "warm down" before and after a PDSCH/PUSCH transmission, so that the UE can power-up and cool-down for the corresponding transmission. Values for 'm1' and 'm2' can be: (i) predetermined in the specifications for system operation, or (ii) configured by higher layers; or (iii) based on corresponding UE capabilities for power-up and cool-down the scheduled cell; or (iv) based on configured/indicted values for K0 (time offset between PDCCH-to-PDSCH) or K2 (time offset between PDCCH-to-PUSCH), such as a fraction of the configured/indicated value(s) for K0 or K2; or (v) based on UE capability values for a time gap N0 between PDCCH-to-PDSCH or a time gap N2 between PDCCH-to-PUSCH, such as a fraction of the reported value(s) for N0 or N2; or (vi) based on a UE processing time, such as $T_{proc,1}$ for PDSCH preparation time or $T_{proc,2}$ for PUSCH preparation time, or variants thereof for example with some parameters zeroed out such as those considered in REF3, or a fraction thereof. It is noted that the parameters $T_{proc,1}$ and $T_{proc,2}$ in turn depend on UE processing capability as considered in REF4.

Values for 'm1' and 'm2' can depend on a numerology for respective active BWP(s) of the scheduled or scheduling cell or can depend on an operating frequency range for the scheduled cell or the scheduling cell. In one example, values for 'm1' and 'm2' can be based on: (i) a numerology for an active DL/UL BWP of the scheduled cell, or (ii) a numerology for an active DL/UL BWP of the scheduling cell, or (iii) a minimum/maximum among numerologies of the scheduled and scheduling cell, or (iv) a minimum/maximum among numerologies of first DRX group or second DRX group, or (v) a minimum/maximum among numerologies of all serving cells configured to the UE, or (vi) a reference numerology, such as 15 kHz for FR1, and 60 kHz for FR2.

For example, values for 'm1' and 'm2' can be same or different for PDSCH compared to PUSCH.

For example, if the UE receives a PDCCH that indicates a new DL/UL transmission such as a PDSCH or PUSCH, and the UE reception/decoding time for the PDCCH is in a slot/symbol that is after a starting slot/symbol necessary for "warming-up" the scheduled cell, for example a PDCCH reception is in a slot/symbol that is after 'm1' slots/symbols before a first slot/symbol of the PDSCH reception or PUSCH transmission on the scheduled cell, then: (i) in one alternative, the UE is not expected to receive the PDSCH or transmit the PUSCH; or (ii) in another alternative, the UE starts drx-TransmissionTimer in the same slot/symbol in which the UE receives/decodes the PDCCH, and warms up the scheduled cell for PDSCH reception or PUSCH transmission.

For example, if a DCI format such as a DCI format 2_1 for preemption indication or a DCI format 2_4 for uplink cancellation indication indicates that the UE needs to cancel a PDSCH or a PUSCH, the UE does not start or, if already started, stops the drx-TransmissionTimer. (This enhancement can be applied more generally, even for a legacy DRX configuration. For example, the UE can stop or pause some legacy timers such as one or more of DRX-inactivity or drx-RetransmissionTimerUL or drx-RetransmissionTimerUL when the UE receives a DCI format 2_1 or 2_4.)

For example, such a new drx-TransmissionTimer can be the only timer that defines a DRX Active Time for a scheduled cell. For example, a scheduled cell can be defined to be in DRX Active Time when the drx-TransmissionTimer is started/running and is not expired. Such operation can be beneficial, for example, when the UE does not expect to receive a PDCCH on the scheduled cell, including a PDCCH that includes a DCI format for purposes other than indication of DL/UL transmission, such as a DCI format 0_x or 1_x repurposed for beam indication or for sSCell activation/deactivation or for power saving or for scheduling cell indication and so on, or a DCI format 2_x for group-control signaling via a PDCCH in a common search space.

For another example, in addition to such a new drx-TransmissionTimer, one or more timer(s) from the legacy timers, such as drx-onDurationTimer, can be still applicable to a scheduled cell. For example, a scheduled cell can be defined to be in DRX Active Time when at least one of drx-TransmissionTimer or drx-onDurationTimer is started/running and is not expired. In another example, a scheduled cell can be defined to be in DRX Active Time when both drx-TransmissionTimer and drx-onDurationTimer are started/running and are not expired. In yet another example, all legacy timers/parameters are applicable to a scheduled cell, and drx-TransmissionTimer is an additional applicable timer.

For example, the UE applies some legacy DRX command (s) to a scheduled cell, regardless of whether or not one/some/all legacy timers are applied to the scheduled cell. For example, one or more of: drx-ShortCycle, DRX Command MAC CE, or Long DRX Command MAC CE can still apply to a scheduled cell.

For example, a scheduled cell can belong to a DRX group that includes one or more serving cell(s), and the UE determines a single common DRX Active Time for all serving cells in the DRX group, based on drx-TransmissionTimer configured for the scheduled cell(s) and other legacy DRX timers/parameters configured for the serving cells in the DRX group. In another example, a scheduled cell can belong to a DRX group that include one or more serving cell(s), but a DRX Active Time that the UE determines for the scheduled cell based on drx-TransmissionTimer, possibly in combination with other legacy DRX timers/parameters, can be separate/independent from a DRX Active Time for a DRX group to which the scheduled cell belongs. For example, a DRX Active Time for the scheduling cell can be shorter than a DRX Active Time for other serving cell(s) in the DRX group. In yet another example, the UE does not expect the scheduled cell to be configured in a DRX group that includes any other cells, that is, a scheduled cell belongs to a separate DRX group of size one (only the scheduled cell).

The method 700, as illustrated in FIG. 7, describes an example procedure for a separate DRX configuration and timeline for scheduled cell(s) compared to scheduling cell (s), using a new non-legacy timer referred to as, drx-TransmissionTimer, that applies only to the scheduled cell (s).

In step 710, a UE (such as the UE 116) is configured cross-carrier scheduling for a second serving cell by/from a first serving cell. In step 720, the UE identifies values m1 and m2 for "power-up" and "cool-down" durations before and after DL/UL transmissions on the second serving cell. In step 730, the UE receives a PDCCH on the first serving cell that indicates a DL/UL transmission on the second serving cell. In step 740, the UE starts drx-TransmissionTimer on the scheduled cell m1 symbols before the first symbol of the DL/UL transmission. In one example, a duration of equal a summation of a length in symbols of the DL/UL transmission and m1 and m2. In step 750, the scheduled cell is inside DRX Active Time while TransmissionTimer is running on the scheduled cell. In step 760, the UE stops drx-TransmissionTimer on the scheduled cell m2 symbols after a last symbol of the DL/UL transmission; then the scheduled cell is outside DRX Active Time.

For example, various embodiments can apply to a scenario with only one DRX group consisting of serving cells within only a single frequency rage such as FR1 (or only FR2). In another example, the embodiment can apply to a scenario with two/multiple DRX groups within a single frequency range, such as FR1 only cells or FR2 only cells. In yet another example, the embodiment can apply to a scenario with one or multiple DRX groups consisting of serving cells within two/multiple frequency ranges, such as a first DRX group with FR1 cells and a second DRX group with FR2 cells.

For example, the scheduled cell and the scheduling cell belong to a same DRX group and a same frequency range. In another example, the scheduling cell can belong to a first DRX group or a first frequency range, and the corresponding scheduled cell can belong to a second DRX group or a second frequency range.

For example, specification for system operation can enforce that, search spaces with the same searchSpaceId in scheduled cell and scheduling cell are linked to each other, and that the UE applies the search space for the scheduled cell only if the DL BWPs in which the linked search spaces are configured in scheduling cell and scheduled cell are both active. In such a case, the UE can monitor PDCCH for an activated scheduled cell (for example, for PDSCH/PUSCH scheduling) in a linked search space in an active DL BWP of the corresponding scheduling cell, regardless of whether the scheduled cell is inside or outside DRX Active Time, as defined by legacy DRX timers/parameters and/or by new non-legacy DRX timer(s) such as drx-TransmissionTimer, as described in this embodiment. In one example, an active DL BWP for an activated serving/scheduled cell outside DRX Active Time is: (i) same as an active DL BWP in a most recent DRX Active Time duration; or (ii) a dormant BWP as indicated by dormantBWP-Id; or (iii) a BWP as indicated by firstOutsideActiveTimeBWP-Id; or (iv) a BWP with same BWP-Id as a BWP on the scheduling cell as indicated by firstOutsideActiveTimeBWP-Id that is activated when receiving a DCI indication for SCell dormancy outside active time; or (v) a BWP configured for the scheduled cell for the purpose of search space linking outside DRX Active Time of the scheduled cell; or (vi) a reference DL BWP, such as firstActiveDownlinkBWP-Id or default-DownlinkBWP-Id, or an initial BWP that is referred to by BWP-Id=0, and so on.

It is noted that, a scheduling cell monitors PDCCH (including for the scheduled cell) only inside a DRX Active Time for the scheduling cell, and the corresponding DRX group.

In another variant of the second realization for this embodiment, a separate DRX configuration for scheduled cell(s) in a DRX group compared to scheduling cells in the same DRX group can be realized by using legacy DRX timers/parameters, but with a modified operation. For example, the UE may "activate" the scheduled cell upon receiving a PDCCH that schedules a PDSCH/PUSCH (at least when the scheduling offset is long enough). In one example, the UE can "activate" the scheduled cell by restarting one of the associated timers, for example drx-InactivityTimer. In one example, the UE starts/restarts drx-InactivityTimer based on a time for PDCCH reception on the scheduling cell, but the UE can modify the duration of the timer based on a time gap K0 between PDCCH-to-PDSCH to a time gap K2 between PDCCH-to-PUSCH. For example, a modified duration of drx-InactivityTimer for the scheduled cell can be set as maximum of a configured duration for drx-InactivityTimer and K0 for the case of PDSCH, or maximum of a configured duration for drx-InactivityTimer and K2 for the case of PUSCH, with appropriate scaling to get to a same symbol/slot unit when determining the maximum. If the scheduling cell belongs to a first DRX group and the scheduled cell belongs to a second DRX group, the UE determines the configured duration for drx-InactivityTimer based on a value configured on the second DRX group. For example, the UE can "activate" the scheduled cell in the second DRX group by restarting one of the associated timers, for example drx-InactivityTimer of the second DRX group, or other timer(s) that are common to both DRX groups. In another example, the UE does not expect that a configured duration for drx-InactivityTimer is smaller than a maximum configured value for K0/K2. In yet another example, the UE starts/restarts the drx-InactivityTimer on a scheduled cell based on a PDSCH/PUSCH transmission time. In another words, a DRX Active Time for a scheduled cell can be based on a value of a drx-InactivityTimer that is applied to PDSCH/PUSCH transmission, rather than a PDCCH. In a further example, the UE modifies an operation of other legacy timers, such as drx-RetransmissionTimerDL and drx-RetransmissionTimerUL, on the scheduled cell such that a duration for PDSCH/PUSCH transmission on the scheduled cell is included inside the DRX Active Time. For example, the timers drx-RetransmissionTimerDL or drx-RetransmissionTimerUL are stopped in a symbol after the last symbol of drx-RetransmissionTimerDL or drx-RetransmissionTimerUL.

In a third realization of this embodiment, DRX configuration is not introduced/defined/applicable for scheduled cell(s) in a DRX group. Accordingly, a DRX Active Time of a DRX group applies only to scheduling cell(s) within the DRX group and does not apply to scheduled cell(s) with the DRX group. Therefore, DRX Active Time only refers to a time duration for PDCCH monitoring, and not a time duration for PDSCH reception or PUSCH transmission. Accordingly, the UE can receive a PDCCH on the scheduling cell within the DRX Active Time, but the UE can perform resulting operation(s) such as a PDSCH reception or a PUSCH transmission, or repetitions or HARQ retransmission(s) thereof, on the scheduled cell outside DRX Active Time.

For example, when the scheduling cell belongs to a first DRX group and the scheduled cell belongs to a second DRX group, the UE can receive a PDCCH on the scheduling cell within the DRX Active Time of the first DRX group, and the UE can receive a PDSCH or transmit a PUSCH indicated by the PDCCH, or repetitions or HARQ retransmission(s) thereof, on the scheduled cell outside DRX Active Time of the second DRX group.

Herein, a scheduling cell refers to a serving cell configured with PDCCH monitoring for self-carrier scheduling or for cross-carrier scheduling of other cell(s), and a scheduled cell refers to a serving cell that is configured with cross-carrier by/from other serving cell(s).

Such behavior as described in the third realization is consistent with some legacy operations in LTE and NR, wherein the UE is supported to perform certain non-PDCCH operations even outside the DRX Active Time. For example, the UE transmits HARQ feedback, aperiodic CSI on PUSCH, and aperiodic SRS on the Serving Cells in the DRX group when such is expected, within or outside DRX Active Time.

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

The following embodiments of the present disclosure, denoted as E-4, describe application of timers corresponding to HARQ processes for a scheduled cell when the scheduled and scheduling cells are in two different DRX groups. This is described in the following examples and embodiments, such as those of FIG. 8.

Figure 8:
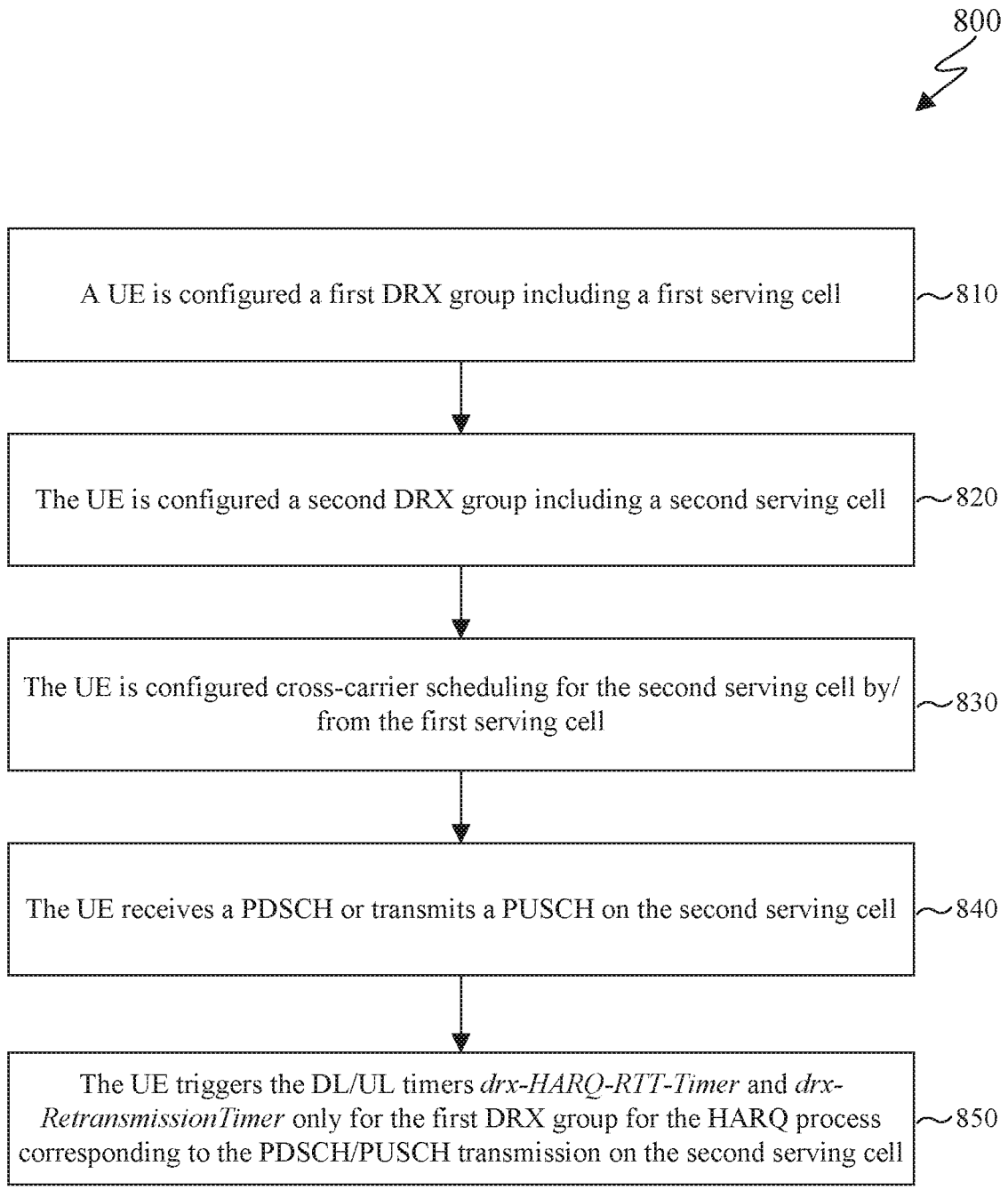
FIG. 8 illustrates a method for which the timers are applied/triggered only on the first DRX group and not on the second DRX group according to embodiments of the present disclosure.

FIG. 8 illustrates a method 800 for which the timers are applied/triggered only on the first DRX group and not on the second DRX group according to embodiments of the present disclosure. The steps of the method 800 of FIG. 8 can be performed by any of the UEs 111-119 of FIG. 1, such as the UE 116 of FIG. 3. The method 800 is for illustration only and other embodiments can be used without departing from the scope of the present disclosure.

In certain embodiments, for a UE (such as the UE 116) that is configured with two DRX groups, wherein a scheduling cell and a corresponding scheduled cell belong to two different DRX groups, when the UE receives a PDSCH or transmits a PUSCH on the scheduled cell, the UE can apply a time duration for PDCCH monitoring for HARQ retransmission of the PDSCH/PUSCH to both DRX groups or only to one of the DRX groups, such as a DRX group corresponding to the scheduling cell (where UE monitors the PDCCH). The scheduled cell and the scheduling cell can be in same or different frequency ranges.

In certain embodiments, for a UE (such as the UE 116) that is configured with a first DRX group and a second DRX group, when: (i) a scheduling cell belongs to a first DRX group and a corresponding scheduled cell belongs to a second DRX group, and (ii) the UE receives a PDSCH or transmits a PUSCH on the scheduled cell, then the UE applies HARQ-RTT timer(s) and HARQ-Retransmission timer(s). The HARQ-RTT timer(s) and HARQ-Retransmission timer(s) are for a HARQ process corresponding to the PDSCH/PUSCH on the scheduled cell, (i) in a first approach, to both the first DRX group and the second DRX group; (ii) in a second approach, to the first DRX group, but not to the second DRX group; and (iii) in a third approach, to the second DRX group, but not to the first DRX group.

For example, HARQ-RTT timer(s) can refer to drx-HARQ-RTT-TimerDL or drx-HARQ-RTT-TimerDL. In another example, HARQ-Retransmission timer(s) can refer to drx-RetransmissionTimerDL or drx-RetransmissionTimerDL. It is noted that, the timers are associated with HARQ process(es) of a HARQ entity corresponding to the scheduled cell. The HARQ retransmission(s) can correspond to HARQ retransmission(s) of a PDSCH/PUSCH that is scheduled by a DCI format, or HARQ retransmission(s) of a semi-persistently scheduled PDSCH (SPS PDSCH) or a configured grant PUSCH (CG PUSCH).

An application by the UE of the HARQ-RTT timer(s) and HARQ-Retransmission timer(s) for a HARQ process corresponding to the PDSCH/PUSCH on the scheduled cell to the first DRX group or the second DRX group can refer to, the UE starting or re-starting or stopping the said timers to determine the DRX Active Time of the first or the second DRX group. Accordingly, in the second approach, the UE starting or re-starting or stopping the said timers on the first DRX group does not determine the DRX Active Time of the second DRX group (corresponding to the scheduled cell).

The following example specification text as shown in Syntax (2), below includes changes compared to the current specifications for REF5.
Syntax (2)
1> if a first DRX group is in Active Time:
  2> monitor the PDCCH on the Serving Cells in this DRX group as specified in REF3 [6];
  2> if the PDCCH on a scheduling cell in this DRX group indicates a DL transmission on a corresponding scheduled cell in a second DRX group:
    3> start the drx-HARQ-RTT-TimerDL on the first DRX group for the corresponding HARQ process of the scheduled cell in the first symbol after the end of the corresponding transmission carrying the DL HARQ feedback;
  NOTE 3: When HARQ feedback is postponed by PDSCH-to-HARQ_feedback timing indicating a non-numerical k1 value, as specified in REF3 [6], the corresponding transmission opportunity to send the DL HARQ feedback is indicated in a later PDCCH requesting the HARQ-ACK feedback.
    3> stop the drx-RetransmissionTimerDL on the first DRX group for the corresponding HARQ process of the scheduled cell.
    3> if the PDSCH-to-HARQ_feedback timing indicate a non-numerical k1 value as specified in REF3 [6]:
      4> start the drx-RetransmissionTimerDL on first DRX group in the first symbol after the PDSCH transmission for the corresponding HARQ process of the scheduled cell.
  2> if the PDCCH on a scheduling cell in this DRX group indicates a UL transmission on a corresponding scheduled cell in a second DRX group:
    3> start the drx-HARQ-RTT-TimerUL on the first DRX group for the corresponding HARQ process of the scheduled cell in the first symbol after the end of the first transmission (within a bundle) of the corresponding PUSCH transmission on the scheduled cell;
    3> stop the drx-RetransmissionTimerUL on the first DRX group for the corresponding HARQ process of the scheduled cell.

The first approach is in line with embodiment E-1 and extends a UE behavior in a legacy system wherein the scheduled and scheduling cells are in a same DRX group, to an enhanced system wherein the scheduled and scheduling cells are in different DRX groups. Therefore, PDCCH monitoring for potential HARQ retransmissions can extend the DRX Active time for both DRX groups.

The second approach can be beneficial, for example, so that DRX Active Time on the second DRX group corresponding to the scheduled cell does not get extended due to PDCCH monitoring on the scheduling cell which belongs to the first DRX group. For example, when the first DRX group includes FR1 cells and the second DRX group includes FR2 cells, it may be desirable for other cell(s) in the second DRX group, if any, not to be forced to stay in DRX Active mode as a result of cross-carrier scheduling for the scheduled cell. This can be beneficial since the power consumption on FR2 cells can be higher than FR1 cells.

For example, the specifications for system operation supports only one approach among the first/second/third approach described above that the UE shall follow. In another example, the UE can follow an approach from the first/second/third approach described above based on which frequency range the first DRX group and the second DRX group belong to. For example, the UE can follow a second approach when the first DRX group includes FR1 cell and the second DRX group includes FR2 cells. On the other hand, the UE can follow the first approach, when the first DRX group includes FR2 cells and the second DRX group includes FR1 cells.

For example, a duration of the HARQ-RTT timer(s) and HARQ-Retransmission timer(s) can be DRX-group-specific. Therefore, the UE can be configured with first value(s)/duration(s) for HARQ-RTT timer(s) and HARQ-Retransmission timer(s), and second value(s)/duration(s) for HARQ-RTT timer(s) and HARQ-Retransmission timer(s). In such a case, when the UE applies, to the first DRX group, HARQ-RTT timer(s) and HARQ-Retransmission timer(s) for a HARQ process corresponding to the scheduled cell, a duration of the DRX-inactivity timer, namely, a maximum value of the DRX-inactivity timer at which the corresponding timer expires, can refer to: (i) a duration of the HARQ-RTT timer(s) and HARQ-Retransmission timer(s) configured on the first DRX group; or (ii) a duration of the HARQ-RTT timer(s) and HARQ-Retransmission timer(s) configured on the second DRX group; or (iii) a minimum/maximum among respective HARQ-RTT timer(s) and HARQ-Retransmission timer(s) configured on the first and second DRX groups.

According to the second approach, a HARQ retransmission of a PDSCH/PUSCH on the scheduled cell may occur outside a DRX Active Time of a second DRX group, to which the scheduled cell belongs. However, the UE still needs to power up the scheduled cell to receive PDSCH or transmit PUSCH on the scheduled cell.

To resolve this issue for the second approach, in a first option, the UE is supported to make a PDSCH/PUSCH transmission on the scheduled cell, regardless of whether the MAC entity is monitoring PDCCH or not on the Serving Cells in the second DRX group, namely, outside Active Time of the second DRX group. This behaviour is similar to legacy UE behaviour wherein: regardless of whether the MAC entity is monitoring PDCCH or not on the Serving Cells in a DRX group, the MAC entity transmits HARQ feedback, aperiodic CSI on PUSCH, and aperiodic SRS on the Serving Cells in the DRX group when such is expected. Therefore, the scheduled cell continues to follow a same DRX Active Time as any/all other cell(s) within the corresponding DRX group, namely, the second DRX group, but with the understanding that a PDSCH/PUSCH transmission duration is not necessarily included in the DRX Active Time. This option is in line with the third realization considered in embodiment E-3.

In a second option, the scheduled cell is allowed to have a separate DRX configuration/timeline such that a DRX Active Time for the scheduled cell can be separate from that of the scheduling cell or that of other serving cells in the second DRX group. Such behaviour can be realized, for example, by using methods such as those considered in the second realization of embodiment E-3 to define DRX Active Time for scheduled cells based on PDSCH/PUSCH transmission timeline, such as a duration for such transmission and possibly time offset(s) before and/or after such transmission for power-up or cool-down, rather than PDCCH monitoring timeline.

In a third option, the UE operates with a UE behaviour that is a combination of the first option and the second option. For example, the scheduled cell follows a DRX Active Time as any/all other cell(s) within the corresponding DRX group, namely, the second DRX group, and is additionally considered to be in DRX Active Time for duration of any PDSCH/PUSCH transmission or HARQ retransmission thereof, possibly along with time offset(s) before and/or after such transmission for power-up or cool-down.

In one example, the scheduled cell and the scheduling cell can be in different frequency ranges. For example, the scheduling cell is in a first frequency range such as FR1, and the scheduled cell is in a second frequency range such as FR2. In one example, the first DRX group includes cells in a first frequency range, such as a default DRX group including FR1 cells, and the second DRX group includes cells in a second frequency range, such as a secondary DRX group including FR2 cells. In another example, the embodiments can apply even when the scheduling cell and the scheduled cell are within a same frequency range, for example both in FR1 or both in FR2 (this example, it is assumed that it is possible for a UE to be configured with two/multiple DRX groups within a same frequency range). In one example, the first and second DRX group are associated with a same cell group, such MCG or SCG, and therefore a same MAC entity. In another example, the first and second DRX group are associated with different cell groups, for example, the first DRX group is associated with a first MAC entity corresponding to the MCG, and the second DRX group is associated with a second MAC entity corresponding to the SCG. In one example, the present embodiment, including the first/second/third realizations, may be restricted, for example, to scenarios wherein scheduling cell(s) belong(s) to lower frequency range(s), and scheduled cell(s) belong(s) to higher frequency range(s). For example, the UE does not expect a scheduling cell to be on FR2 when the scheduled cell is on FR1.

It is assumed that a first HARQ entity for the scheduling cell interacts with or has access to information of a second HARQ entity for the scheduled cell. This assumption is valid, for example, when the first and second HARQ entities correspond to a same MAC entity, such as when the scheduled cell and the scheduling cells are within a same cell group, MCG or SCG. The assumption can be also valid, for example, when the first and second HARQ entities correspond to different MAC entities/cell groups, but there is some information exchange (over some network/MAC interface) between the two MAC entities/cell groups. Such information exchange can be same or similar to an information exchange that allows cross-cell-group (cross-CG) scheduling.

Accordingly, it is possible for the scheduling cell, or the corresponding HARQ entity, to be informed of HARQ processes and corresponding timer situation associated with the scheduled cell, or the corresponding HARQ entity. For example, the scheduling cell, or the corresponding HARQ entity, can distinguish among HARQ-RTT timers/HARQ-Retransmission timers for HARQ process associated with the scheduled cell (or different scheduled cells), and HARQ-RTT timers/HARQ-Retransmission timers for HARQ process associated with the scheduling cell itself. Therefore, the UE can separately start or stop or restart such timers associated with various HARQ processes of the scheduled cell(s) or the scheduling cell, although all of them are applied to the DRX Active Time of the scheduling cell and the corresponding DRX group, per this embodiment.

The method 800 as illustrated in FIG. 8 describes an example procedure for the second approach to the application of timers corresponding to HARQ processes for a scheduled cell when the scheduled and scheduling cells are in two different DRX groups. The second approach refers to a method in which the timers are applied/triggered only on the first DRX group, and not on the second DRX group.

In step 810, a UE (such as the UE 116) is configured a first DRX group including a first serving cell. In step 820, the UE is configured a second DRX group including a second serving cell. In step 830, the UE is configured cross-carrier scheduling for the second serving cell by/from the first serving cell. In step 840, the UE receives a PDSCH or transmits a PUSCH on the second serving cell. The PDSCH or PUSCH can be a transmission occasion of an SPS PDSCH or a Type-1/2 CG PUSCH or can be scheduled by a DCI format in a PDCCH that the UE receives on the first serving cell. In step 850, the UE triggers the DL/UL timers drx-HARQ-RTT-Timer and drx-Retransmission Timer only for the first DRX group (and not for the second DRX group) for the HARQ process corresponding to the PDSCH/PUSCH transmission on the second serving cell. Herein, trigerring a DL/UL timer refers to starting/restarting/stopping of the corresponding timer(s) in a slot/symbol that the UE determines based on specificaions for system operation and/or a configuration of a respective DRX group.

In one example, when: (i) the UE intends to apply HARQ-RTT timer(s) and HARQ-Retransmission timer(s) corresponding to HARQ process(es) of the scheduled cell, to the scheduling cell and the corresponding DRX group, and (ii) a numerology of an active BWP of a scheduled cell is different from a numerology of an active BWP of a corresponding scheduling cell, and (iii) the UE needs to apply a timer in a first/earliest symbol after an event, then the UE determines the first/earliest symbol. For example, the UE determines the first/earliest symbol after the event based on a symbol: (i) in a numerology of the scheduling cell, or (ii) in a numerology of the scheduled cell, or (iii) a minimum/maximum numerology between the scheduled cell and the scheduling cell, or (iv) a minimum/maximum numerology among serving cells in the first DRX group, or (v) a minimum/maximum numerology among serving cells in the second DRX groups, or (vi) a reference/default numerology, such as 15 kHz for FR1, and 60 kHz for FR2.

Herein, an event can refer to expiry of a certain timer or start/completion of a certain PDSCH/PUSCH transmission, or a PUCCH transmission including a corresponding HARQ ACK feedback, or a reference time such as start of a radio frame or start of a DRX short/long cycle, and so on.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

The following embodiments of the present disclosure, denoted as E-5, describe application of DRX-inactivity timer corresponding to PDCCH monitoring for a scheduled cell when the scheduled and scheduling cells are in two different DRX groups. This is described in the following examples and embodiments, such as those of FIG. 9.

FIG. 9 illustrates a method 900 for using a DRX-inactivity timer corresponding to PDCCH monitoring on a scheduling cell for a corresponding scheduled cell when the scheduled and scheduling cells are in two different DRX groups according to embodiments of the present disclosure. The steps of the method 900 of FIG. 9 can be performed by any of the UEs 111-119 of FIG. 1, such as the UE 116 of FIG. 3. The method 900 is for illustration only and other embodiments can be used without departing from the scope of the present disclosure.

For a UE that is configured with two DRX groups, wherein a scheduling cell and a corresponding scheduled cell belong to two different DRX groups, when the UE receives a PDCCH on the scheduling cell that indicates a new DL/UL transmission on the scheduled cell, the UE can start/restart DRX-inactivity timers for both DRX groups or only for one of the DRX groups, such as a DRX group corresponding to the scheduling cell (where UE monitors the PDCCH). The scheduled cell and the scheduling cell can be in same or different frequency ranges.

In one embodiment, for a UE that is configured with a first DRX group and a second DRX group, when: (i) a scheduling cell belongs to a first DRX group and a corresponding scheduled cell belongs to a second DRX group, and (ii) the UE receives a PDCCH on the scheduling cell that indicates a new DL/UL transmission on the scheduled cell, then the UE applies the DRX-inactivity timer triggered by the received PDCCH. The UE can apply the DRX-inactivity timer triggered by the received PDCCH: in a first approach, to both the first DRX group and the second DRX group; in a second approach, to the first DRX group, but not the second DRX group; in a third approach, to the second DRX group, but not the first DRX group.

For example, a new DL/UL transmission indicated by a PDCCH can refer to a new/initial transmission of a PDSCH or a PUSCH, that is scheduled by a DCI format included in a PDCCH, or a first/earliest SPS PDSCH reception or a Type-2 CG-PUSCH transmission that is indicated by an activation DCI format for SPS PDSCH or Type-2 CG PUSCH included in a PDCCH. Such PDCCH reception can start or re-start a DRX-inactivity timer.

The following example specification text as shown in Syntax (3), below includes changes compared to the current specifications for REF5.
Syntax (3)
1> if a first DRX group is in Active Time:
   2> monitor the PDCCH on the Serving Cells in this DRX group as specified in REF3 [6];
   2> if the PDCCH indicates a new transmission (DL or UL) on a Serving Cell in this DRX group or a Serving Cell in the second DRX group:
     3> start or restart drx-InactivityTimer for this DRX group in the first symbol after the end of the PDCCH reception.

NOTE 3a: A PDCCH indicating activation of SPS or configured grant type 2 is considered to indicate a new transmission.

The first approach is in line with embodiment E-1 and extends a UE behavior in a legacy system wherein the scheduled and scheduling cells are in a same DRX group, to an enhanced system wherein the scheduled and scheduling cells are in different DRX groups. Therefore, a PDCCH reception for a new DL/UL transmission on the scheduled cell can extend the DRX Active time for both DRX groups. According to the first approach, when the UE receives a PDCCH on the scheduling cell for the scheduled cell inside DRX Active Time of the first DRX group, the UE starts the drx-InactivityTimer on the scheduled cell (in addition to drx-InactivityTimer on the scheduling cell), even if the PDCCH is received outside DRX Active Time of the second DRX group.

The second approach can be beneficial, for example, so that DRX Active Time on the second DRX group corresponding to the scheduled cell does not get extended due to PDCCH monitoring on the scheduling cell which belongs to the first DRX group. For example, when the first DRX group includes FR1 cells and the second DRX group includes FR2 cells, it may be desirable for other cell(s) in the second DRX group, if any, not to be forced to stay in DRX Active mode as a result of cross-carrier scheduling for the scheduled cell. This can be beneficial since the power consumption on FR2 cells can be higher than FR1 cells. According to the second approach, the scheduled cell continues to follow a same DRX Active Time as all other cells within the corresponding DRX group, namely, the second DRX group.

For example, the specifications for system operation supports only one approach among the first/second/third approach described above that the UE shall follow. In another example, the UE is supported to follow an approach from the first/second/third approach described above based on which frequency range the first DRX group and the second DRX group belong to. For example, the UE can follow a second approach when the first DRX group includes FR1 cell and the second DRX group includes FR2 cells. On the other hand, the UE can follow the first approach, when the first DRX group includes FR2 cells and the second DRX group includes FR1 cells.

According to the second approach, a new DL/UL transmission on the scheduled cell may occur outside a DRX Active Time of a second DRX group, to which the scheduled cell belongs. However, the UE still needs to power up to perform a reception/transmission for the new DL/UL on the scheduled cell. To resolve this issue for the second approach, various options can be considered, similar to the first/second/third option described in embodiment E-4.

For example, when the UE applies, to the first DRX group, a DRX-inactivity timer that is triggered by a PDCCH on the scheduling cell to indicate a new DL/UL transmission on the scheduled cell, a duration of the DRX-inactivity timer, namely, a maximum value of the DRX-inactivity timer at which the timer expires, can refer to: (i) in a first case, a duration of the DRX-inactivity timer configured on the first DRX group; or (ii) in a second case, a duration of the DRX-inactivity timer configured on the second DRX group; or (iii) in a third case, a minimum/maximum among durations of the DRX-inactivity timers configured on the first and second DRX group.

The first case is the legacy case, in which the UE follows the DRX configurations provided for the first DRX group to determine a DRX Active Time for the scheduling cell. The second case is an enhanced case, in which the UE applies different DRX-inactivity timer durations for a scheduling cell in the first DRX group, depending on whether a corresponding scheduled cell belongs to the first DRX group or the second DRX group. For example, when a DRX-inactivity timer duration in the second DRX group is shorter than that in the first DRX group, then the UE can apply the shorter value for extension of DRX Active Time on the first DRX group (corresponding to the scheduling cell), when the scheduling cell monitors/receives PDCCH for the scheduled cell (which belongs to the second DRX group). Accordingly, when a scheduling cell has a first scheduled cell in the first DRX group and has a second scheduled cell in the second DRX group, the UE applies a first (larger) value for DRX-inactivity timer when monitoring/receiving PDCCH on the scheduling cell is for the first scheduled cell and applies a second (smaller) value for DRX-inactivity timer when monitoring/receiving PDCCH on the scheduling cell is for the second scheduled cell.

This embodiment applies to various settings with respect to serving cells belonging to FR1 or FR2, such as the first DRX group including FR1 cells, and the second DRX group including FR2 cells, and so on, as described in embodiment E-4. In one example, the present embodiment, including the first/second/third realizations, may be restricted, for example, to scenarios wherein scheduling cell(s) belong(s) to lower frequency range(s), and scheduled cell(s) belong(s) to higher frequency range(s). For example, the UE does not expect a scheduling cell to be on FR2 when the scheduled cell is on FR1.

The method 900, as illustrated in FIG. 9 describes an example procedure for application of DRX-inactivity timer corresponding to PDCCH monitoring on a scheduling cell for a corresponding scheduled cell when the scheduled and scheduling cells are in two different DRX groups.

In step 910, a UE (such as the UE 116) is configured a first DRX group including a first serving cell. In step 920, the UE is configured a second DRX group including a second serving cell. In step 930, the UE is configured cross-carrier scheduling for the second serving cell by/from the first serving cell. In step 940, the UE receives a PDCCH on the first serving cell that indicates a new DL/UL transmission on the second serving cell. In step 950, the UE triggers drx-InactivityTimer only for the first DRX group, and not for the second DRX group. Herein, triggering drx-InactivityTimer refers to starting/restarting/stopping of the said timer in a slot/symbol that the UE determines based on specifications for system operation and/or a configuration of a respective DRX group.

Although FIG. 9 illustrates the method 900 various changes may be made to FIG. 9. For example, while the method 900 is shown as a series of steps, various steps could overlap, occur in parallel, occur in a different order, or occur multiple times. In another example, steps may be omitted or replaced by other steps. For example, steps of the method 900 can be executed in a different order.

The following embodiments of the present disclosure, denoted as E-6, describe scheduling request operation for a UE with two DRX groups.

In certain embodiments, for a UE (such as the UE 116) that is configured with two DRX groups, when DRX Active Time of a first DRX group is extended due to a pending Scheduling Request (SR) that is sent on PUCCH, the UE can consider a PDCCH received on a serving cell from the second DRX group to address the trigger for the SR, cancel the pending SR, and stop the DRX Active Time on the first DRX group.

In one realization, when the UE sends an SR on a PUCCH on a first cell from a first DRX group and the SR is pending, the UE expects to receive a PDCCH on a second serving cell in response to the pending SR, wherein the second cell is in the same/first DRX group. In one example, the first cell is a PCell. In one example, the UE expects that the first cell and the second cell are the same, such as both being the PCell. In another example, the first cell is the PCell, and the second cell can be an SCell in a same DRX group as the PCell. The UE does not expect to receive a PDCCH on a third serving cell in response to the pending SR, wherein the third cell is in a second DRX group different from the first DRX group.

In another realization, when the UE sends an SR on a PUCCH on a first cell from a first DRX group and the SR is pending, the UE can receive a PDCCH on a second serving cell in response to the pending SR, wherein the second cell is in a second DRX group different from the first DRX group. According to this realization, when the receives a PDCCH on the second serving cell from the second DRX group in response to the pending SR on the first DRX group, the UE can discard an extension of DRX Active Time on the first DRX group due to the pending SR.

In either of the two above realizations, the PDCCH that the UE receives in response to the SR can indicate a PUSCH transmission on the first cell or on the second cell, or on a third cell from the second DRX group, or on a fourth cell from the first DRX group, but different from the first and second cell.

It is noted that E-6 can be extended to a case when the UE is configured with two PUCCH groups, such as a primary PUCCH group that send UCI including SR on the PCell, and a secondary PUCCH group that send UCI including SR on the PUCCH-SCell. In one example, the first DRX group can coincide with the primary PUCCH group, and the second DRX group can coincide with the secondary PUCCH group, or vice versa. In one example, a PUCCH group can "overlap" with both DRX groups, so that, there is a first serving cell from the first DRX group and a second serving cell from the second DRX group, wherein both the first and second cells belong to the same PUCCH group. In one example, a DRX group can "overlap" with both PUCCH groups, so that there is a first serving cell from the primary PUCCH group and a second serving cell from the secondary PUCCH group, wherein both the first and the second cells belong to the same DRX group.

In certain embodiments, If the UE is configured with a SCG, the UE can apply the procedures described in the following embodiments for MCG and/or SCG, possibly except for PDCCH monitoring in Type0/0A/2-PDCCH CSS sets where the UE may not be required to apply the corresponding UE procedures for the SCG. When the procedures are applied for MCG, the terms 'secondary cell', 'secondary cells', 'serving cell', 'serving cells' refer to secondary cell, secondary cells, serving cell, serving cells belonging to the MCG respectively. When the procedures are applied for SCG, the terms 'secondary cell', 'secondary cells', 'serving cell', 'serving cells' refer to secondary cell, secondary cells (not including PSCell), serving cell, serving cells belonging to the SCG respectively. The term 'primary cell' (or PCell) in the following embodiments refers to the PSCell of the SCG.

The following embodiments of the present disclosure, denoted as E-7, describe using CIF of DCI format(s) for self-scheduling on a first cell that is not a scheduling cell for another cell to indicate a second cell as an additional 'active' scheduling cell for the first cell. This is described in the following examples and embodiments, such as those of FIGS. 10-12.

Figure 10:
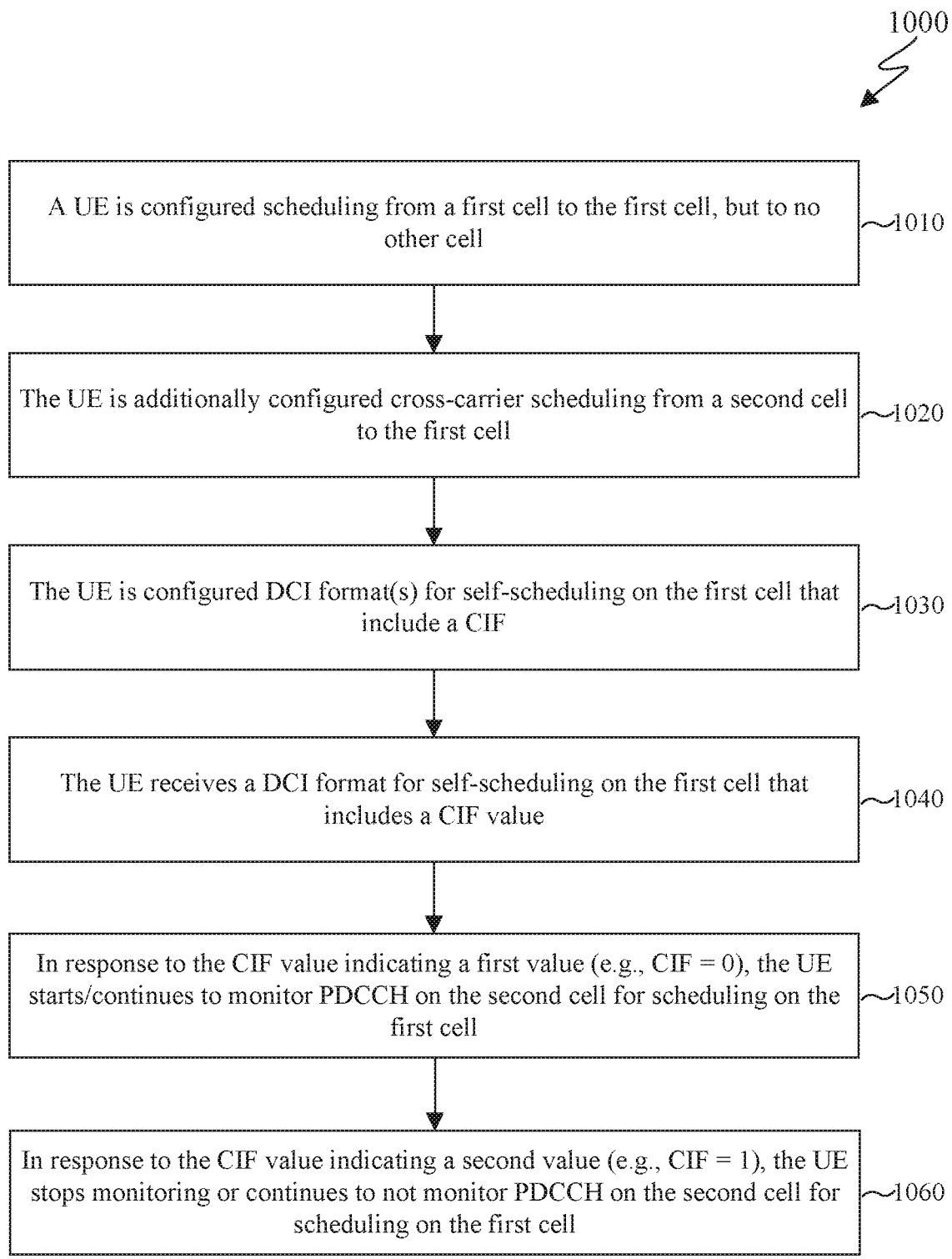
FIG. 10 illustrates a method for mapping carrier indicator filed (CIF) values in a downlink control information (DCI) format for self-scheduling on a first cell according to embodiments of the present disclosure.
Figure 12:
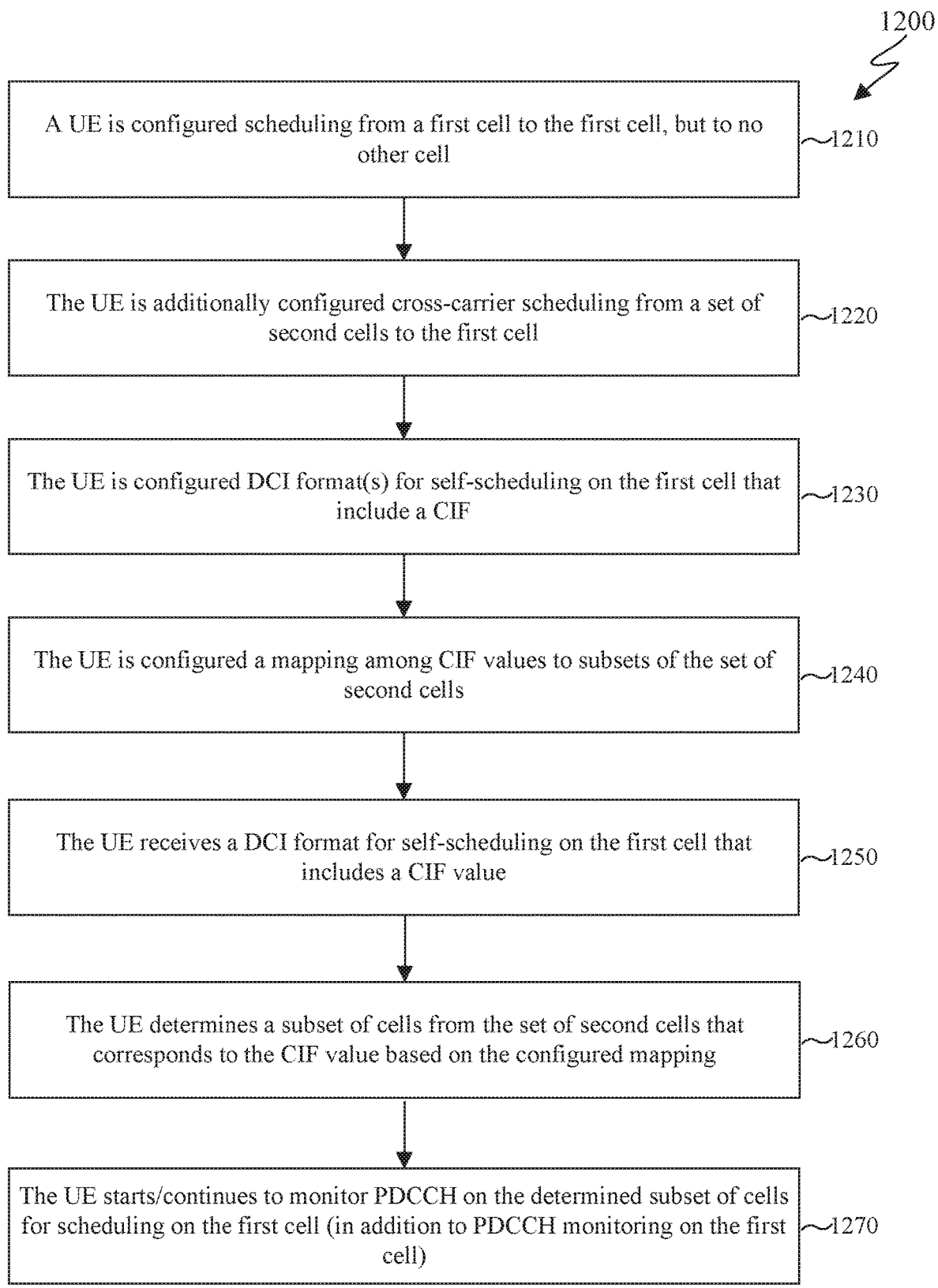
FIG. 12 illustrates a method for mapping CIF values in a DCI format for self-scheduling on a first cell according to embodiments of the present disclosure.

FIG. 10 illustrates a method 1000 for mapping CIF values in a DCI format for self-scheduling on a first cell according to embodiments of the present disclosure. FIG. 11 illustrates a diagram 1100 of an operation for mapping CIF values in a DCI format for self-scheduling on the PCell according to embodiments of the present disclosure. FIG. 12 illustrates a method 1200 for mapping CIF values in a DCI format for self-scheduling on a first cell according to embodiments of the present disclosure. The steps of the method 1000 of FIG. 10 and the method 1200 of FIG. 12 can be performed by any of the UEs 111-119 of FIG. 1, such as the UE 116 of FIG. 3. The method 1000, the diagram 1100 and the method 1200 are for illustration only and other embodiments can be used without departing from the scope of the present disclosure.

When the UE is: (i) configured cross-carrier scheduling from second cell(s) to a first cell, in addition to self-scheduling on the first cell, and (ii) not configured scheduling on any serving cell from the first cell, and (iii) configured to monitor PDCCH candidates according to search space sets on the first cell for detection of DCI format(s) for scheduling on the first cell that include a CIF, then the UE can be provided a mapping. The mapping can be among values of the CIF in the DCI format(s) for self-carrier scheduling on the first cell and indication(s) whether or not to monitor PDCCH on a cell from the second cell(s) for scheduling on the first cell. The mapping can be by higher layer configuration or can be predetermined in the specifications for system operation.

For example, the first cell can be a PCell, and the second cell(s) can be secondary cells (SCells). For example, the first cell can be an SCell, and the second cell(s) can be SCell(s). For example, the first cell can be an SCell, and the second cell(s) can include the PCell. In the following exemplary embodiments and realizations, the first cell is considered to be the PCell, and the second cell(s) is/are considered to be SCell(s). Further, although the embodiments are described with reference to a CIF field in the DCI formats for scheduling on the PCell, any other field in such DCI format(s), including a new field used to provide the described functionalities, can apply. The embodiment can also apply, for example, using other DCI fields such as those for SCell dormancy indication or TCI state indication and so on, to provide the described functionalities. The embodiment can also apply, for example, using DCI fields such as those that are included (possibly with a reserved value or a with a predetermined value) in a DCI format on the PCell due to a DCI size alignment procedure between the PCell and an SCell that can schedule the PCell, to provide the described functionalities. The embodiment can also apply, for example, using DCI fields such as those that are included (possibly with a reserved value or a with a predetermined value) in a DCI format on an S Cell that schedules the PCell, to provide the described functionalities. For example, such DCI fields are included in the DCI format due to a DCI size alignment procedure between the PCell and the SCell. The embodiment can also apply, for example, using any number of bits, such as zero padding bits, that are included in a DCI format on PCell (or, in a DCI format on an SCell that schedules the PCell), due to a DCI size alignment procedure between the PCell and the SCell that schedules the PCell, to provide the described functionalities.

In a first realization, when an SCell (referred to as scheduling SCell or special SCell or 'sSCell') is an activated serving cell for the UE and the sSCell is configured for cross-carrier scheduling on the PCell, the UE can be provided a mapping among CIF values in the DCI format(s) for self-carrier scheduling on the PCell and an indication whether or not the sSCell is an 'active' scheduling cell for the PCell, namely, whether the UE can start/stop/continue to monitor PDCCH on the sSCell for cross-carrier scheduling of PCell. The sSCell can be the only SCell configured for cross-carrier scheduling on the PCell. In another example, the sSCell can be from a configured set of SCells.

For example, a first value of CIF such as "CIF=0" indicates that the SCell, is 'active/activated' for cross-carrier scheduling on the PCell and the UE can (start/continue to) monitor PDCCH on the sSCell for scheduling PDSCH receptions or PUSCH transmissions on the PCell. For example, a second CIF value such as "CIF=1" can indicate to the UE to not monitor/stop monitoring PDCCH on the sSCell for scheduling on the PCell.

The method 1000, as illustrated in FIG. 10, describes an example flowchart for mapping CIF values in a DCI format for self-scheduling on a first cell to indications whether or not a second cell is an 'active' scheduling cell for the first cell.

In step 1010, a UE (such as the UE 116) is configured scheduling from a first cell to the first cell, but to no other cell. In step 1020, the UE is additionally configured cross-carrier scheduling from a second cell to the first cell. In step 1030, the UE is configured DCI format(s) for self-scheduling on the first cell that include a CIF. In step 1040, the UE receives a DCI format for self-scheduling on the first cell that includes a CIF value. In response to the CIF value indicating a first value (e.g., CIF=0), the UE in step 1050, starts/continues to monitor PDCCH on the second cell for scheduling on the first cell. In response to the CIF value indicating a second value (e.g., CIF=1), the UE in step 1060, stops monitoring or continues to not monitor PDCCH on the second cell for scheduling on the first cell.

The diagram 1100 as illustrated in FIG. 11 describes an example operation for mapping CIF values in a DCI format for self-scheduling on the PCell to indications whether or not an sSCell is an 'active' scheduling cell for the PCell.

In a second realization, when a UE is configured a set of two or more SCells as possible scheduling SCells for a PCell, and when a CIF includes multiple bits, a scheduling SCell can be indicated based on a value of the CIF field in a DCI format scheduling a PDSCH reception or a PUSCH transmission on the PCell.

For example, for a CIF of 3 bits, the UE can be configured a set of SCells with up to 7 SCells and CIF values of 1 through 7 can respectively indicate the first through seventh SCell from the set of SCells as a scheduling SCell for the PCell, so the UE monitors PDCCH on the indicated SCell for cross-carrier scheduling on the PCell (in addition to UE monitoring PDCCH on PCell for self-scheduling on the PCell). The CIF value of 0 can indicate that no SCell is a scheduling cell for the PCell (that is, the UE only applies self-scheduling for the PCell).

In another example, the UE can be provided a mapping between CIF values and subsets of SCells from the set of SCells when the UE can have multiple SCells as scheduling cells for the PCell. For example, for a CIF field of 3 bits and a set of 3 scheduling SCells, CIF values of 1 through 7 can respectively indicate the (1) first, (2) second, (3) third, (4) first and second, (5) first and third, (6) second and third, and (7) first, second, and third SCells as 'active' scheduling cells for the PCell, so the UE monitors PDCCH on the indicated subset of SCells for cross-carrier scheduling on the PCell (in addition to UE monitoring PDCCH on PCell for self-scheduling on the PCell). The CIF value of 0 can indicate that no SCell is a scheduling cell for the PCell (that is, the UE only applies self-scheduling for the PCell).

An alternative realization is to use the CIF as a bitmap to indicate the SCells that are scheduling cells for the PCell with a value of '000' indicating that no SCell is a scheduling cell for the PCell, a value '100' indicating that the first SCell is a scheduling cell for the PCell, a value of '111' indicating that all 3 SCells are scheduling cells for the PCell, and so on. Similar procedure can be considered for MAC-CE based update of the SCell(s).

When the UE is indicated an SCell or a subset of SCells as (active) scheduling SCell(s) for the PCell, the UE starts/continues to monitor PDCCH on the indicated SCell(s) for cross-carrier scheduling on the PCell, in addition to UE monitoring the PCell for self-scheduling on the PCell.

The method 1200, as illustrated in FIG. 12, describes an example flowchart for mapping CIF values in a DCI format for self-scheduling on a first cell to indicate 'active' scheduling cell(s) from a set of configured scheduling cells for the first cell.

In step 1210, a UE (such as the UE 116) is configured scheduling from a first cell to the first cell, but to no other cell. In step 1220, the UE is additionally configured cross-carrier scheduling from a set of second cells to the first cell. In step 1230, the UE is configured DCI format(s) for self-scheduling on the first cell that include a CIF. In step 1240, the UE is configured a mapping among CIF values to subsets of the set of second cells. In step 1250, the UE receives a DCI format for self-scheduling on the first cell that includes a CIF value. In step 1260, the UE determines a subset of cells from the set of second cells that corresponds to the CIF value based on the configured mapping. In step 1270, the UE starts/continues to monitor PDCCH on the determined subset of cells for scheduling on the first cell (in addition to PDCCH monitoring on the first cell).

Although FIG. 10 illustrates the method 1000, the FIG. 11 illustrates the diagram 1100, and the FIG. 12 illustrates the method 1200 various changes may be made to FIGS. 10-12. For example, while the method 1000 and the method 1200 are shown as a series of steps, various steps could overlap, occur in parallel, occur in a different order, or occur multiple times. In another example, steps may be omitted or replaced by other steps. For example, steps of the method 1000 and the method 1200 can be executed in a different order.

The following embodiments of the present disclosure, denoted as E-7-1, describe using CIF of DCI format(s) for self-scheduling on a first cell that is not a scheduling cell for another cell to indicate activation/deactivation/dormancy for other serving cells, including second cell(s) that are scheduling cell(s) for the first cell. This is described in the following examples and embodiments, such as those of FIGS. 13-14.

Figure 13:
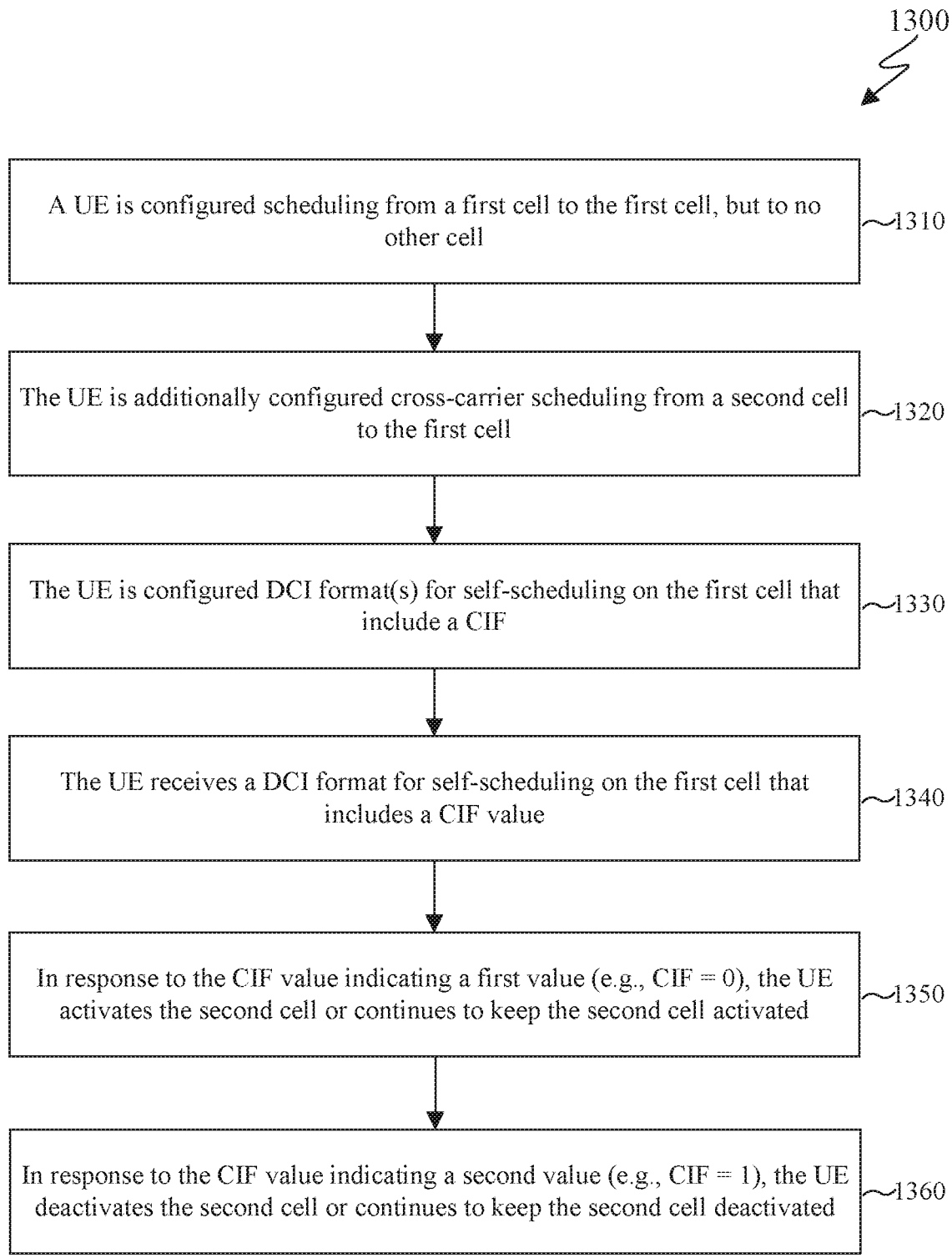
FIG. 13 illustrates a method for mapping CIF values in a DCI format for self-scheduling on a first cell according to embodiments of the present disclosure.
Figure 14:
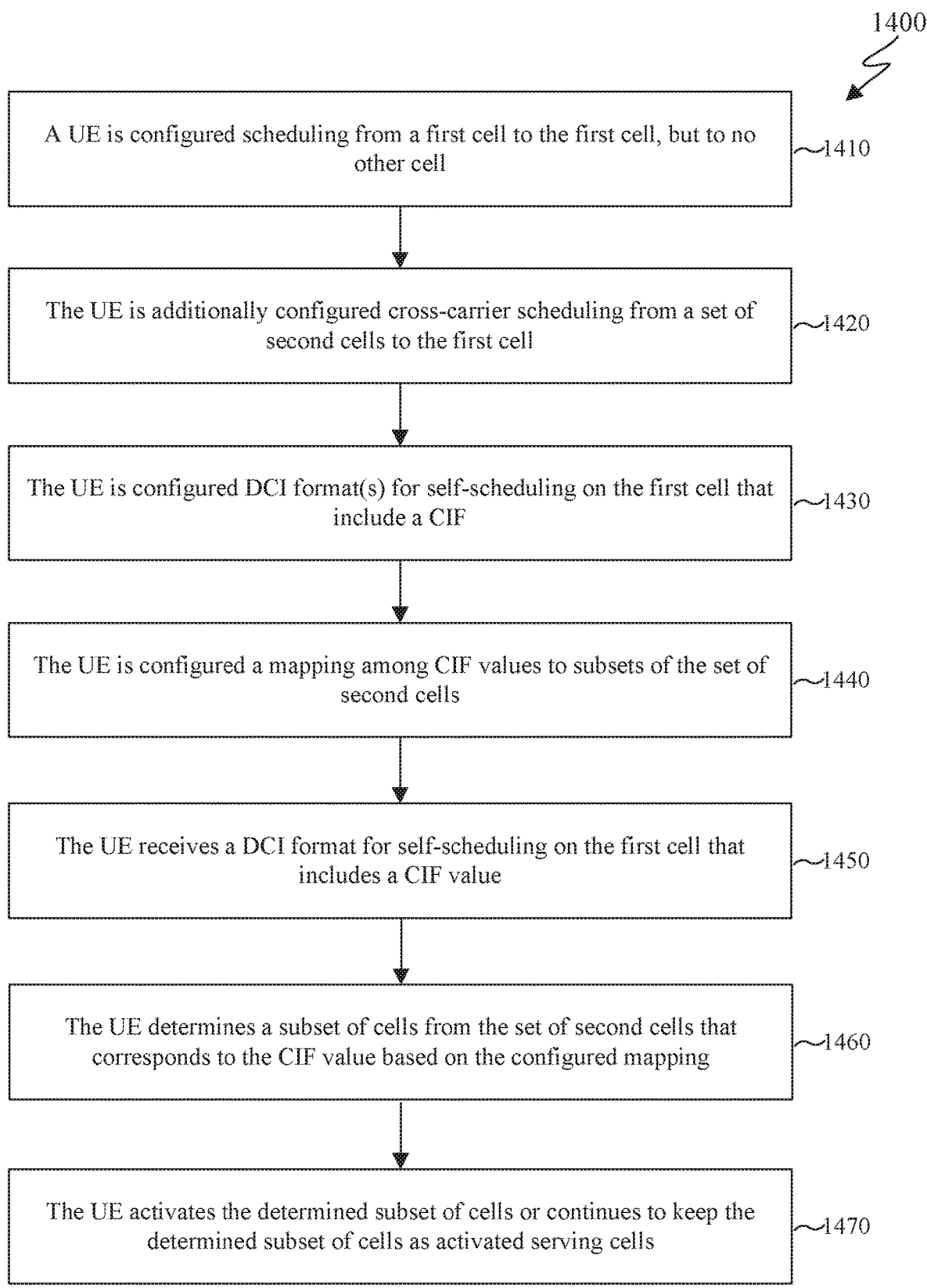
FIG. 14 illustrates a method for mapping CIF values in a DCI format for self-scheduling on a first cell according to embodiments of the present disclosure.

FIGS. 13 and 14 illustrate methods 1300 and 1400, respectively, for mapping CIF values in a DCI format for self-scheduling on a first cell according to embodiments of the present disclosure. The steps of the method 1300 of FIG. 13 and the method 1400 of FIG. 14 can be performed by any of the UEs 111-119 of FIG. 1, such as the UE 116 of FIG. 3. The methods 1300 and 1400 are for illustration only and other embodiments can be used without departing from the scope of the present disclosure.

When the UE is: (i) configured cross-carrier scheduling from second cell(s) to a first cell, in addition to self-scheduling on the first cell, and (ii) not configured to schedule any serving cell from the first cell, and (iii) configured to monitor PDCCH candidates according to search space sets on the first cell for detection of DCI format(s) for scheduling on the first cell that include a CIF, the UE can use CIF values in such DCI format(s). Here, the UE can use CIF values in such DCI format(s) for activation/deactivation or dormancy indication of (other) serving cells, including the second cell(s). The UE can be provided a mapping among CIF values in the DCI format(s) for self-carrier scheduling on the first cell and indication(s) for SCell activation/deactivation or SCell dormancy (other) serving cells, including the second cell(s). The mapping can be provided by higher layer configuration or can be predetermined in the specifications for system operation.

For example, the first cell can be a PCell, and the second cell(s) can be SCells. For example, the first cell can be an SCell, and the second cell(s) can be SCell(s). For example, the first cell can be an SCell, and the second cell(s) can include the PCell. For example, the indication for activation/deactivation/dormancy can be for serving cells that are partially or fully separate from the second cell(s). In the following exemplary embodiments and realizations, the first cell is considered to be the PCell, and the second cell(s) is/are considered to be SCell(s). Further, although the embodiments are described with reference to a CIF field in the DCI formats for scheduling on the PCell, any other field in such DCI format(s), including a new field used to provide the described functionalities, can apply.

In a first realization, when an SCell (referred to as a scheduling SCell or 'sSCell') is a configured serving cell for the UE and the sSCell is configured for cross-carrier scheduling on the PCell, the UE can be provided a mapping among CIF values in the DCI format(s) for self-carrier scheduling on the PCell and indications whether or not the sSCell is an activated/deactivated serving cell for the UE or whether or not the sSCell is on/switched to a dormant BWP.

For example, for a first sSCell from a set of configured sSCells, a first value of CIF such as "CIF=0" indicates that the UE can/shall activate the sSCell or continue to keep the first sSCell as an activated serving cell for the UE. For example, a second value of CIF such as "CIF=1" can indicate to the UE to deactivate the first sSCell or to keep the first sSCell as a deactivated serving cell.

In another example, for a first sSCell from a set of configured sSCells, a first value of CIF such as "CIF=0" indicates that the UE can/shall activate the sSCell or continue to keep the first sSCell as an activated serving cell for the UE. For example, a second value of CIF such as "CIF=1" can indicate to the UE to deactivate the first sSCell or to keep the first sSCell as a deactivated serving cell.

In another example, for a first sSCell from a set of configured sSCells, a first value of CIF such as "CIF=0" indicates that the UE can/shall switch the sSCell to a first/active/default/non-dormant BWP or continue to keep the sSCell on an active BWP. For example, a second value of CIF such as "CIF=1" can indicate to the UE to switch the first sSCell to a dormant BWP or to keep the first sSCell on a dormant BWP.

In yet another example, indications for SCell activation/deactivation can be combined with indications for SCell dormancy. For example, for a first sSCell from a set of configured sSCells, a first CIF value such as "CIF=0" can indicate that an sSCell is activated and switched to a first/active/default BWP, and a second value such as "CIF=1" can indicate that the sSCell is an activated serving cell and switched to a dormant BWP, and a third value such as "CIF=2" can indicate that the sSCell is deactivated.

In a second realization, when a UE is configured multiple sSCells for scheduling on the PCell, and when a CIF in a DCI format on the PCell for self-scheduling a PDSCH reception or a PUSCH transmission on the PCell includes multiple bits, an activation/deactivation status or dormancy status corresponding to the multiple sSCell can be indicated based on a value of the CIF field in the DCI format.

For example, for a CIF of 3 bits, the UE can be configured a set of sSCells with up to 7 sSCells and CIF values of 1 through 7 can respectively indicate a change to activation/deactivation status of the first through seventh sSCell from the set of sSCells, such as a change from an activated to a deactivated serving cell, or a change from a deactivated to an activated serving cell, for the corresponding sSCell. The CIF value of 0 can indicate that there is no change to activation/deactivation status of ant of the 7 sSCells, and any activated sSCell remains activated and any deactivated sSCell remains deactivated. A similar method can be used to indicate a change to dormancy status for the multiple sSCells, namely, switching from active/non-dormant BWP to a dormant BWP or vice versa.

In another example, when the UE can have multiple SCells as scheduling cells for the PCell, the UE can be provided a mapping between CIF values and subsets of SCells from the configured set of SCells. For example, for a CIF field of 3 bits and a set of 3 scheduling SCells, CIF values of 1 through 7 can respectively indicate the (1) first, (2) second, (3) third, (4) first and second, (5) first and third, (6) second and third, and (7) first, second, and third SCells as activated serving cells. The CIF value of 0 can indicate that no SCell is an activated serving cell (that is, all 3 scheduling SCell configured for scheduling on the PCell are deactivated). Alternatively, the CIF value can indicate a change or switch in the activation/deactivation status of the subsets of the SCells, rather than directly indicating whether an indicated subset of SCells is activated or deactivated serving cells. Accordingly, the CIF value of 0 can indicate that the UE need not change the activation/deactivation status of the subsets of the SCells, so that any activated sSCell remains activated and any deactivated sSCell remains deactivated.

An alternative realization is to use the CIF as a bitmap to indicate the scheduling SCells that are activated/deactivated serving cells or to indicate the scheduling SCells for which the UE needs to switch the activation/deactivation status. For example, a value of '000' indicates that no SCell is an activated serving cell, a value '100' indicates that only the first SCell is an activated serving cell, a value of '111' indicates that all 3 SCells are activated serving cells, and so on.

Similar methods can be used to indicate the dormancy status (or a change thereto) for the multiple sSCells, namely, whether subsets of sSCells are on active/non-dormant BWP (s) or on dormant BWPs, or whether the UE needs to switch an indicated subset of SCells from corresponding active/non-dormant BWP(s) to corresponding dormant BWP(s), or vice versa.

In one example, the indication of activation/deactivation status or dormancy status corresponding can correspond to a configured list of serving cells, wherein the list of serving cells can be different/separate from the one or multiple sSCell(s) configured for cross-carrier scheduling of the PCell.

The method 1300, as illustrated in FIG. 13, describes an example flowchart for mapping CIF values in a DCI format for self-scheduling on a first cell to indications whether or not a second cell (that is configured for cross-carrier scheduling on the first cell) is an activated/deactivated serving cell.

In step 1310, a UE (such as the UE 116) is configured scheduling from a first cell to the first cell, but to no other cell. In step 1320, the UE is additionally configured cross-carrier scheduling from a second cell to the first cell. In step 1330, the UE is configured DCI format(s) for self-scheduling on the first cell that include a CIF. In step 1340, the UE receives a DCI format for self-scheduling on the first cell that includes a CIF value. In response to the CIF value indicating a first value (e.g., CIF=0), the UE in step 1350 activates the second cell or continues to keep the second cell activated. In response to the CIF value indicating a second value (e.g., CIF=1), the UE in step 1360 deactivates the second cell or continues to keep the second cell deactivated.

The method 1400, as illustrated in FIG. 14, describes an example flowchart for mapping CIF values in a DCI format for self-scheduling on a first cell to indicate activated/deactivated serving cell(s) from a set of configured scheduling cells for the first cell.

In step 1410, a UE (such as the UE 116) is configured scheduling from a first cell to the first cell, but to no other cell. In step 1420, the UE is additionally configured cross-carrier scheduling from a set of second cells to the first cell. In step 1430, the UE is configured DCI format(s) for self-scheduling on the first cell that include a CIF. In step 1440, the UE is configured a mapping among CIF values to subsets of the set of second cells. In step 1450, the UE receives a DCI format for self-scheduling on the first cell that includes a CIF value. In step 1460, the UE determines a subset of cells from the set of second cells that corresponds to the CIF value based on the configured mapping. In step 770, the UE activates the determined subset of cells or continues to keep the determined subset of cells as activated serving cells.

In one realization, embodiments E-1 and E-1-1 can be combined. For example, a first CIF value such as "CIF=0" can be used for both activation of an SCell and indication that the SCell is 'active' for cross-carrier scheduling of the PCell, so the UE can monitor PDCCH on the SCell for scheduling on the PCell. For example, a second CIF value such as "CIF=1" can be used for deactivation of the SCell and a third CIF value such as "CIF=7" can be used to indicate that the SCell is 'inactive/deactivated' for cross-carrier scheduling of the PCell, so the UE shall not monitor PDCCH on the SCell for cross-carrier scheduling on the PCell.

Although FIG. 13 illustrates the method 1300 and the FIG. 14 illustrates the method 1400 various changes may be made to FIGS. 13 and 14. For example, while the method 1300 and the method 1400 are shown as a series of steps, various steps could overlap, occur in parallel, occur in a different order, or occur multiple times. In another example, steps may be omitted or replaced by other steps. For example, steps of the method 1300 and the method 1400 can be executed in a different order.

The following embodiments of the present disclosure, denoted as E-8, describe using CIF of DCI format(s) for self-scheduling on a first cell that is not a scheduling cell for another cell to indicate SSSG switching for the first cell or for a second cell that is an additional scheduling cell for the first cell. This is described in the following examples and embodiments, such as those of FIGS. 15 and 16.

Figure 15:
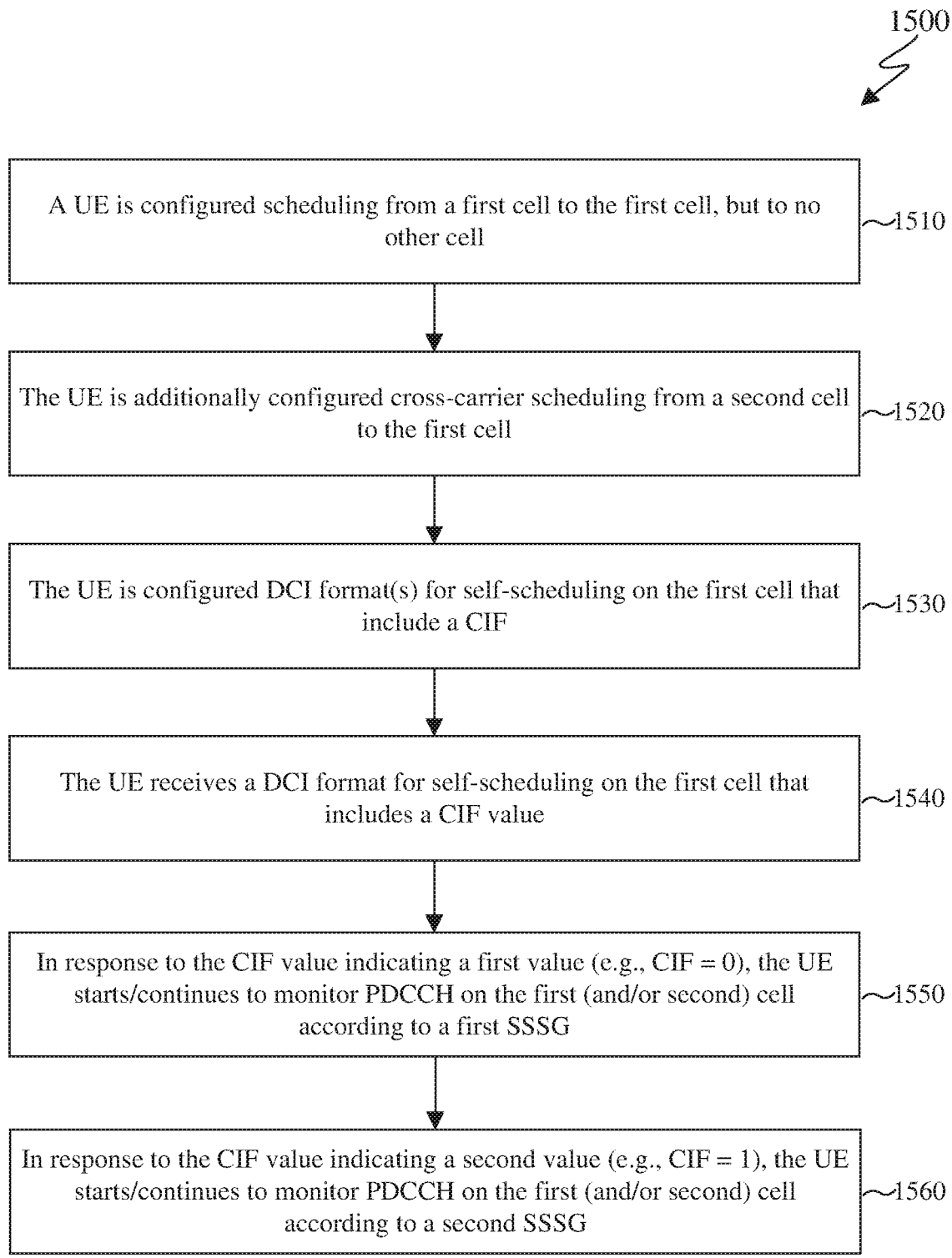
FIG. 15 illustrates a method for mapping CIF values in a DCI format for self-scheduling on a first cell according to embodiments of the present disclosure.
Figure 16:
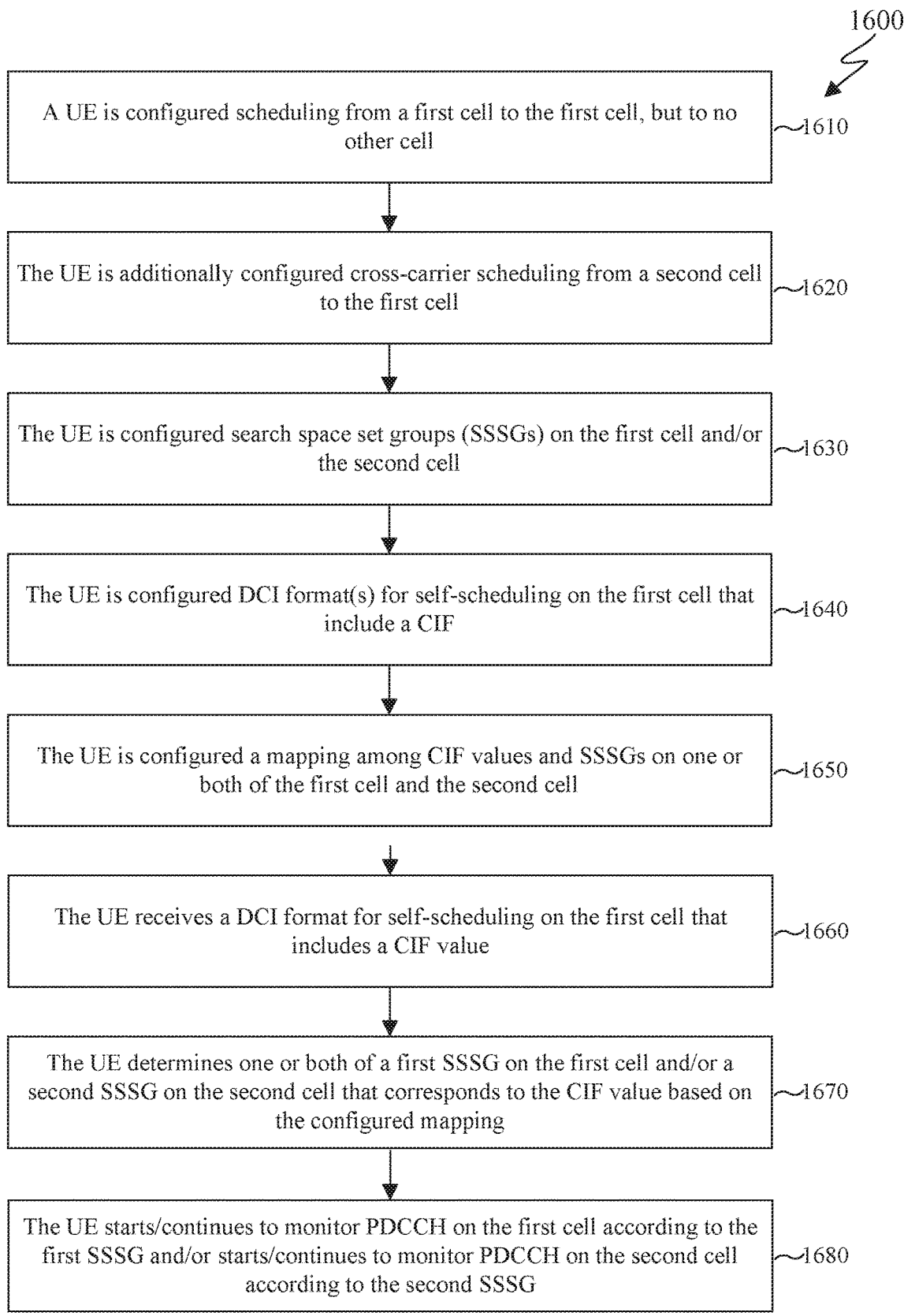
FIG. 16 illustrates a method for mapping CIF values in a DCI format for self-scheduling on a first cell according to embodiments of the present disclosure.

FIGS. 15 and 16 illustrate methods 1500 and 1600, respectively, for mapping CIF values in a DCI format for self-scheduling on a first cell according to embodiments of the present disclosure. The steps of the method 1500 of FIG. 15 and the method 1600 of FIG. 16 can be performed by any of the UEs 111-119 of FIG. 1, such as the UE 116 of FIG.

3. The methods 1500 and 1600 are for illustration only and other embodiments can be used without departing from the scope of the present disclosure.

When the UE is: (i) configured cross-carrier scheduling from second cell(s) to a first cell, in addition to self-scheduling on the first cell, and (ii) not configured scheduling on any other serving cell from the first cell, and (iii) configured to monitor PDCCH candidates according to search space sets on the first cell for detection of DCI format(s) for scheduling on the first cell that include a CIF, (iv) configured search space set groups (SSSGs) on the first cell and/or on the second cell(s), then the UE can be provided a mapping among CIF values in the DCI format(s) for self-carrier scheduling on the first cell and trigger states for SSSG switching on the first cell or the second cell(s). The mapping can be provided by higher layers or can be predetermined in the specifications for system operation.

For example, the first cell can be a PCell, and the second cell(s) can be secondary cells (SCells). For example, the first cell can be an SCell, and the second cell(s) can be SCell(s). For example, the first cell can be an SCell, and the second cell(s) can include the PCell. In the following exemplary embodiments and realizations, the first cell is considered to be the PCell, and the second cell(s) is/are considered to be SCell(s). Further, although the embodiments are described with reference to a CIF field in the DCI formats for scheduling on the PCell, any other field in such DCI format(s), including a new field used to provide the described functionalities, can apply.

For example, a first CIF value such as "CIF=1" indicates that the UE starts/continues to monitor PDCCH on the PCell/SCell(s) according to search space sets in a first SSSG. For example, a second CIF value such as "CIF=2" indicates that the UE starts/continues to monitor PDCCH on the PCell/SCell(s) according to search space sets in a second SSSG. For example, a third CIF value such as "CIF=0" can be used to indicate no change/switching to SSSGs on the PCell/SCell(s). For example, a third CIF value such as "CIF=7" can be used to indicate no SSSG restriction for PCell/SCell(s), so that the UE can monitor PDCCH on PCell/SCell according to all search space sets, regardless of whether they belong to the first SSSG or the second SSSG.

The method 1500, as illustrated in FIG. 15, describes an example flowchart for mapping CIF values in a DCI format for self-scheduling on a first cell to trigger states for SSSG switching on the first cell or the second cell.

In step 1510, a UE (such as the UE 116) is configured scheduling from a first cell to the first cell, but to no other cell. In step 1520, the UE is additionally configured cross-carrier scheduling from a second cell to the first cell. In step 1530, the UE is configured DCI format(s) for self-scheduling on the first cell that include a CIF. In step 1540, the UE receives a DCI format for self-scheduling on the first cell that includes a CIF value. In response to the CIF value indicating a first value (e.g., CIF=0), the UE in step 1550 starts/continues to monitor PDCCH on the first (and/or second) cell according to a first SSSG. In response to the CIF value indicating a second value (e.g., CIF=1), the UE in step 1560 starts/continues to monitor PDCCH on the first (and/or second) cell according to a second SSSG.

In one example, when SSSG switching is applicable to the PCell, the UE applies the mapping among CIF values and the trigger states for SSSG switching on the PCell (only) when the sSCell(s) is/are deactivated serving cell(s) or operating in a dormant BWP (or experiencing beam failure recover (BFR)/radio link failure (RLF) and so on). For example, when at least one sSCell is an activated serving cell (and operating in a non-dormant BWP or without any BFR/RLF issues), the UE monitors PDCCH on the PCell according to all search space sets configured on the PCell without any restriction (that is, regardless of whether or not the search space set belongs to any configured SSSGs), or the UE monitors PDCCH on the PCell according to a default SSSG such as SSSG with index 0. In such a case, the CIF value on a DCI format for self-scheduling on the PCell can be void, or the UE can use the CIF value to determine/switch SSSGs only on the sSCell(s), or the UE can use the CIF value for other purposes, such as those considered in other embodiments of the present disclosure.

In one example, the CIF mapping indicates triggers states that apply commonly to both the PCell and the sSCell(s). For example, a first CIF value such as "CIF=1" indicates a first SSSG for both the PCell and the sSCell(s), and a second CIF value such as "CIF=2" indicates a second SSSG for both the PCell and the sSCell(s). For example, the UE can determine that triggers states are common to both the PCell and the sSCell(s) based on higher layer configuration of a cellGroupsForSwitchList that includes both the PCell and the sSCell(s).

In one example, the CIF mapping can indicate individual trigger states for SSSG switching on the PCell that are separate from trigger states for SSSG switching on the SCell(s) that are configured/activated for cross-carrier scheduling on the PCell. For example, CIF values 1 and 2 can indicate PDCCH monitoring on the PCell according to a first and a second SSSG configured for the PCell, and CIF values 3 and 4 can indicate PDCCH monitoring on the SCell(s) according to a first and a second SSSG configured for the SCell(s).

In case that the CIF mapping indicates an SSSG only for one cell (such as the PCell), the UE can determine an SSSG for the other cell (such as the sSCell(s)) based on one of the following options: (i) the UE makes no change to the 'active' SSSG for the other cell (such as the sSCell(s)), so the UE continues to monitor PDCCH according to the currently 'active' SSSG on the other cell (such as the sSCell(s)), or (ii) the UE does not monitor PDCCH on the sSCell(s) at all, or at least the UE does not monitor PDCCH according to any search space sets that belong to any SSSGs on the sSCell(s).

The UE determines a currently 'active' SSSG for a cell based on existing mechanisms for SSSG switching for example based on a DCI format 2_0 for SSSG switching or based on a timer configured for SSSG switching such as searchSpaceSwitchTimer or based on an indication provided by a CIF value in a previous DCI format for self-carrier scheduling of PCell.

In one example, the CIF mapping can indicate joint trigger states that map to same or different SSSGs on the PCell and the scheduling SCell(s) (referred to as, sSCell(s)). For example, CIF values 1 through 4 can indicate (1) first SSSG on the PCell and first SSSG on the sSCell(s), (2) first SSSG on the PCell and second SSSG on the sSCell(s), (3) second SSSG on the PCell and first SSSG on the sSCell(s), and (4) second SSSG on the PCell and second SSSG on the sSCell(s).

In another example, the CIF mapping can indicate both individual and joint trigger states. For example, CIF values 0 through 7 can indicate (0) only a first SSSG on the PCell, (1) only a second SSSG on the PCell, (2) only a first SSSG on the sSCell(s), (3) only a second SSSG on the sSCell(s), (4) first SSSG on the PCell and first SSSG on the sSCell(s), (5) first SSSG on the PCell and second SSSG on the sSCell(s), (6) second SSSG on the PCell and first SSSG on the sSCell(s), and (7) second SSSG on the PCell and second SSSG on the sSCell(s).

The method 1600, as illustrated in FIG. 16, describes an example flowchart for mapping CIF values in a DCI format for self-scheduling on a first cell to indicate SSSGs on one or both of the first cell and a second cell that is configured for cross-carrier scheduling of the first cell.

In step 1610, a UE (such as the UE 116) is configured scheduling from a first cell to the first cell, but to no other cell. In step 1620, the UE is additionally configured cross-carrier scheduling from a second cell to the first cell. In step 1630, the UE is configured search space set groups (SSSGs) on the first cell and/or the second cell. In step 1640, the UE is configured DCI format(s) for self-scheduling on the first cell that include a CIF. In step 1650, the UE is configured a mapping among CIF values and SSSGs on one or both of the first cell and the second cell. In step 1660, the UE receives a DCI format for self-scheduling on the first cell that includes a CIF value. In step 1670, the UE determines one or both of a first SSSG on the first cell and/or a second SSSG on the second cell that correspond(s) to the CIF value based on the configured mapping. In step, 1680, the UE starts/continues to monitor PDCCH on the first cell according to the first SSSG and/or starts/continues to monitor PDCCH on the second cell according to the second SSSG.

In one example, when the UE is configured a set of two or more scheduling SCells for cross-carrier scheduling on PCell, the UE can be provided a higher layer configuration for one subset or more (for example, two) subsets of the configured set of sSCells for SSSG switching. The configuration can be provided, for example, via cellGroupsForSwitchList. Accordingly, the CIF mapping indicates SSSG determination/switching only for a configured/indicated subset of sSCell(s). In another example, the UE can assume that the CIF mapping applies commonly to all configured/activated sSCells, without need for higher layer configuration.

For example, SSSGs on the PCell/SCell(s) can include Type-3 CSS sets or USS sets. For example, at least when applicable to PCell, SSSGs can additionally or alternatively include Type-0/0A/1/2 CSS sets on the PCell. In another example, inclusion of Type-0/0A/1/2 CSS sets in SSSG configuration can be subject to restrictions, such as including Type-0/0A/1/2 CSS sets only for detection of DCI formats for unicast data transmission on the PCell such as with CRC scrambled by C-RNTI, MCS-C-RNTI, or CS-RNTI.

In one example, the first SSSG can be associated with a first set of DCI formats, while the second SSSG can be associated with a second set of DCI formats. The first and second sets of DCI formats can be non-overlapping or can (partially) overlap. For example, the first set of DCI formats include only fallback DCI formats (such as 0_0 and 1_0) and/or DCI formats for group signaling such as DCI format 2_x (x=0, 1, 2, . . . ), while the second DCI format can alternatively or additionally include non-fallback DCI formats (such as 0_1, 0_2, and 1_1, 1_2).

Although FIG. 15 illustrates the method 1500 and the FIG. 16 illustrates the method 1600 various changes may be made to FIGS. 15 and 16. For example, while the method 1500 and the method 1600 are shown as a series of steps, various steps could overlap, occur in parallel, occur in a different order, or occur multiple times. In another example, steps may be omitted or replaced by other steps. For example, steps of the method 1500 and the method 1600 can be executed in a different order.

The following embodiments of the present disclosure, denoted as E-8-1, describe using CIF of DCI format(s) for self-scheduling on a first cell that is not a scheduling cell for another cell to indicate SSSG switching for the first cell or for a second cell that is an additional scheduling cell for the first cell. This is described in the following examples and embodiments, such as those of FIG. 17.

Figure 17:
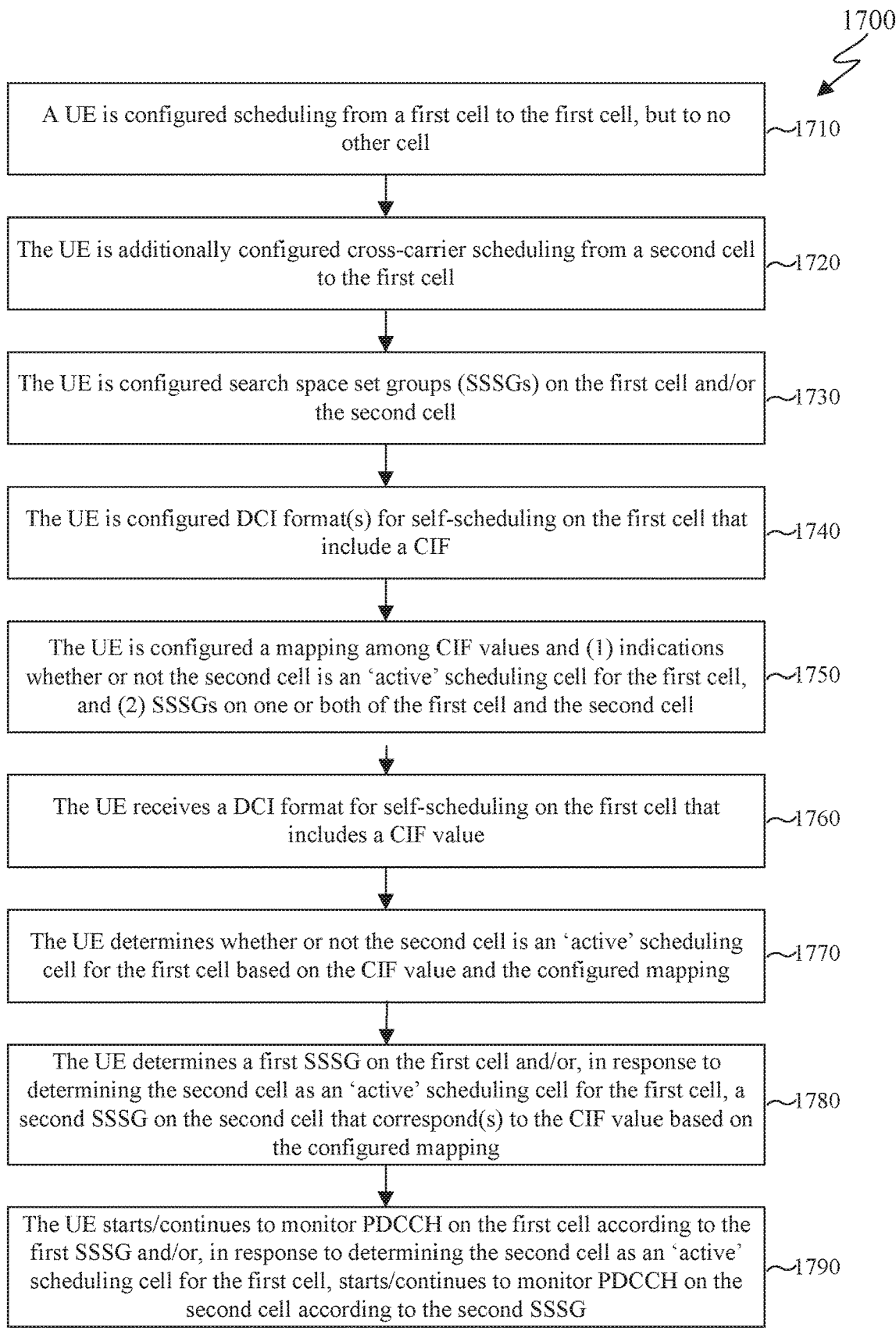
FIG. 17 illustrates a method for mapping CIF values in a DCI format for self-scheduling on a first cell according to embodiments of the present disclosure.

FIG. 17 illustrates a method 1700 for mapping CIF values in a DCI format for self-scheduling on a first cell according to embodiments of the present disclosure. The steps of the method 1700 of FIG. 17 can be performed by any of the UEs 111-119 of FIG. 1, such as the UE 116 of FIG. 3. The method 1700 is for illustration only and other embodiments can be used without departing from the scope of the present disclosure.

When the UE is: (i) configured cross-carrier scheduling from second cell(s) to a first cell, in addition to self-scheduling on the first cell, and (ii) not configured scheduling on any other serving cell from the first cell, and (iii) configured to monitor PDCCH candidates according to search space sets on the first cell for detection of DCI format(s) for scheduling on the first cell that include a CIF, and (iv) configured search space set groups (SSSGs) on the first cell and/or on the second cell(s), then the UE can be provided a mapping. The mapping can be among CIF values in the DCI format(s) for self-carrier scheduling on the first cell and trigger states that indicate (separately or) jointly both of: (i) 'active/activated' scheduling cell(s) for the first cell or 'inactive/deactivated' scheduling cell(s) for the first cell, or activation/deactivation for the second cell(s), or dormancy/non-dormancy for the second cell(s), and (ii) SSSG switching on the first cell and/or on the second cell(s).

The mapping can be provided by higher layers or can be predetermined in the specifications for system operation.

For example, the first cell can be a PCell, and the second cell(s) can be secondary cells (SCells). For example, the first cell can be an SCell, and the second cell(s) can be SCell(s). For example, the first cell can be an SCell, and the second cell(s) can include the PCell. In the following exemplary embodiments and realizations, the first cell is considered to be the PCell, and the second cell(s) is/are considered to be SCell(s). Further, although the embodiments are described with reference to a CIF field in the DCI formats for scheduling on the PCell, any other field in such DCI format(s), including a new field used to provide the described functionalities, can apply.

In one realization, the CIF mapping can be such that each CIF value can jointly indicate an activation/deactivation/dormancy status or change for the sSCell(s) as well as SSSG determination/switching for the PCell and/or the sSCell(s).

For example, when only one SCell is configured for cross-carrier scheduling on the PCell, a first CIF value such as "CIF=0" can indicate that: (i) the sSCell is 'active/activated' for cross-carrier scheduling the P(S)Cell, that is, the UE can start/continue to monitor PDCCH on the sSCell for PCell scheduling, and (ii) the UE shall start/continue to monitor PDCCH on the PCell/sSCell according to search space sets in a first SSSG.

For example, when the first SSSG on the PCell is configured for detection of only fallback DCI formats, the UE starts/continue to monitor only fallback DCI formats on the PCell when sSCell is 'active/activated' for cross-carrier scheduling the P(S)Cell.

For example, a second CIF value such as "CIF=7" can indicate that: (i) the sSCell is 'inactive/deactivated' for cross-carrier scheduling the P(S)Cell, that is, the UE shall stop monitoring PDCCH or continue to not monitor PDCCH on the sSCell for scheduling on the PCell (and only monitor PDCCH on the PCell for self-scheduling on the PCell), and (ii) the UE shall start/continue to monitor PDCCH on the PCell or the sSCell according to search space sets in a second SSSG.

For example, when the first SSSG on the PCell is configured for detection of both fallback and non-fallback DCI formats, the UE monitors both fallback and non-fallback DCI formats on the PCell when sSCell is 'inactive/deactivated' for cross-carrier scheduling on the PCell.

The method 1700, as illustrated in FIG. 17, describes an example flowchart for mapping CIF values in a DCI format for self-scheduling on a first cell to jointly indicate whether or not a second cell is an 'active' scheduling cell for the first cell, and also indicate SSSGs on one or both of the first cell and the second cell.

In step 1710, a UE (such as the UE 116) is configured scheduling from a first cell to the first cell, but to no other cell. In step 1720, the UE is additionally configured cross-carrier scheduling from a second cell to the first cell. In step 1730, the UE is configured SSSGs on the first cell and/or the second cell. In step 1740, the UE is configured DCI format(s) for self-scheduling on the first cell that include a CIF. In step 1750, the UE is configured a mapping among CIF values and (1) indications whether or not the second cell is an 'active' scheduling cell for the first cell, and (2) SSSGs on one or both of the first cell and the second cell. In step 1760, the UE receives a DCI format for self-scheduling on the first cell that includes a CIF value. In step 1770, the UE determines whether or not the second cell is an 'active' scheduling cell for the first cell based on the CIF value and the configured mapping. In step 1780, the UE determines a first SSSG on the first cell and/or, in response to determining the second cell as an 'active' scheduling cell for the first cell, a second SSSG on the second cell that correspond(s) to the CIF value based on the configured mapping. In step 1790, the UE starts/continues to monitor PDCCH on the first cell according to the first SSSG and/or, in response to determining the second cell as an 'active' scheduling cell for the first cell, starts/continues to monitor PDCCH on the second cell according to the second SSSG.

In certain embodiments, the CIF mapping can be extended to indicate various combinations of: (i) separate or joint switching of SSSGs on the PCell and on the sSCell, or (ii) SSSG switching for more than one sSCells, or (iii) activation/deactivation/dormancy indication for more than one sSCells. Similar to methods used in the previous embodiments.

In another realization, the CIF mapping can be such that some CIF values indicate activation/deactivation/dormancy for the scheduling SCell(s), while other CIF values indicate SSSG determination/switching for the PCell and/or the sSCell(s). For example, CIF values 1 and 2 are used for indication of activation/deactivation/dormancy for a scheduling SCell, and CIF values 3 and 4 are used for indication of whether or not the sSCell is 'active' for cross-carrier scheduling on the PCell, while CIF values 5 and 6 are used for indication of SSSGs on the PCell and/or the sSCell.

Although FIG. 17 illustrates the method 1700 various changes may be made to FIG. 17. For example, while the method 1700 is shown as a series of steps, various steps could overlap, occur in parallel, occur in a different order, or occur multiple times. In another example, steps may be omitted or replaced by other steps. For example, steps of the method 1700 can be executed in a different order.

The following embodiments of the present disclosure, denoted as E-9, describe CIF mapping for SCell indication/activation or SSSG switching in case of 'compact' DCI formats with 1-2 bits for CIF.

In certain embodiments, when a 'compact' DCI format, such as DCI format 0_2 or 1_2, with a bit-width of 1 or 2 bit for the CIF is used for indication or activation of second cell(s) that is/are configured for cross-carrier scheduling of a first cell, or for SSSG switching on the first cell or the second cell(s), the UE can be provided with a 'compact' mapping among CIF values and indications for activation/determination of second cell(s) and/or for SSSG switching or determination. Herein, a 'compact' CIF mapping is a subset of a 'normal' CIF mapping that is provided for a 'normal' DCI format, such as DCI format 0_1 and 1_1, with 3 bits of CIF.

The UE can determine the 'compact' CIF mapping based on higher layer configuration or as predetermined information in the specifications for system operation. For example, a 'compact' CIF mapping can include the first two entries or the first four entries of a 'normal' CIF mapping with 8 entries.

The following embodiments of the present disclosure, denoted as E-10, describe Timeline aspects for SCell activation/deactivation/dormancy or SSSG switching on the PCell/sSCell(s) using CIF mapping.

In certain embodiments, when a UE (such as the UE 116) determines that a second cell (such as an sSCell that is configured for cross-carrier scheduling on the PCell) is activated/deactivated for cross-carrier scheduling on the PCell, or that the second is activated/deactivated for serving the UE, or that the second cell is switched to a dormant/non-dormant BWP, based on a CIF value in a DCI format for self-scheduling on the first cell (such as the PCell), as described in embodiment E-7 and E-7-1, the UE performs the corresponding action at a (first) slot that is (at least): (i) M symbols/slots after the last symbol of the PDCCH with the DCI format for self-scheduling on the first cell, or (ii) K symbols/slots after transmission of a HARQ-ACK information feedback corresponding to a PDSCH on the first cell that corresponds to a PDCCH with the DCI format for self-scheduling.

When a UE (such as the UE 116) determines a SSSG switching on a first cell (such as the PCell) or second cell(s) (such as sSCell(s)) that are configured for cross-carrier scheduling on the PCell) based on a CIF value in a DCI format for self-scheduling on the first cell, as described in embodiment E-8 and E-8-1, the UE stops PDCCH monitoring according to a previous SSSG on the first cell or second cell(s) and starts PDCCH monitoring according to a newly determined SSSG on the first cell or second cell(s) at a (first) slot that is (at least): (i) $P_{switch}$ symbols after the last symbol of the PDCCH with the DCI format for self-scheduling on the first cell, or (ii) N symbols/slots after transmission of a HARQ-ACK information feedback corresponding to a PDSCH on the first cell that corresponds to a PDCCH with the DCI format for self-scheduling.

Herein, a symbol or slot for determination of M or K or $P_{switch}$ or N can be with respect to one or more of the following four options: (i) an SCS configuration of the first cell (on which the UE receives the DCI format for self-scheduling), (ii) an SCS configuration of the cell for which the UE determines an SSSG switching based on the CIF mapping, (iii) a smallest SCS configuration among the first cell and the cell for which the UE determines an SSSG switching based on the CIF mapping, or (iv) a smallest SCS configuration among the first cell and the second cell(s) (that are configured for cross-carrier scheduling on the PCell. In one example, the UE determines PDCCH monitoring limits based on configured scheduled cells and scheduling cells, so any determination of active/activated scheduling SCell(s) or SSSG switching on the PCell and/or sSCell(s) has no impact on the PDCCH monitoring limits.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
receiving:
first information for:
a first set of values for a first set of discontinuous reception (DRX) timers associated with a first DRX cell group, and
a second set of values for the first set of DRX timers associated with a second DRX cell group, wherein the first DRX cell group and the second DRX cell group do not have a common cell;
second information for scheduling, from a first cell, on a second cell, wherein:
the first cell is from the first DRX cell group, and
the second cell is from the second DRX cell group; and
a physical downlink control channel (PDCCH) on the first cell, wherein the PDCCH schedules a physical downlink shared channel (PDSCH) or a physical uplink shared channel (PUSCH) on the second cell;
receiving the PDSCH or transmitting the PUSCH on the second cell; and
determining:
a first DRX Active time for the first DRX cell group based on the first set of values and the PDCCH reception, and
a second DRX Active time for the second DRX cell group based on the second set of values and the PDCCH reception.

2. The method of claim 1, wherein determining the first DRX Active time and the second DRX Active time comprises extending first DRX timers, from the first set of DRX timers, for the first DRX cell group and the second DRX cell group in response to the PDCCH reception.

3. The method of claim 1, wherein determining the first DRX Active time and the second DRX Active time comprises:
starting or restarting:
a first drx-InactivityTimer on the first DRX cell group with a first value in a first symbol after an end of the PDCCH reception, and
a second drx-InactivityTimer on the second DRX cell group with a second value in the first symbol after the end of the PDCCH reception, wherein:
the PDSCH reception or the PUSCH transmission includes a new transport block,
the first value is from the first set of values, and
the second value is from the second set of values.

4. The method of claim 1, wherein determining the first DRX Active time and the second DRX Active time comprises:
extending first DRX timers, from the first set of DRX timers, for the first DRX cell group in response to the PDCCH reception, and
maintaining the first DRX timers for the second DRX cell group in response to the PDCCH reception.

5. The method of claim 1, wherein determining the first DRX Active time and the second DRX Active time comprises:
starting or restarting a first drx-InactivityTimer on the first DRX cell group with a first value in a first symbol after an end of the PDCCH reception,
maintaining a second drx-InactivityTimer on the second DRX cell group in the first symbol after the end of the PDCCH reception, wherein:
the PDSCH reception or the PUSCH transmission includes a new transport block, and
the first value is from the first set of values.

6. The method of claim 1, further comprising:
identifying third information for a third value of a second DRX timer corresponding to the second cell, wherein the second DRX timer is not included in the first set of DRX timers; and
determining a third DRX Active time for the second cell based on one of:
the second DRX timer, or
the first set of DRX timers and the second DRX timer, wherein the third DRX Active time is different from the second DRX Active time.

7. The method of claim 6, further comprising:
identifying fourth information for time units with values m1 and m2;
starting the second DRX timer m1 time units before a first symbol of the PDSCH reception or PUSCH transmission; and
stopping the second DRX timer m2 time units after a last symbol of the PDSCH reception or PUSCH transmission.

8. A user equipment (UE) comprising:
a transceiver configured to:
receive first information for:
a first set of values for a first set of discontinuous reception (DRX) timers associated with a first DRX cell group, and
a second set of values for the first set of DRX timers associated with a second DRX cell group, wherein the first DRX cell group and the second DRX cell group do not have a common cell;
receive second information for scheduling, from a first cell, on a second cell, wherein:
the first cell is from the first DRX cell group, and the second cell is from the second DRX cell group;
receive a physical downlink control channel (PDCCH) on the first cell, wherein the PDCCH schedules a physical downlink shared channel (PDSCH) or a physical uplink shared channel (PUSCH) on the second cell; and
receive the PDSCH or transmit the PUSCH on the second cell; and
a processor operably coupled to the transceiver, the processor configured to determine:
a first DRX Active time for the first DRX cell group based on the first set of values and the PDCCH reception, and
a second DRX Active time for the second DRX cell group based on the second set of values and the PDCCH reception.

9. The UE of claim 8, wherein to determine the first DRX Active time and the second DRX Active time, the processor is further configured to extend first DRX timers, from the first set of DRX timers, for the first DRX cell group and the second DRX cell group in response to the PDCCH reception.

10. The UE of claim 8, wherein to determine the first DRX Active time and the second DRX Active time, the processor is further configured to start or restart:
a first drx-InactivityTimer on the first DRX cell group with a first value in a first symbol after an end of the PDCCH reception, and
a second drx-InactivityTimer on the second DRX cell group with a second value in the first symbol after the end of the PDCCH reception, wherein:
the PDSCH reception or the PUSCH transmission includes a new transport block,
the first value is from the first set of values, and
the second value is from the second set of values.

11. The UE of claim 8, wherein to determine the first DRX Active time and the second DRX Active time, the processor is further configured to:
extend first DRX timers, from the first set of DRX timers, for the first DRX cell group in response to the PDCCH reception, and
maintain the first DRX timers for the second DRX cell group in response to the PDCCH reception.

12. The UE of claim 8, wherein to determine the first DRX Active time and the second DRX Active time, the processor is further configured to:
start or restart a first drx-InactivityTimer on the first DRX cell group with a first value in a first symbol after an end of the PDCCH reception,
maintain a second drx-InactivityTimer on the second DRX cell group in the first symbol after the end of the PDCCH reception, wherein:
the PDSCH reception or the PUSCH transmission includes a new transport block, and
the first value is from the first set of values.

13. The UE of claim 8, wherein the processor is further configured to:
identify third information for a third value for a second DRX timer corresponding to the second cell, wherein the second DRX timer is not included in the first set of DRX timers, and
determine a third DRX Active time for the second cell based on one of:
the second DRX timer, or
the first set of DRX timers and the second DRX timer, wherein the third DRX Active time is different from the second DRX Active time.

14. The UE of claim 13, wherein the processor is further configured to:
identify fourth information for time units with values m1 and m2,
start the second DRX timer m1 time units before a first symbol of the PDSCH reception or PUSCH transmission, and
stop the second DRX timer m2 time units after a last symbol of the PDSCH reception or PUSCH transmission.

15. A base station comprising:
a transceiver configured to:
transmit first information for:
a first set of values for a first set of discontinuous reception (DRX) timers associated with a first DRX cell group, and
a second set of values for the first set of DRX timers associated with a second DRX cell group, wherein the first DRX cell group and the second DRX cell group do not have a common cell;
transmit second information for scheduling, from a first cell, on a second cell, wherein:
the first cell is from the first DRX cell group, and
the second cell is from the second DRX cell group;
transmit a physical downlink control channel (PDCCH) on the first cell, wherein the PDCCH schedules a physical downlink shared channel (PDSCH) or a physical uplink shared channel (PUSCH) on the second cell; and
transmit the PDSCH or receive the PUSCH on the second cell; and
a processor operably coupled to the transceiver, the processor configured to determine:
a first DRX Active time for the first DRX cell group based on the first set of values and the PDCCH transmission, and
a second DRX Active time for the second DRX cell group based on the second set of values and the PDCCH transmission.

16. The base station of claim 15, wherein to determine the first DRX Active time and the second DRX Active time, the processor is further configured to extend first DRX timers, from the first set of DRX timers, for the first DRX cell group and the second DRX cell group in response to the PDCCH transmission.

17. The base station of claim 15, wherein to determine the first DRX Active time and the second DRX Active time, the processor is further configured to start or restart:
a first drx-InactivityTimer on the first DRX cell group with a first value in a first symbol after an end of the PDCCH transmission, and
a second drx-InactivityTimer on the second DRX cell group with a second value in the first symbol after the end of the PDCCH transmission, wherein:
the PDSCH transmission or the PUSCH reception includes a new transport block,
the first value is from the first set of values, and
the second value is from the second set of values.

18. The base station of claim 15, wherein to determine the first DRX Active time and the second DRX Active time, the processor is further configured to:
extend first DRX timers, from the first set of DRX timers, for the first DRX cell group in response to the PDCCH transmission, and
maintain the first DRX timers for the second DRX cell group in response to the PDCCH transmission.

19. The base station of claim 15, wherein to determine the first DRX Active time and the second DRX Active time, the processor is further configured to:
    start or restart a first drx-InactivityTimer on the first DRX cell group with a first value in a first symbol after an end of the PDCCH transmission,
    maintain a second drx-InactivityTimer on the second DRX cell group in the first symbol after the end of the PDCCH transmission, wherein:
        the PDSCH transmission or the PUSCH reception includes a new transport block, and
        the first value is from the first set of values.

20. The base station of claim 15, wherein the processor is further configured to determine:
    third information for a third value for a second DRX timer corresponding to the second cell, wherein the second DRX timer is not included in the first set of DRX timers, and
    a third DRX Active time for the second cell based on one of:
        the second DRX timer, or
        the first set of DRX timers and the second DRX timer, wherein the third DRX Active time is different from the second DRX Active time.

* * * * *